(12) United States Patent
Lin

(10) Patent No.: US 6,427,122 B1
(45) Date of Patent: Jul. 30, 2002

(54) POSITIONING AND DATA INTEGRATING METHOD AND SYSTEM THEREOF

(75) Inventor: Ching-Fang Lin, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 0 days.

(21) Appl. No.: 09/764,776

(22) Filed: Jan. 23, 2001

Related U.S. Application Data

(60) Provisional application No. 60/257,516, filed on Dec. 23, 2000.

(51) Int. Cl.⁷ .............................. G01C 21/00; G01S 5/02
(52) U.S. Cl. ..................... 701/214; 701/213; 701/215; 701/216; 342/26; 342/359; 348/116
(58) Field of Search ................................. 701/213, 214, 701/215, 225, 216, 207, 220, 211, 13, 23; 342/26, 359, 357.05, 357.06, 357.14; 348/116

(56) References Cited

U.S. PATENT DOCUMENTS 5,928,309 A * 7/1999 Korver et al. ............... 701/214
6,064,336 A * 5/2000 Krasner .................. 342/357.05
6,127,970 A * 10/2000 Lin ........................ 342/357.14
6,205,400 B1 * 3/2001 Lin ............................ 701/214

* cited by examiner

Primary Examiner—William A. Cuchlinski, Jr.
Assistant Examiner—Tuan C To
(74) Attorney, Agent, or Firm—Raymond Y. Chan; David and Raymond Patent Group

(57) ABSTRACT

An improved positioning and data integrating process and system can substantially solve the problems encountered in system integration for personal hand-held applications, air, land, and water vehicles, wherein an integrated global positioning system/inertial measurement unit, enhanced with optional other devices to derive user position, velocity, attitude, and body acceleration and rotation information, and distributes these data to other onboard systems, for example, in case of aircraft application, flight management system, flight control system, automatic dependent surveillance, cockpit display, enhanced ground proximity warning system, weather radar, and satellite communication system.

74 Claims, 33 Drawing Sheets

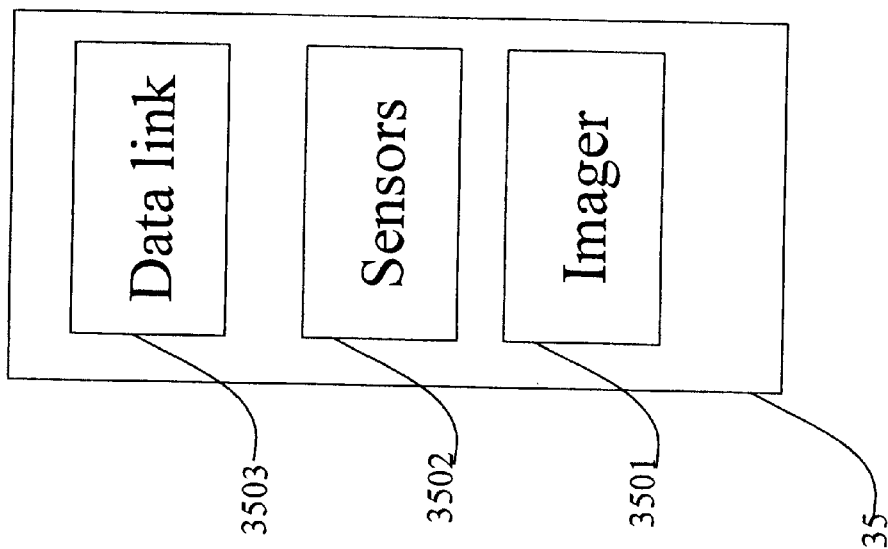

POSITIONING AND DATA INTEGRATING METHOD AND SYSTEM THEREOF

CROSS REFERENCE OF RELATED APPLICATION

This is a regular application of a provisional application having an application number of Ser. No. 60/257,516 and a filing date of Dec. 23, 2000. The present invention is an improvement of an allowed application, application Ser. No. 09/374,480, filed on Aug. 13, 1999.

BACKGROUND OF THE PRESENT INVENTION

1. Field of the Present Invention

The present invention relates generally to a positioning and data integrating method and systems, and more particularly to an improved positioning and data integrating method and system for personal hand-held applications, such as air, land, and water vehicles, which employs integrated global positioning system/inertial measurement unit, enhanced with optional other navigation devices to derive vehicle position, velocity, attitude, and body acceleration and rotation information, and distributes these data to other onboard systems, for example, in the case of aircraft applications, flight management system, flight control system, automatic dependent surveillance, cockpit display, enhanced ground proximity warning system, weather radar, and satellite communication system.

2. Description of Related Arts

There are commonly difficult problems in the integrated design of positioning and data integrating method and systems for personal hand-held applications and various vehicles, including avionics systems for aircraft. Commercial aircraft avionics systems, such as multiple radios, navigation systems, flight management systems, flight control systems, and cockpit display, are ever-increasing in complexity. Each has dedicated controls that require the pilot's attention, particularly during critical flight conditions. Moreover, the task is compounded when the pilot's accessibility to dedicated controls is limited by cockpit space restrictions.

Flight management system (FMS) includes flight navigation management, flight planning, and integrated trajectory generator and guidance law. The FMS of a flight vehicle acts in conjunction with the measurement systems and onboard inertial reference systems to navigate the vehicle along trajectory and off trajectory for enroute, terminal, and approach operations. Nowadays, advanced flight vehicles are equipped with flight management computers which calculate trajectories and with integrated control system which fly the vehicle along these trajectories, thus minimizing direct operating cost.

The guidance function is carried out using the FMS. In some applications, the cruise control law and some automatic trajectory tracking control laws (especially for four-dimensional control and lateral turns) are also included in the FMS. In this way, they are closely coupled with the guidance functions. In the approaching and landing phase, the optimal position of the vehicle is captured by the FMS through the calculation of the trajectory. Precise guidance and control are required because the cross-track error and the relative position deviation are sensitive to the accuracy of guidance. Hence, the accuracy of the guidance function in the FMS greatly determines the vehicle performance of approaching and landing as well as other critical mission segments. However, the automatic flight control system (FCS), not the FMS, should include critical functions for both operational and failure considerations because critical functions such as those of high band pass inner-loops are normally handled by an automatic FCS. Therefore, it is desired to avoid incorporating these functions in the FMS even though they can be handled with separate processors in the FMS.

Assuming that the fast control loop is 100 Hz and the slow control loop is 50 Hz, the selection of 50 Hz as the major frame updates the major frame every 20 ms. The sensor input is at 200 Hz. If it is chosen as a minor frame, then the minor frame is 5 ms. Other subsystems at 50 Hz are the guidance command, the FCS data input, the FCS data output, and the actuation/servo command. At each major frame, the sensor inputs are updated four times and the fast control loops are computed twice. The slow control loop, the guidance command, the FCS data input, the FCS data output, and the actuation/servo command are updated once.

The increasing complexity of the flight management systems and flight control systems, as well as other avionics systems, requires the integrated design of avionics or integrated avionics systems. For instance, it is anticipated that the new generation of commercial aircraft will use integrated modular avionics, which will become an integral part of the avionics architecture for these aircraft. The integrated modular avionics suite will enable the integrated avionics to share such functions as processing, input/output, memory, and power supply generation. The flight decks of these new generation of airliners will incorporate advanced features such as flat-panel screens instead of cathode-ray tubes (CRTs), which will display flight, navigation, and engine information.

Advances in inertial sensors, displays, and VLSI/VHSIC (Very Large Scale Integration/Very High Speed Integrated Chip) technologies made possible the use of navigation systems to be designed for commercial aviation aircraft to use all-digital inertial reference systems (IRS). The IRS interfaces with a typical transport aircraft flight management system. The primary outputs from the system are linear accelerations, angular rates, pitch/roll attitude, and north-east-vertical velocity data used for inputs to a transport flight control system.

An inertial navigation system comprises an onboard inertial measurement unit, a processor, and an embedded navigation software. The positioning solution is obtained by numerically solving Newton's equations of motion using measurements of vehicle specific forces and rotation rates obtained from onboard inertial sensors. The onboard inertial sensors consist of accelerometers and gyros which together with the associated hardware and electronics comprise the inertial measurement unit.

The inertial navigation system may be mechanized in either a gimbaled or strapdown configuration. In a gimbaled inertial navigation system, the accelerometers and gyros are mounted on a gimbaled platform to isolate the sensors from the rotations of the vehicle, and to keep the measurements and navigation calculations in a stabilized navigation coordinated frame. Possible navigation frames include earth centered inertial (ECI), earth-centered-earth-fix (ECEF), locally level with axes in the directions of north, east, down (NED), and locally level with a wander azimuth. In a strapdown inertial navigation system, the inertial sensors are rigidly mounted to the vehicle body frame, and a coordinate frame transformation matrix (analyzing platform) is used to transform the body-expressed acceleration and rotation measurements to a navigation frame to perform the navigation computation in the stabilized navigation frame. Gimbaled inertial navigation systems can be more accurate and easier to calibrate than strapdown inertial navigation systems. Strapdown inertial navigation systems can be subjected to higher dynamic conditions (such as high turn rate maneuvers) which can stress inertial sensor performance. However, with the availability of newer gyros and accelerometers, strapdown inertial navigation systems are becoming the predominant mechanization due to their low cost and reliability.

Inertial navigation systems in principle permit pure autonomous operation and output continuous position, velocity, and attitude data of vehicle after initializing the starting position and initiating an alignment procedure. In addition to autonomous operation, other advantages of inertial navigation system include the full navigation solution and wide bandwidth. However, an inertial navigation system is expensive and subject to drift over an extended period of time. It means that the position error increases with time. This error propagation characteristic is primarily caused by its inertial sensor error sources, such as gyro drift, accelerometer bias, and scale factor errors.

The innovative method and system for integrated design of positioning and data integrating method and systems for an avionics system for aircraft were disclosed in a previous patent application of the application, entitled "Vehicle Positioning and Data Integrating Method and System Thereof", application Ser. No. 09/374,480, filed on Aug. 13, 1999. Although it is obvious that the previous application can be applied in both land and water vehicles and other onboard systems for air, land, and water vehicles, it is preferred to provide specific embodiments for how to embody the techniques of the previous application for land and water vehicle applications, as well as personal hand-held applications.

SUMMARY OF THE PRESENT INVENTION

It is a main objective of the present invention to provide an improved positioning and data integrating method and system thereof, in which a control board manages and distributes the navigation data and inertial sensor data to other onboard systems for air, land, and water vehicles.

Another objective of the present invention is to provide an improved positioning and data integrating method and system thereof for hand-held application, wherein a control board manages and distributes the navigation data and inertial sensor data to a display device and wireless communication device.

Another objective of the present invention to provide an improved positioning and data integrating method and system thereof for air, land, and water vehicles, wherein one or more or all of the following devices: altitude measurement device, north finder, velocity producer, terrain data base, and an object detection system interface, are incorporated with a global positioning system/inertial measurement unit integrated navigation system to enhance the position solution and control performance to adapt a variety of applications.

Another objective of the present invention is to provide a universal vehicle positioning and data integrating method and system thereof for air vehicles, in which the flight management system gets vehicle position, velocity, attitude, and time data from a global positioning system/inertial measurement unit integrated navigation system enhanced by an altitude measurement unit to perform flight management operations.

Another objective of the present invention to provide a universal vehicle positioning and data integrating method and system thereof for air vehicles, in which the flight control system gets vehicle attitude and velocity, and vehicle body acceleration and rotation data from a global positioning system/inertial measurement unit integrated navigation system enhanced by an altitude measurement unit to perform vehicle flight control.

Another objective of the present invention to provide a universal vehicle positioning and data integrating method and system thereof for air vehicles, in which the automatic dependent surveillance system gets vehicle position and time data from a global positioning system/inertial measurement unit integrated navigation system enhanced by an altitude measurement unit to report vehicle's position.

Another objective of the present invention to provide a universal vehicle positioning and data integrating method and system thereof for air vehicles, in which the cockpit display gets vehicle position, attitude, heading, velocity, and time data from a global positioning system/inertial measurement unit integrated navigation system enhanced by an altitude measurement unit to display navigation information.

Another objective of the present invention to provide a universal vehicle positioning and data integrating method and system thereof for air vehicles, in which the enhanced ground proximity warning system gets vehicle position, velocity, and attitude data from a global positioning system/inertial measurement unit integrated navigation system enhanced by an altitude measurement unit to query terrain data, and to predict the transportation path.

Another objective of the present invention to provide a universal vehicle positioning and data integrating method and system thereof for air vehicles, in which the weather radar gets platform attitude and body acceleration data from a global positioning system/inertial measurement unit integrated navigation system enhanced by an altitude measurement unit to stabilize the weather radar antenna.

Another objective of the present invention to provide a universal vehicle positioning and data integrating method and system thereof for air vehicles, in which the satellite communication system gets vehicle position and attitude data from a global positioning system/inertial measurement unit integrated navigation system enhanced by an altitude measurement unit to point the communication antenna to the satellite.

The present invention can substantially solve the problems encountered in avionics system integration by using state-of-the-art inertial sensor, global positioning system technology, integrated global positioning system/inertial measurement unit enhanced with altitude measurements, and advanced bus and computing technologies. The present invention is to balance multiple requirements imposed on the modem avionics systems design and manufacturing: low cost, high accuracy, reliability, small size and weight, low power consumption, ease of operation and maintenance, and ease of modification.

BRIEF DESCRIPTION OF THE DRAWINGS

FIG. 29 is a block diagram illustrating the alternatives of the object detection system.

DETAILED DESCRIPTION OF THE PREFERRED EMBODIMENT

Figure 1:
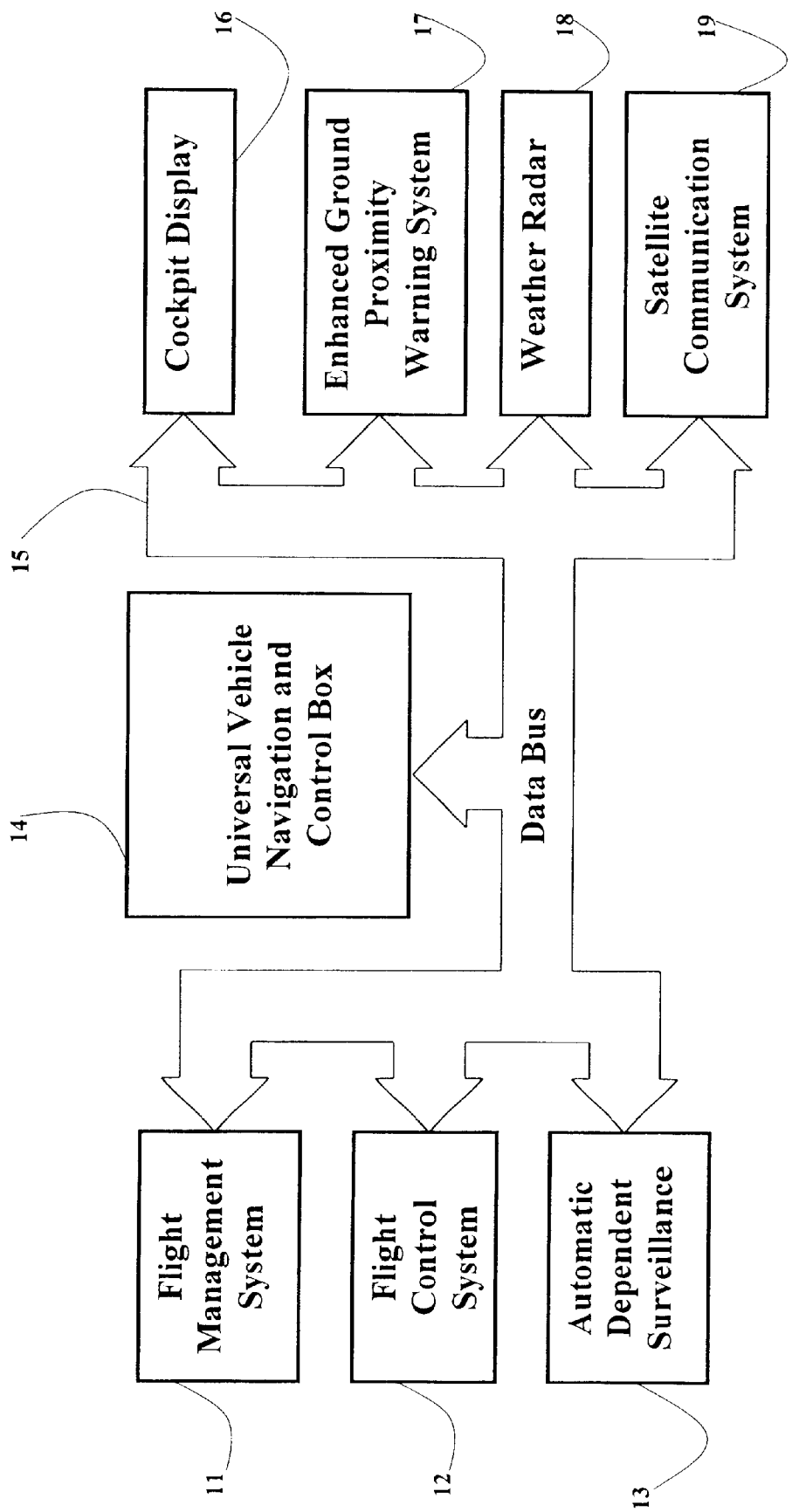
FIG. 1 is a block diagram illustrating a universal navigation and control box equipped with a flight management system, a flight control system, an automatic dependent surveillance, a cockpit display, an enhanced ground proximity warning system, a weather radar, and a satellite communication system, according to the present invention.

The present invention provides an improved universal positioning and data integrating method and system thereof, in which a control board manages and distributes the navigation data and inertial sensor data to other onboard systems for air, land, and water vehicles.

The method and system of the present invention are capable of being used for hand-held applications, wherein a control board manages and distributes the navigation data and inertial sensor data to a display device and wireless communication device.

The method and system of the present invention are utilized with a Global Positioning System/Inertial Measurement Unit (GPS/IMU) integrated navigation system, wherein one or more or all of the following devices: altitude measurement device, north finder, velocity producer, terrain data base, and an object detection system interface, are incorporated with the global positioning system/inertial measurement unit integrated navigation system to enhance the position solution and control performance to adapt a variety of applications.

Generally, the accuracy of inertial navigation systems (INS) can be improved by employing highly accurate inertial sensors or by compensating with data from an external sensor. The cost of developing and manufacturing inertial sensors increases as the level of accuracy improves. The advances in new inertial sensor technology and electronic technologies have led to the availability of low cost inertial sensors, such as mechnical-electronis-micro-system (MEMS) inertial sensors. Mechanical-electronic-microsystem inertial sensors borrow processes from the semiconductor industry to fabricate tiny sensors and actuators on silicon chips. The precision of these new inertial sensors may be less than what conventional sensors achieve, but they have enormous cost, size, weight, thermal stability and wide dynamic range advantages over conventional inertial sensors.

The present invention employs an integrated global positioning system/inertial measurement unit coupled with an altitude measurement unit to provide highly accurate and continuous positioning of a vehicle, high accurate attitude determination, and platform body acceleration and rotation data, as well as time data output. These data are managed and dispensed by a control board.

The present invention has many advantages over conventional systems. For example, the advantages of the present invention applied for air vehicles include:

(1) The inertial navigation system has high accurate short term positioning capability, but subjects to long term drift which leads to bad long term navigation solution. The global positioning system (GPS) has long term high accurate navigation performance. Through integration of these two disparate systems, it is expected to obtain high accurate long term and short term navigation solution.

(2) The integrated global positioning system/inertial measurement unit is coupled with an altitude measurement unit, such as a barometer device, or a radar altimeter to improve the vertical positioning accuracy.

(3) The velocity and acceleration obtained from an inertial measurement unit (IMU) are fed back to the global positioning system processor to aid the carrier phase and code tracking of the global positioning system satellite signals, so as to enhance the performance of the global positioning and inertial integration system, especially in heavy jamming and high dynamic environments.

(4) The high accurate navigation solution from an integrated global positioning system/inertial measurement unit coupled with altitude measurement is used to aid the global positioning system carrier phase ambiguity resolution. By this way, the carrier phase data extracted from a global positioning system processor can be blended in a Kalman filter to further improve the navigation solution.

(5) The gyros and accelerometers provide platform body rotation and acceleration information which are essential data required by a flight control system. These data are distributed to the flight control system as well as the platform velocity and attitude information. By this way, the flight control system does not need additional gyros and accelerometers.

(6) The onboard flight management system obtains vehicle position, velocity, attitude, and time data directly from the control board of a universal navigation and control box, so that it does not need an additional navigation aid.

(7) The onboard automatic dependent surveillance obtains vehicle position and time data directly from the control board of a universal navigation and control box, so that it does not need an additional navigation aid and a time clock.

(8) The universal navigation and control box provides vehicle position, velocity, and attitude data and distributes these data to the enhanced ground proximity warning system to advance its function and performance. By this way, the onboard enhanced ground proximity warning system does not require an additional navigation aid to provide vehicle position, velocity and attitude information.

(9) The body acceleration data obtained from accelerometer assembly in an IMU is distributed by the control board of a universal navigation and control box to the weather radar as well as the platform attitude information. These data are used to stabilize the weather radar antenna system, so that additional accelerometers and attitude sensors are saved.

(10) The platform position and attitude are distributed by the control board of a universal navigation and control box to the satellite communication system. These data are used to point the communication antenna system to the communication satellites, so that additional positioning system and attitude sensors are saved.

Referring to FIG. 1, a universal navigation and control box 14 is connected to a data bus 15. The data bus 15 is a standard bus, such as MIL1553B bus, ARINC 429 bus, ARINC 629 bus. A flight management system 11, a flight control system 12, an automatic dependent surveillance 13, a cockpit display 16, an enhanced ground proximity warning system 17, a weather radar 18, and a satellite communication system 19 are also connected to the data bus 15. The data bus 15 is responsible of transferring data between the universal navigation and control box 14, the flight management system 11, the flight control system 12, the automatic dependent surveillance 13, the cockpit display 16, the enhanced ground proximity warning system 17, the weather radar 18, and a satellite communication system 19.

Figure 2:
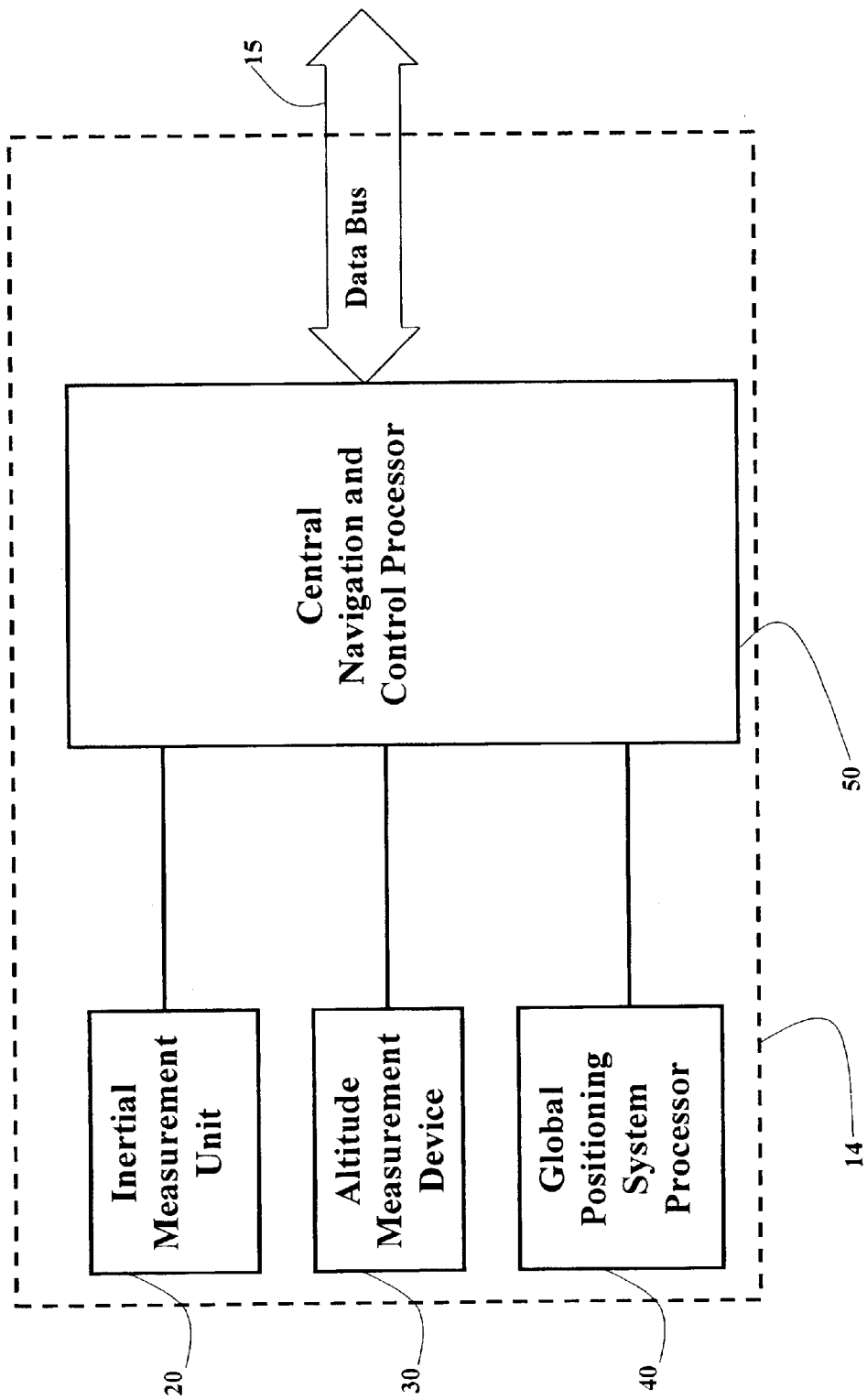
FIG. 2 is a block diagram of an universal navigation and control box according to the present invention.

Referring to FIG. 2, the universal navigation and control box 14 comprises an inertial measurement unit 20, an altitude measurement device 30, and a global positioning system processor 40 which are connected to a central navigation and control processor 50 respectively. The central navigation and control processor 50 is connected to the data bus 15.

Figure 3:
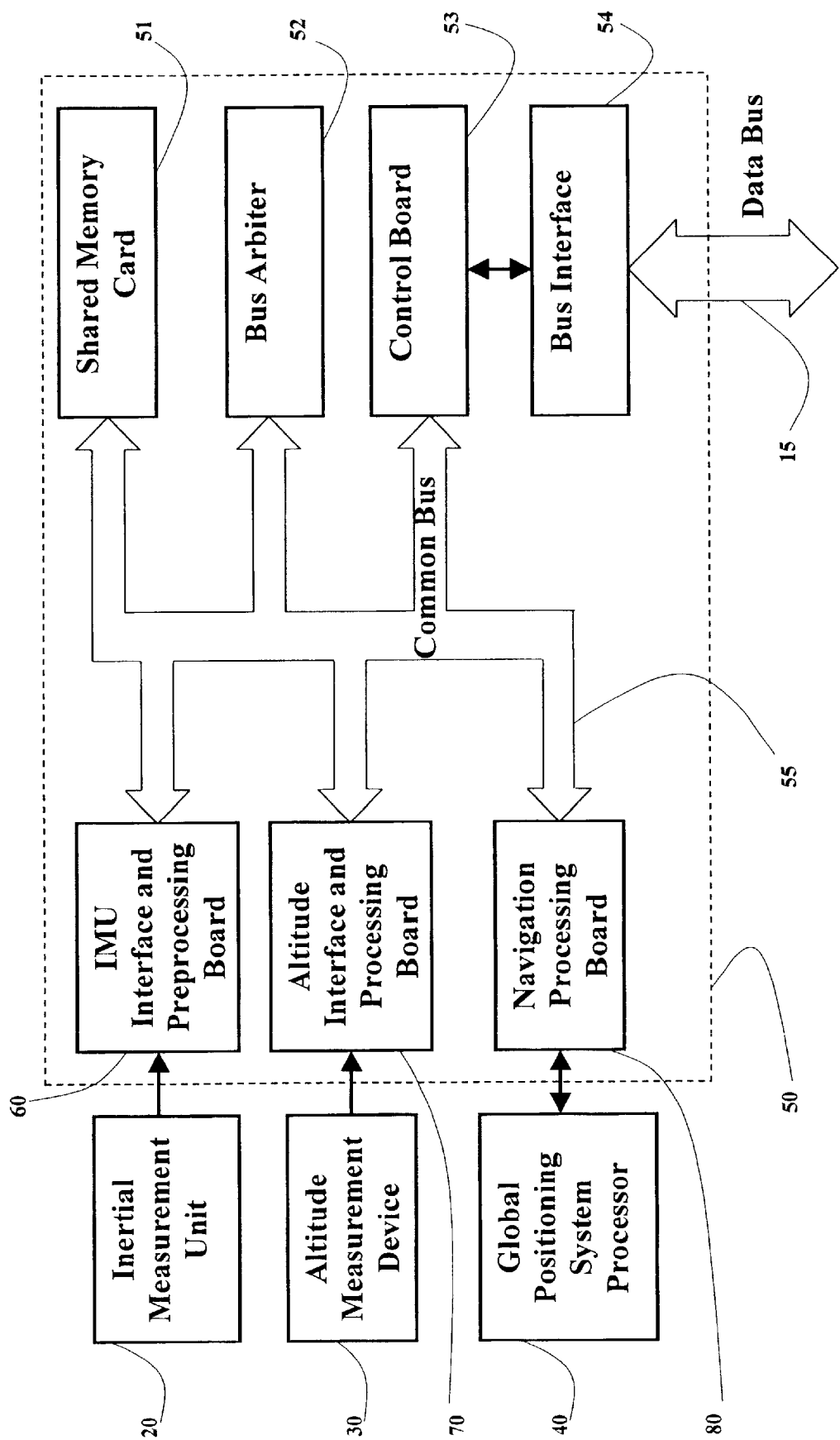
FIG. 3 is a block diagram illustrating the configuration of a universal navigation and control box according to the present invention.

Referring to FIG. 3, the central navigation and control processor 50 comprises an IMU interface and preprocessing board 60, an altitude interface and preprocessing board 70, a navigation processing board 80, a shared memory card 51, a bus arbiter 52, and a control board 53 which are mutually connected through a common bus 55. The central navigation and control processor 50 further comprises a bus interface 54 which provides connection between the control board 53 and the data bus 15.

Referring to FIGS. 1, 2, 3, 4, 5a, 6a, 7, 8, 9, 10, 11, 12, 13, 16, 17, and 18, a first preferred embodiment of the present invention is illustrated, which comprises the steps as follows:

1) Perform GPS processing and receive GPS measurements, including pseudorange, carrier phase, Doppler shift, and time from the global positioning system processor 40, and pass them to the navigation processing board 80 of the central navigation processor 50.

2) Receive inertial measurements including body angular rates and specific forces, from the inertial measurement unit 20, convert them into digital data of body acceleration and rotation by the IMU interface and preprocessing board 60, and send them to the navigation processing board 80 and the control board 53 via the common bus 55.

3) Receive an altitude measurement from the altitude measurement device 30, convert it to mean sea level (MSL) height in digital data type by the altitude interface and processing board 70, and pass it to the navigation processing board 80 and the control board 53 through the common bus 55.

4) Perform inertial navigation system (INS) processing using an INS processor 81.

5) Blend the output of the INS processor 81, the altitude measurement, and the GPS measurements in a Kalman filter 83.

6) Feed back the output of the Kalman filter 83 to the INS processor 81 to correct the INS navigation solution.

7) Inject velocity and acceleration data from the INS processor 81 into a signal processor 45 of the global positioning system processor 40 to aid the code and carrier phase tracking of the global positioning system satellite signals.

8) Inject the output of the signal processor 45 of the global positioning system processor 40, the output of the INS processor 81, the output of the Kalman filter 83 into a carrier phase integer ambiguity resolution module 82 to fix the global positioning system satellite signal carrier phase integer ambiguity number.

9) Output the carrier phase integer number from the carrier phase integer ambiguity resolution module 82 into the Kalman filter 83 to further improve the positioning accuracy.

10) Output the navigation data which are platform velocity, position, altitude, heading and time from the INS processor 81 to the control board 53 through the common bus 55.

11) Send the platform position, velocity, attitude, heading, and time data to the flight management system 11.

12) Send the platform velocity, attitude, body acceleration and rotation data to the flight control system 12.

13) Send the platform position and time data to the automatic dependent surveillance 13.

14) Send the platform position, velocity, and attitude data to the enhanced ground proximity warning system 17.

15) Send the platform attitude and body acceleration data to the weather radar 18.

16) Send the platform position and attitude data to the satellite communication system 19.

In step (1), the GPS satellites transmit the coarse acquisition (C/A) code and precision (P) code on radio frequency (RF) at L1 band:

$$S_{l1}(t)=\sqrt{2P_c}CA(t)D(t)\cos(\omega_1 t+\phi)+\sqrt{2P_p}P(t)D(t)\sin(\omega_1 t+\phi)$$

The GPS satellites transmit the precision (P) code on radio frequency (RF) at L2 band:

$$S_{l2}(t)=\sqrt{2P_2}P(t)D(t)\cos(\omega_2 t+\phi_2)$$

where, $\omega_1$ is the L1 radian carrier frequency, $\phi$ is a small phase noise and oscillator drift component, $P_c$ is the C/A signal power, $P_p$ is the P signal power, D(t) is the navigation data, CA(t) is the C/A code, P(t) is the P code, $\omega_2$ is the L2 radian carrier frequency, $P_2$ is the L2-P signal power, $\phi_2$ is a small phase noise and oscillator drift component.

Figure 5A:
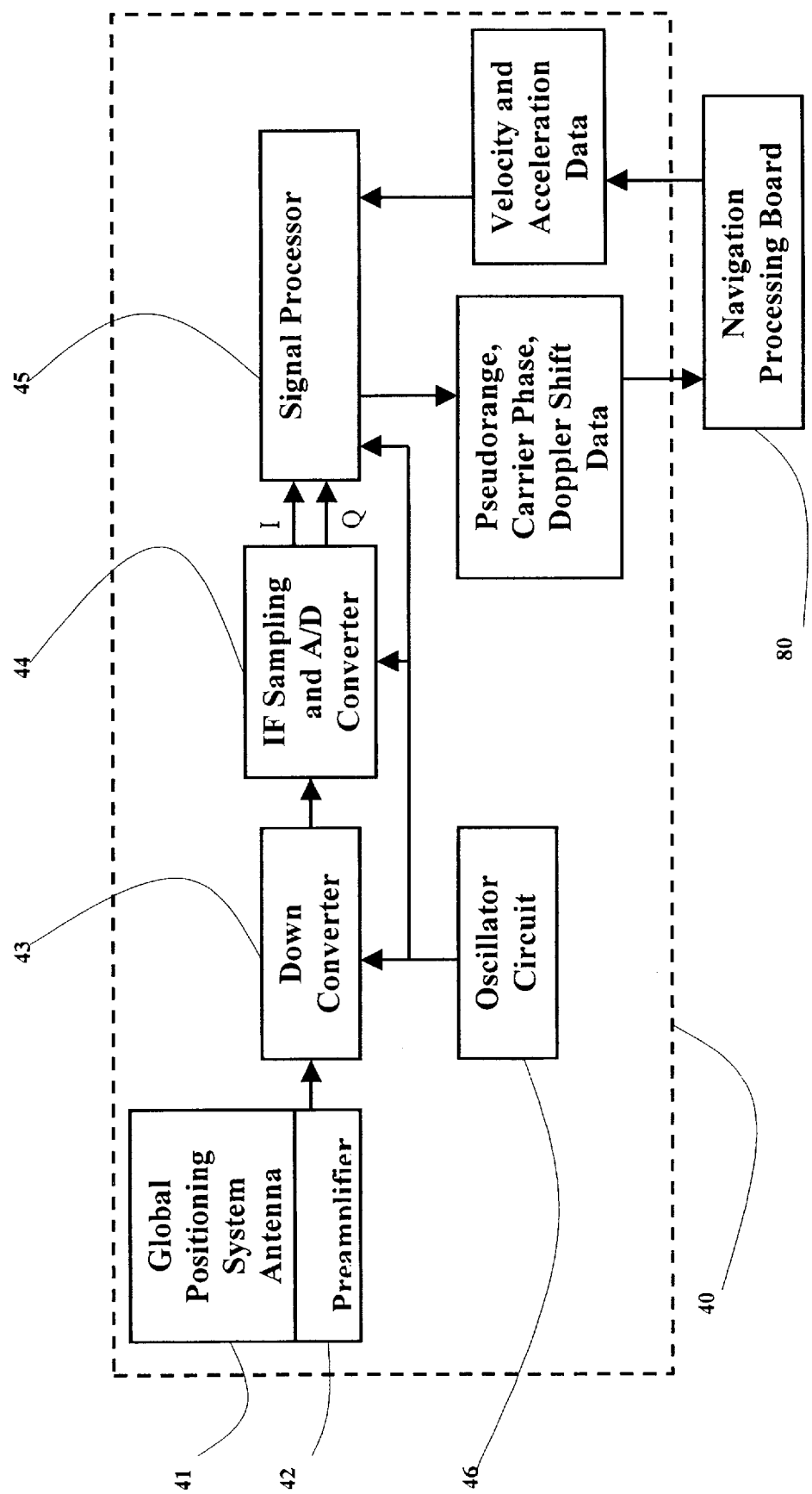
FIG. 5a is a block diagram of the global positioning system processor with external aiding from the navigation processing board according to a first preferred embodiment of the present invention.

In step (1), as shown in FIG. 5a, the received RF signals at the global positioning system antenna 41 are, respectively:

$$S_{l1}(t)=\sqrt{2P_c}CA(t-\tau)D(t)\cos[(\omega_1+\omega_d)t+\phi)]+\sqrt{2P_p}P(t)D(t)\sin[(\omega_1+\omega_d)t+\phi)]$$

$$S_{l2}(t)=\sqrt{2P_2}P(t-\tau)D(t)\cos[(\omega_2+\omega_d)t+\phi_2)]$$

where, $\tau$ is the code delay, $\omega_d$ is the Doppler radian frequency.

In step (1), as shown in FIG. 5a, the received GPS RF signals are amplified by a preamplifier circuit 42. The amplified GPS RF signals are then passed to a down converter 43 of the global positioning system processor 40. The down converter 43 converts the amplified radio frequency (RF) signal to intermediate frequency (IF) signal. The IF signal is processed by an IF sampling and A/D converter 44 to convert the IF signal to that of in-phase (I) and quadraphase (Q) components of the signal envelope. In the IF sampling and A/D converter 44, the IF signal which is analog signal, is first filtered by a low pass filter, and then sampled, finally converted from the analog signal to digital data (A/D). The digital data are input into a signal processor 45 to extract the navigation data modulated on the GPS signal, such as the GPS satellite ephemeris, atmosphere parameters, satellite clock parameter, and time information. The signal processor 45 also processes the digital data from the IF sampling and A/D converter 34 to derive the pseudorange, carrier phase, and Doppler frequency shift. In global positioning system processor 40, an oscillator circuit 46 provides the clock signal to the down converter 43, the IF sampling and A/D converter 44, and the signal processor 45.

Referring to FIG. 5a, in step (1), the signal processor 45 outputs the GPS measurements, including pseudorange, carrier phase, and Doppler shift, and the time data to the navigation processing board 80. In step (7), the signal processor 45 receives the velocity and acceleration information from the navigation processing board 80 to perform external velocity-acceleration aiding code and carrier phase tracking.

Figure 6A:
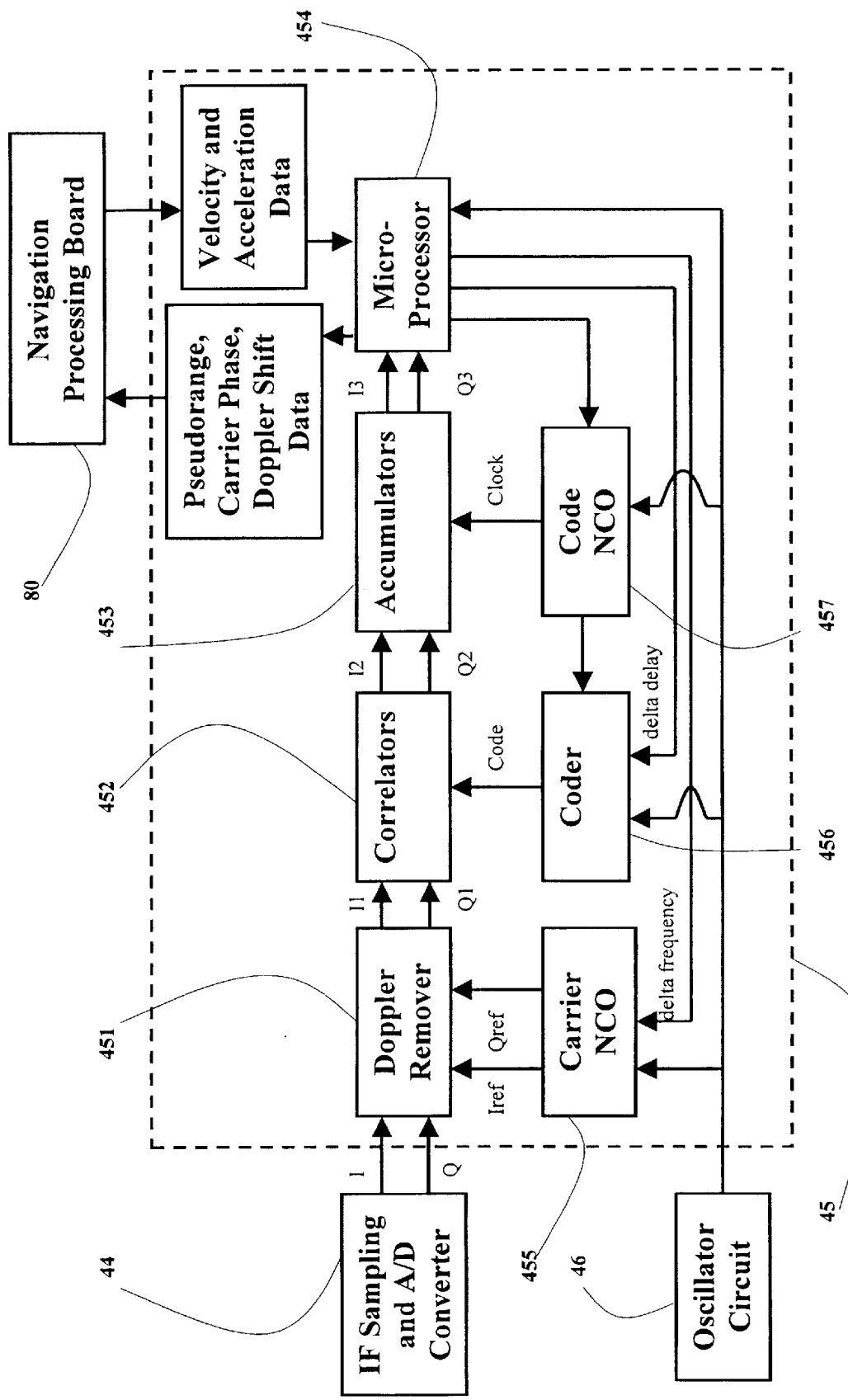
FIG. 6a is a block diagram of the signal processor of the global positioning system processor with external aiding from the navigation processing board according to the first preferred embodiment of the present invention.

Referring to FIG. 6a, in step (1) the pseudorange measurements are derived from the GPS code tracking loop which comprises a correlators 452, an accumulators 453, a micro-processor 454, a code NCO (numerical controlled oscillator) 457, and a coder 456. The Doppler shift and carrier phase measurements are obtained from the GPS satellite signal carrier phase tracking loop which comprises a Doppler removal 451, correlators 452, accumulators 453, a micro-processor 454, and a carrier NCO (numerical controlled oscillator) 455.

Referring to FIG. 6a, in step (1), the digital data (I and Q) from the IF sampling and A/D converter 44 are processed by a Doppler remover 451 to remove the Doppler shift modulated on the GPS satellite signal. The Doppler remover 451 is used by the carrier tracking loop to track the phase and frequency of the incoming signal. The Doppler removal is accomplished with a digital implementation of a single sideband modulator. The carrier NCO (numerical controlled oscillator) 455 accumulates phase at its clocking rate based upon a frequency number input. Every time when its accumulator rolls over, a new cycle is generated. The time that it takes to do is a cycle period. The clock from the oscillator circuit 46 and the delta frequency from the micro-processor 454 drive the carrier NCO 455. The carrier NCO 455 outputs in-phase and quadraphase components of reference phase (Iref and Qref). The reference phase is output to the Doppler remover 451.

Referring to FIG. 6a, in step (1), the GPS satellite signal after Doppler removal processing is passed to a correlators 452 in which the correlation process is performed. The accumulators 453 follows the correlators 452 which makes up the postcorrelation processing and filters the correlated signal components (I2 and Q2) prior to processing in the microprocessor. The accumulation process is simply the accumulation of the correlated samples over T seconds, where T is usually a C/A code epoch periods of one ms. The accumulations (I3 and Q3) are stored and collected by the microprocessor 454, and the accumulators 453 are dumped, resulting in an accumulated-an-dump filtering of the signal components.

Referring to FIG. 6a, in step (1), the code used in the correlators 452 comes from a coder 456 which is driven by the clock from the oscillator 46 and the delta delay from the microprocessor 454. The coder 456 is responsible for generation of C/A code and/or P code. The accumulators 453 is driven by the clock generated from a code NCO 457 which is driven by the oscillator 46 and microprocessor 454. The code NCO 457 also drives the coder 456.

Referring to FIG. 6a, in step (7), the microprocessor 454 receives data from the accumulators 453 and the velocity and acceleration data from the navigation processing board 80 to perform loop filtering acquisition processing, lock detection, data recovery, and measurement processing. This working mode is referred to as velocity-acceleration aiding carrier phase and code tracking. In step (1), the microprocessor 454 outputs the GPS measurements, including pseudorange, carrier phase, and Doppler shift, as well as time information to the navigation processing board 80.

Referring to FIG. 6a, in step (1), when the tracking error of GPS signal in the signal tracking loop of the signal processor 45 is larger than the tracking bandwidth of the signal tracking loop, the loss of GPS satellite signal occurs. A loss of lock status of the tracking loop is mainly caused by the low signal-noise ratio (SNR) and Doppler drift of the received satellite signals. The former may be generated by inputting noise or jamming. The latter, Doppler drift, is caused by high-speed movement of the vehicle. Generally, the expansion of the bandwidth of the tracking loop can improve the Phase-Locked Loop (PLL) tracking capability in a high dynamic environment but can simultaneously can corrupt anti-interference capability of the GPS receiving set because more unwanted noise signals are allowed to enter the GPS signal tracking loops. The aiding of GPS signals with corrected INS (inertial navigation system) solution is to obtain an optimal trade-off between GPS tracking loop bandwidth and anti-jamming capabilities.

Referring to FIG. 6a, in step (7) the purpose of the corrected INS velocity-acceleration information aided GPS PLL loop is to estimate the carrier phase of the intermediate frequency signal $\theta_I(t)$ rapidly and accurately over a sufficiently short estimation period, and $\theta_I(t)$ is approximated by $$\theta_I(t)=\theta_{I0}+\omega_{I0}t+\gamma_{I0}t^2+\delta_{I0}t^3+\ldots$$

The problem herein becomes to estimate the parameters of the above equation. The velocity-acceleration information, which describes the flight vehicle dynamic characteristics, is translated into the line-of-sight (LOS) velocity-acceleration information. Therefore, the estimate of the carrier phase of the intermediate frequency signal can be formulated by LOS velocity-acceleration values as follows:

$$\theta(t)=b_1 V^{LOS}t+b_2 A^{LOS}t^2+b_3 a^{LOS}t^3+\ldots$$

where ($b_1$, $b_2$, $b_3$) are constants related to the carrier frequency and the speed of light, and are given by $$b_1 = \frac{4\pi f_c}{c}, b_2 = \frac{2\pi f_c}{c}, b_3 = \frac{4\pi f_c}{3c}$$

$V^{LOS}$, $A^{LOS}$ and $a^{LOS}$ correspond to the range rate, the range acceleration and the range acceleration rate along the LOS between the satellites and the receiver. Therefore, the tracking and anti-interference capabilities of the aided PLL loop seriously depend on the accuracy of $V^{LOS}$ and $A^{LOS}$ estimation. The $V^{LOS}$ and $A^{LOS}$ can be calculated from the information of velocity and acceleration coming from the INS processor 81 and then be incorporated into the loop filter in the microprocessor 454.

Referring to FIG. 6a, in step (1), the code tracking loop of the signal processor 45 tracks the code phase of the incoming direct sequence spread-spectrum signal. The code tracking loop provides an estimate of the magnitude of time shift required to maximize the correlation between the incoming signal and the internally generated punctual code. This information of time delay is used by the microprocessor 454 to calculate an initial vehicle-to-satellite range estimate, known as the pseudorange. In step (7), the information of velocity and acceleration coming from the navigation processing board 80 is transformed into the LOS velocity and acceleration ($V^{LOS}$ and $A^{LOS}$) which are used to precisely estimate the code delay. By this way, the dynamic performance and anti-jamming capability are enhanced.

The IMU interface and preprocessing board 60 includes an analog signal interface 61, a serial signal interface 62, a pulse signal interface 63, and/or a parallel digital signal interface 64, which are installed between the inertial measurement unit 20 and the common bus 55. They are used to convert the IMU signal obtained from the inertial measurement unit 20 into digital data of body acceleration and rotation, and then to pass the converted digital data to the navigation processing board 80 and the control board 53 via the common bus 55.

Figure 7:
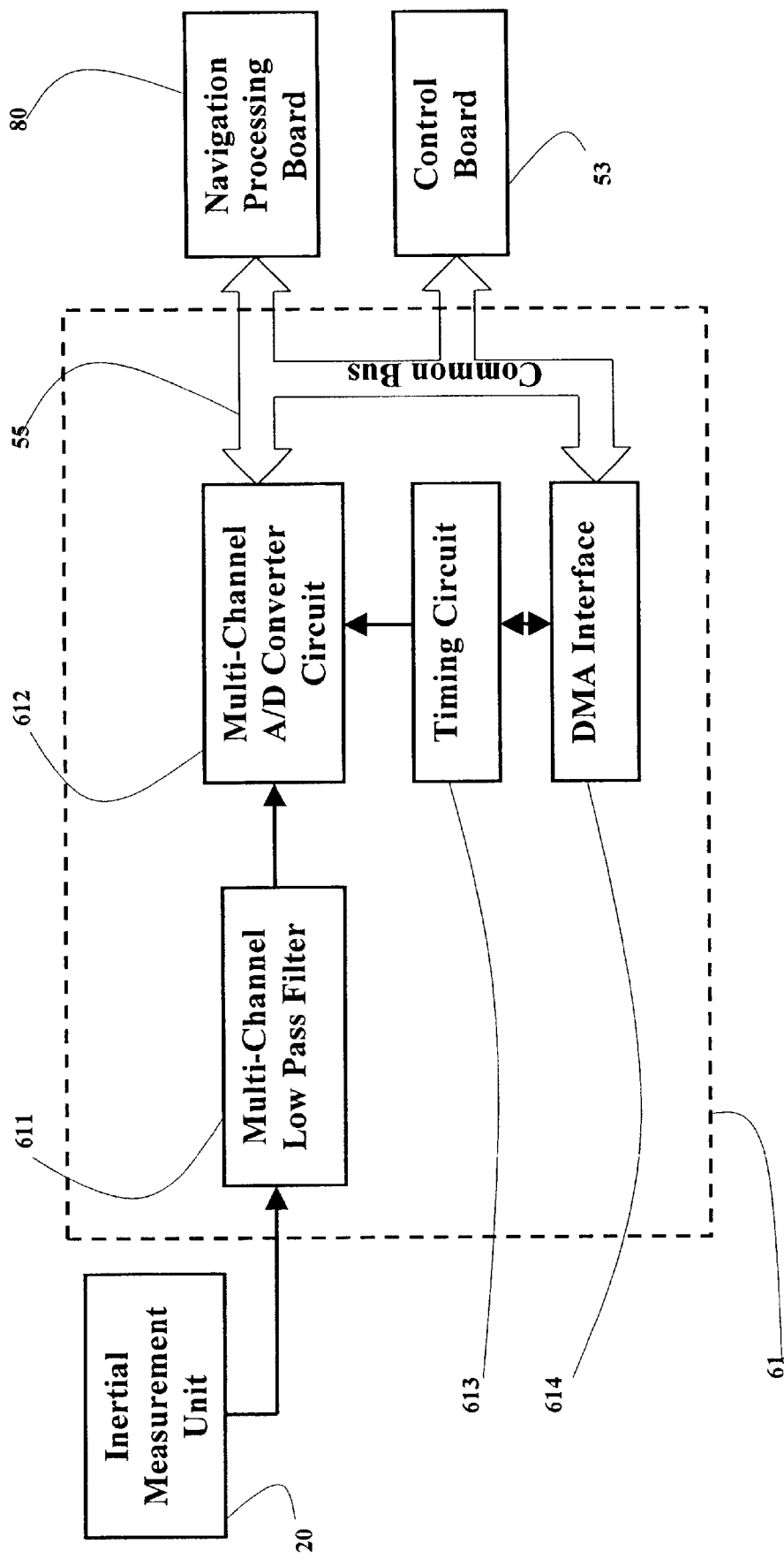
FIG. 7 is a block diagram of an analog signal interface according to the present invention.

In many applications, the outputs of the IMU are analog signals, especially for low performance IMUs, which are often used with a GPS receiver to form an integrated system. As shown in FIG. 7, the analog signal interface 61 is a multi-channel A/D converter circuit board for converting analog IMU signals into digital data, which comprises a multi-channel low pass filter 611 connected to the inertial measurement unit 20, a multi-channel A/D converter circuit 612 connected between the multi-channel low pass filter 611 and the common bus 55, and a DMA interface 614 connected to the common bus 55. The analog interface 61 further comprises a timing circuit 613 connected between the multi-channel A/D converter circuit 612 and the DMA interface 614.

Referring to FIG. 7, in step (2), the analog IMU signals from the inertial measurement unit 20 are filtered by the multi-channel low pass filter 611. The filtered analog IMU signals are sent to the multi-channel A/D converter circuit 612. The timing circuit provides sampling frequency for the multi-channel A/D converter circuit 612. The multi-channel A/D converter circuit 612 samples and digitizes the filtered analog IMU signals. Timing circuit 613 also triggers the DMA interface 614. After sampling and digitizing operation of the multi-channel A/D converter circuit 612, the DMA interface informs the navigation processing board 80 and the control board 53 via the common bus 55 to get IMU data on the common bus 55. After receiving of the DMA signal by the navigation processing board 80 and the control board 53, the multi-channel A/D converter circuit 612 outputs the digitized IMU data on the common bus 55.

Figure 8:
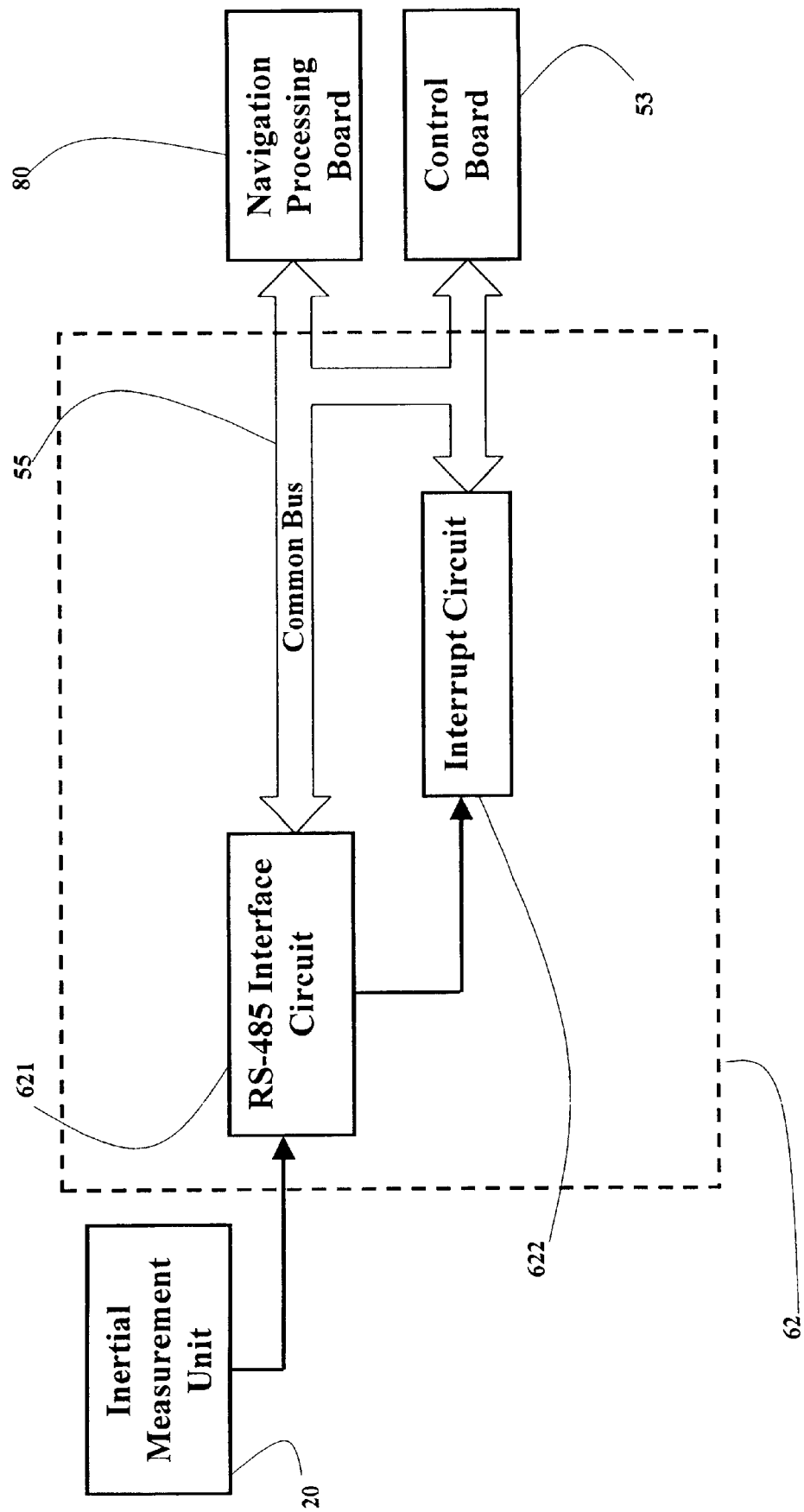
FIG. 8 is a block diagram of a serial signal interface according to the present invention.

Since most IMU manufacturers trend to embed a high performance microprocessor into the IMU to form a so-called "smart" IMU, in which the IMU output signals are sent out by the microprocessor through a standard serial bus, for example, RS-422/485, 1533 bus, etc., as shown in FIG. 8, the serial signal interface 62 is a multi-channel RS-485 communication control circuit board for receiving serial IMU data, which comprises an RS-485 interface circuit 621 connected between the inertial measurement unit 20 and the common bus 55, and an interrupt circuit 622 connected between the RS-485 interface circuit 621 and the common bus 55.

Referring to FIG. 8, in step (2), the RS-485 interface circuit 621 receives the serial IMU signal from the inertial measurement unit 20. Once the receiving operation is finished, the RS-485 interface circuit informs the interrupt circuit 622. The interrupt circuit then tells the navigation processing board 80 and the control board 53 via the common bus 55 that the IMU data is ready. After receiving interrupt signal from the interrupt interface 622 by the navigation processing board 80 and the control board 53 via the common bus 55, the RS-485 interface circuit outputs the IMU data on the common bus 55. The navigation processing board 80 and the control board 53 get the IMU data which are body rates and accelerations from the common bus 55.

Figure 9:
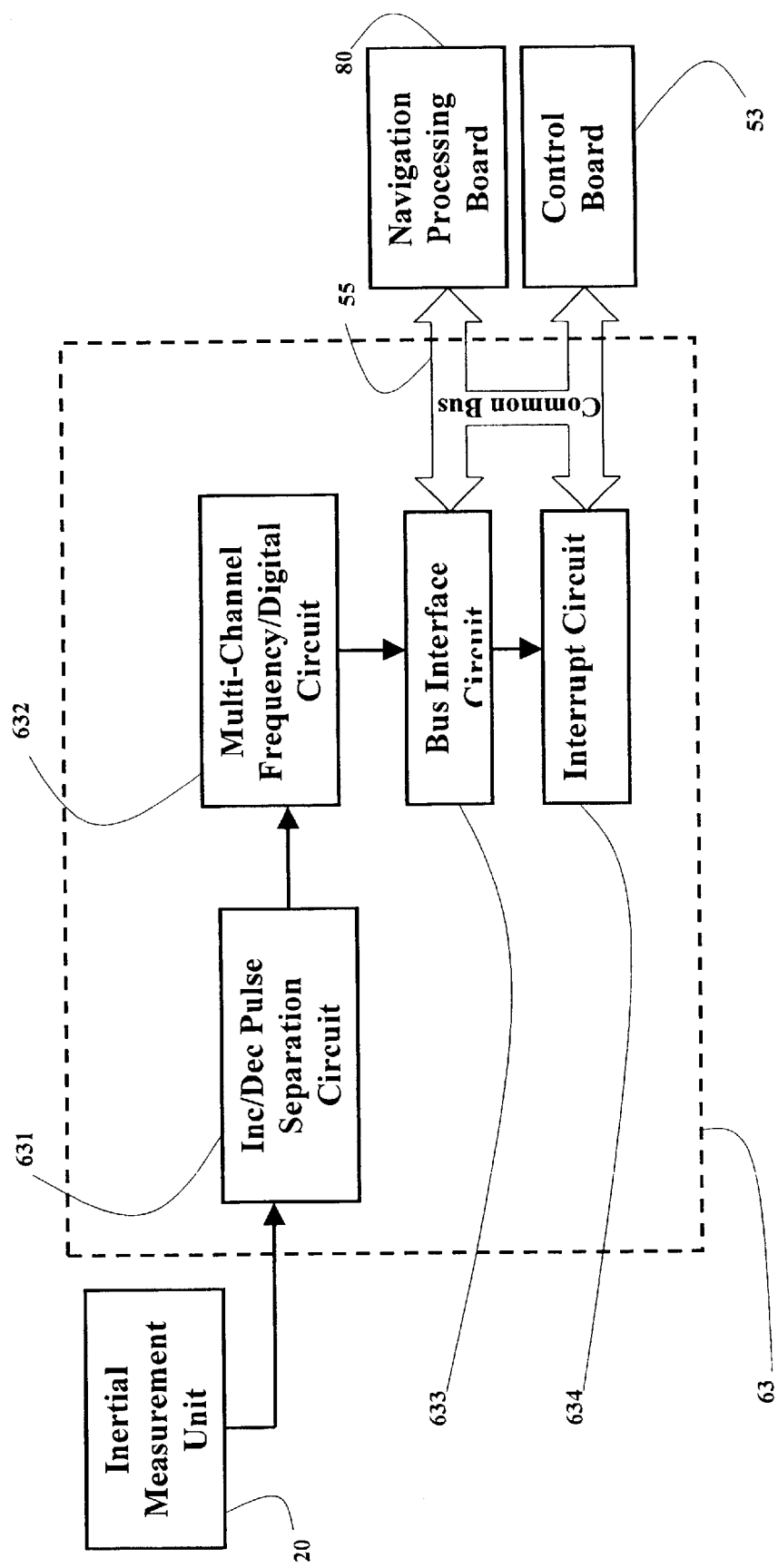
FIG. 9 is a block diagram of a pulse signal interface according to the present invention.

Due to the fact that most high performance gyros and accelerometers provide pulse outputs, RLG and FOG are inherently digital sensors, and many high performance electromechanical gyros and accelerometers have a pulse modulated force rebalance loop. As shown in FIG. 9, the pulse signal interface 63 is a multi-channel frequency/digital converter circuit board 63 for receiving pulse IMU signals, which comprises an Inc/Dec pulse separation circuit 631 connected to the inertial measurement unit 20, a bus interface circuit 633 and an interrupt circuit 634 connected to the common bus 55 respectively. The multi-channel frequency/digital converter circuit board 63 further comprises a multi-channel frequency/digital circuit connected between the Inc/Dec pulse separation circuit 631 and the bus interface circuit 633.

Referring to FIG. 9, in step (2), the pulse IMU signals are passed to the multi-channel frequency/digital circuit 632 via the Inc/Dec pulse separation circuit 631 from the inertial measurement unit 20, where the Inc/Dec pulse separation circuit 631 regulates the pulse IMU signals. The multi-channel frequency/digital circuit 632 converts the regulated pulse IMU signals into digital data. Once the conversion is finished, the digital IMU data are passed to the bus interface circuit 633. The bus interface circuit 633 coverts the digital IMU into common bus compatible digital data and outputs them to the common bus 55. The bus interface circuit 633 triggers the interrupt circuit 634 to generate interrupt signal. The interrupt signal informs the navigation processing board 80 and the control board 53 that the IMU data is ready via the common bus 55.

Figure 10:
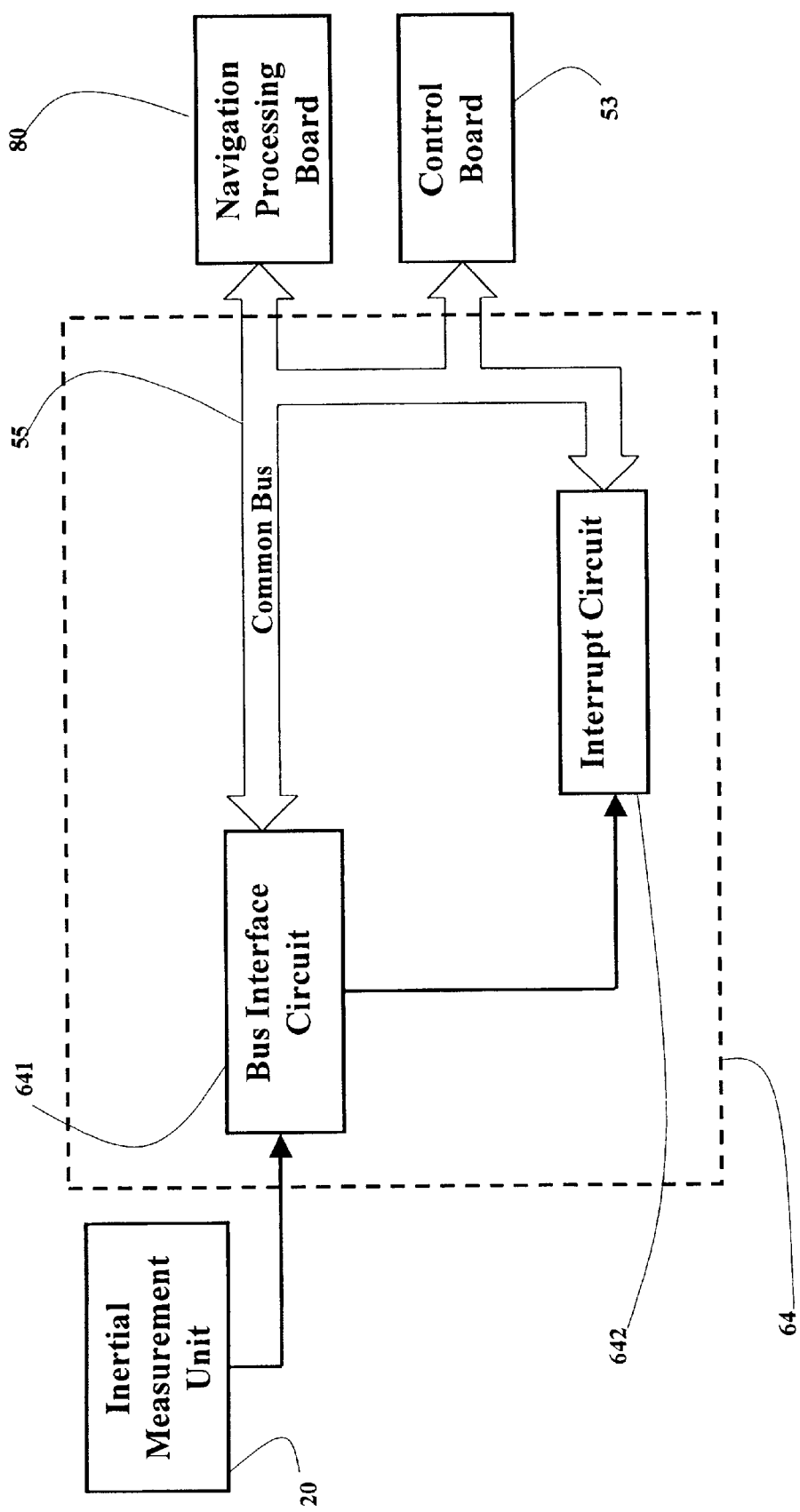
FIG. 10 is a block diagram of a parallel digital signal interface according to the present invention.

Some IMUs have embedded logic circuits or microprocessors which can output parallel digital signals or even implement a standard parallel bus. As shown in FIG. 10, the parallel digital signal interface 64 comprises a bus interface circuit 641 connected between the inertial measurement unit 20 and the common bus 55, and an interrupt circuit 642 connected between the bus interface circuit 641 and the common bus 55.

Referring to FIG. 10, in step (2), the parallel IMU signal are received by the bus interface circuit 641 from the inertial measurement unit 20 and converted into the common bus compatible data. After receiving the parallel IMU data, the bus interface circuit 641 triggers the interrupt circuit 642 to generate interrupt signal which is used to inform the navigation processing board 80 and the control board 53 via the common bus 55 that the IMU data are ready. The bus interface circuit 641 outputs the IMU to the common bus 55, and the navigation processing board 80 and the control board 53 receive the IMU data from the common bus 55.

According to possible types of the IMU output signals, we designed different types of signal converting circuits to produce digital data of body acceleration and rotation. These signal converting circuits are designed as a series of optional modules to accommodate diverse original IMU signal outputs. In this design, the entire universal navigation and control box is re-configurable.

It is well known that global positioning system has a poor accuracy of vertical positioning. The long term accuracy of global positioning and inertial navigation system integration solution mainly depends on the performance of the global positioning system. It means that the global positioning and inertial integrated navigation system can not improve the vertical positioning performance. In the present invention, an altitude measurement device is incorporated to improve this drawback.

There are many different altitude measurement devices, such as barometric device 31 and radar altimeter 32. The altitude interface and processing board 70 includes a barometric device interface 71 and a radar altimeter interface 72. They are used to convert the measurement of a barometric device 31 or a radar altimeter 32 into digital data of platform height over mean sea level (MSL).

Figure 11:
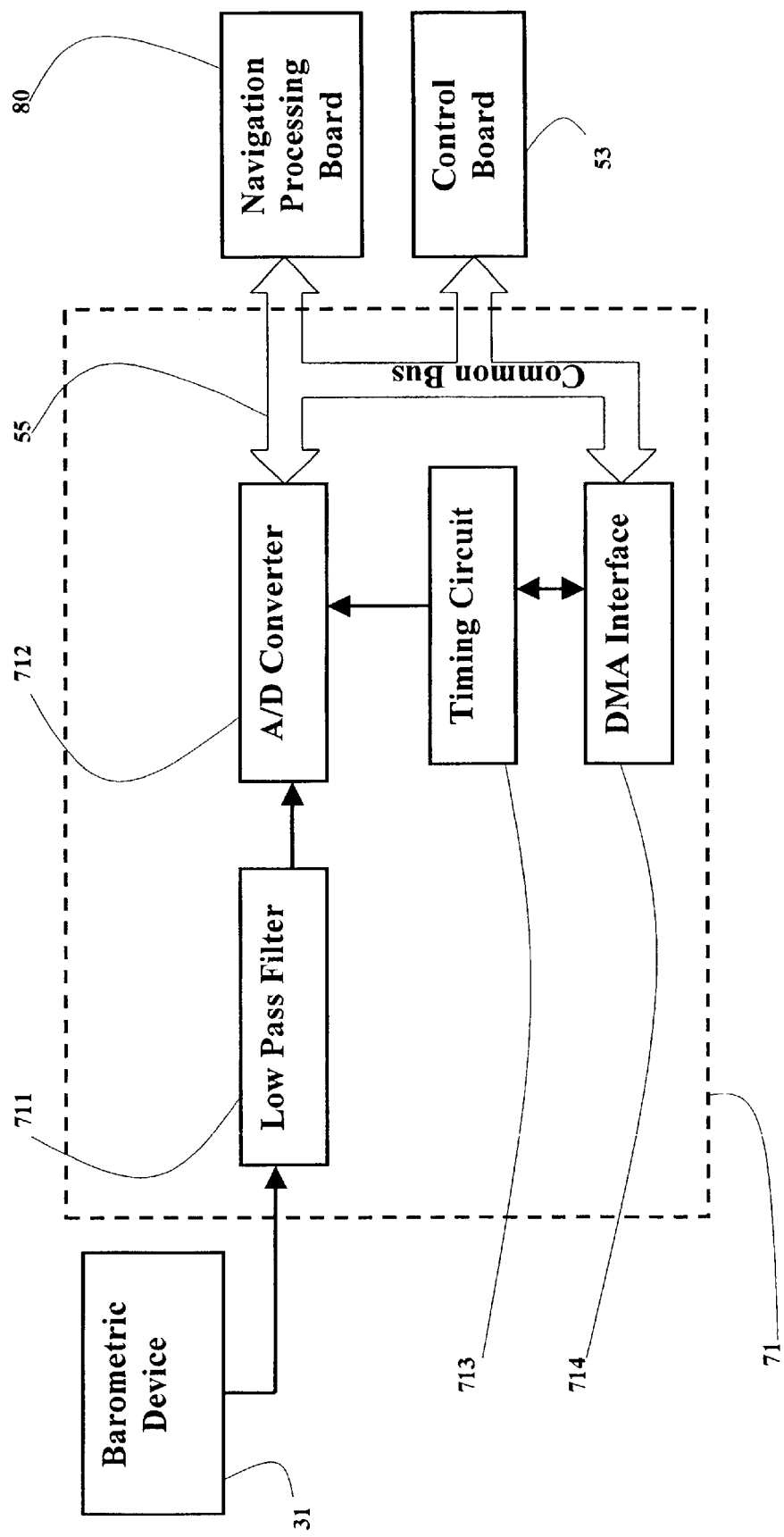
FIG. 11 is a block diagram illustrating the altitude interface and preprocessing board for a barometric device according to the present invention.

Many airplanes equipped with barometric device which provides the airplane height above the MSL. As shown in FIG. 11, the barometric device interface 71 is a multi-channel A/D converter circuit board for converting analog height information into digital data, which comprises a low pass filter 711 connected to the barometric device 31, an A/D converter circuit 712 connected between the low pass filter 711 and the common bus 55, and a DMA interface 714 connected to the common bus 55. The barometric device interface 71 further comprises a timing circuit 713 connected between the A/D converter circuit 712 and the DMA interface 714.

Referring to FIG. 11, in step (3), the analog altitude signal from the barometer device 31 is filtered by the low pass filter 711. The filtered analog altitude signal is sent to the A/D converter 712. The timing circuit 713 provides sampling frequency for the A/D converter 712. The A/D converter 712 samples and digitizes the filtered analog altitude signal. Timing circuit 713 also triggers the DMA interface 714. After sampling and digitizing operation of the A/D converter 712, the DMA interface informs the navigation processing board 80 and the control board 53 via the common bus 55 to get altitude data on the common bus 55. After receiving of the DMA signal by the navigation processing board 80 and the control board 53, the A/D converter 712 outputs the digitized altitude data on the common bus 55.

Figure 12:
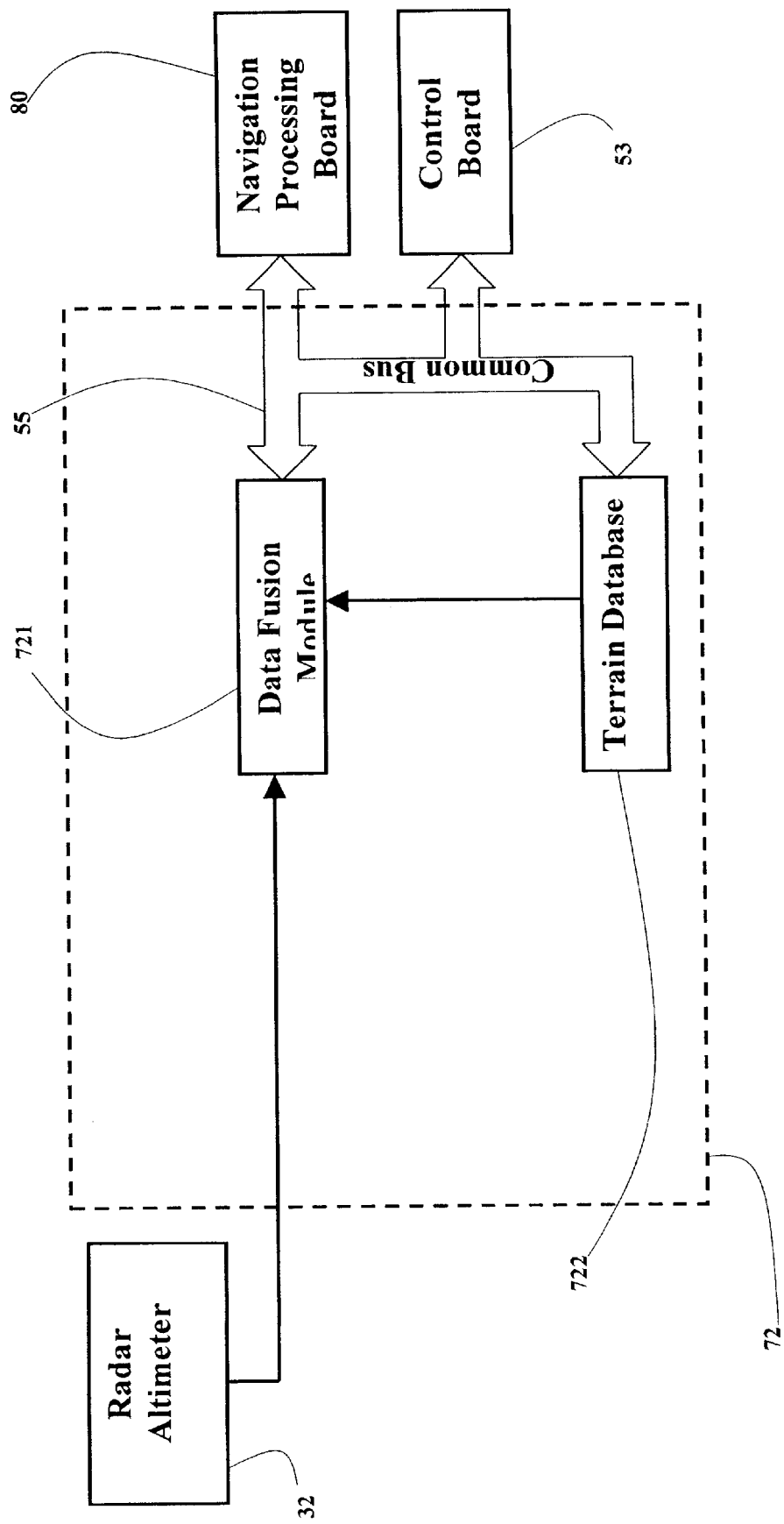
FIG. 12 is a block diagram illustrating the altitude interface and preprocessing board for a radar altimeter according to the present invention.

Many airplanes also equipped with radar altimeter which provides the airplane height above the terrain. The height produced by a radar altimeter is called terrain altitude. As shown in FIG. 12, the radar altimeter interface 72 comprises a data fusion module 721 connected between the radar altimeter 32 and the common bus 55, and a terrain database 722 connected between the data fusion module 721 and the common bus. The terrain database 722 receives the position information from the navigation processing board 80 through the common bus 55. Based on current position, the database queries the terrain elevation above the MSL and output it to the data fusion module 721. The data fusion module 721 combines the terrain altitude from the radar altimeter 32 and the terrain elevation from the terrain database 722 to generate the airplane height above the MSL.

Figure 13:
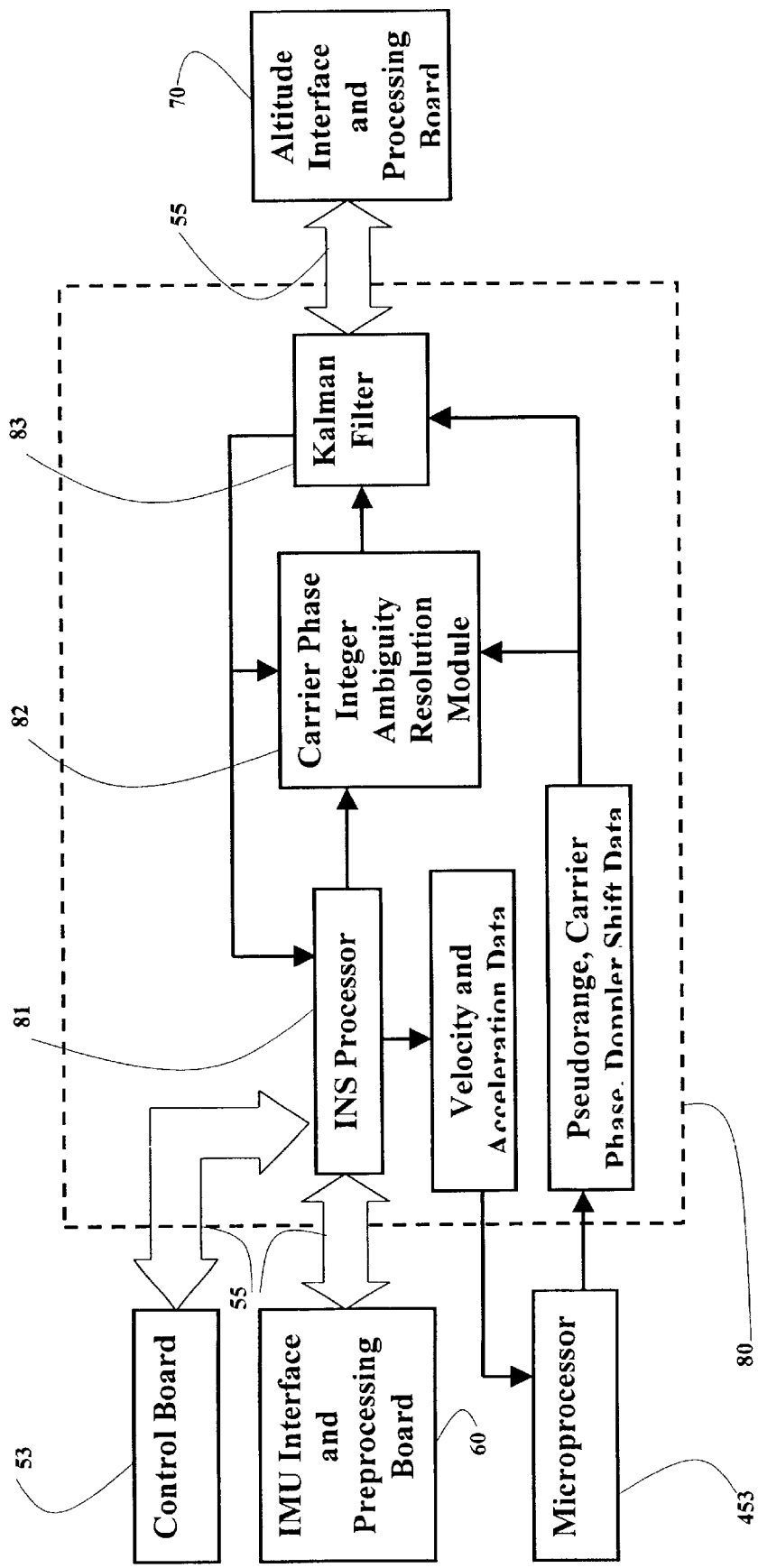
FIG. 13 is a block diagram of the integrated navigation processing of the navigation processing board, including the global positioning system, the inertial sensor, and altitude measurement device, according to the above first preferred embodiment of the present invention.

According to the first preferred embodiment of the present invention, the navigation processing board 80 is given in FIG. 13 in which the measurements coming from the inertial measurement unit 20, the signal processor 45 of global positioning system processor 40, and the altitude measurement device 30 are blended to derive high precision navigation information including 3 dimensional position, 3 dimensional velocity, and 3 dimensional attitude. These data are output from the INS processor 81 and are passed to the control board 53 through the common bus 55. As mentioned above, the velocity and acceleration information are also fed back to the signal processor 45 of the global positioning system processor 40 to aid the global positioning system satellite signal code and carrier phase tracking.

Referring to FIG. 13, in step (2), the IMU measurements coming from the IMU interface and preprocessing board 60, which are body rates and accelerations, are collected by an INS processor 81 to perform inertial navigation processing.

Figure 4:
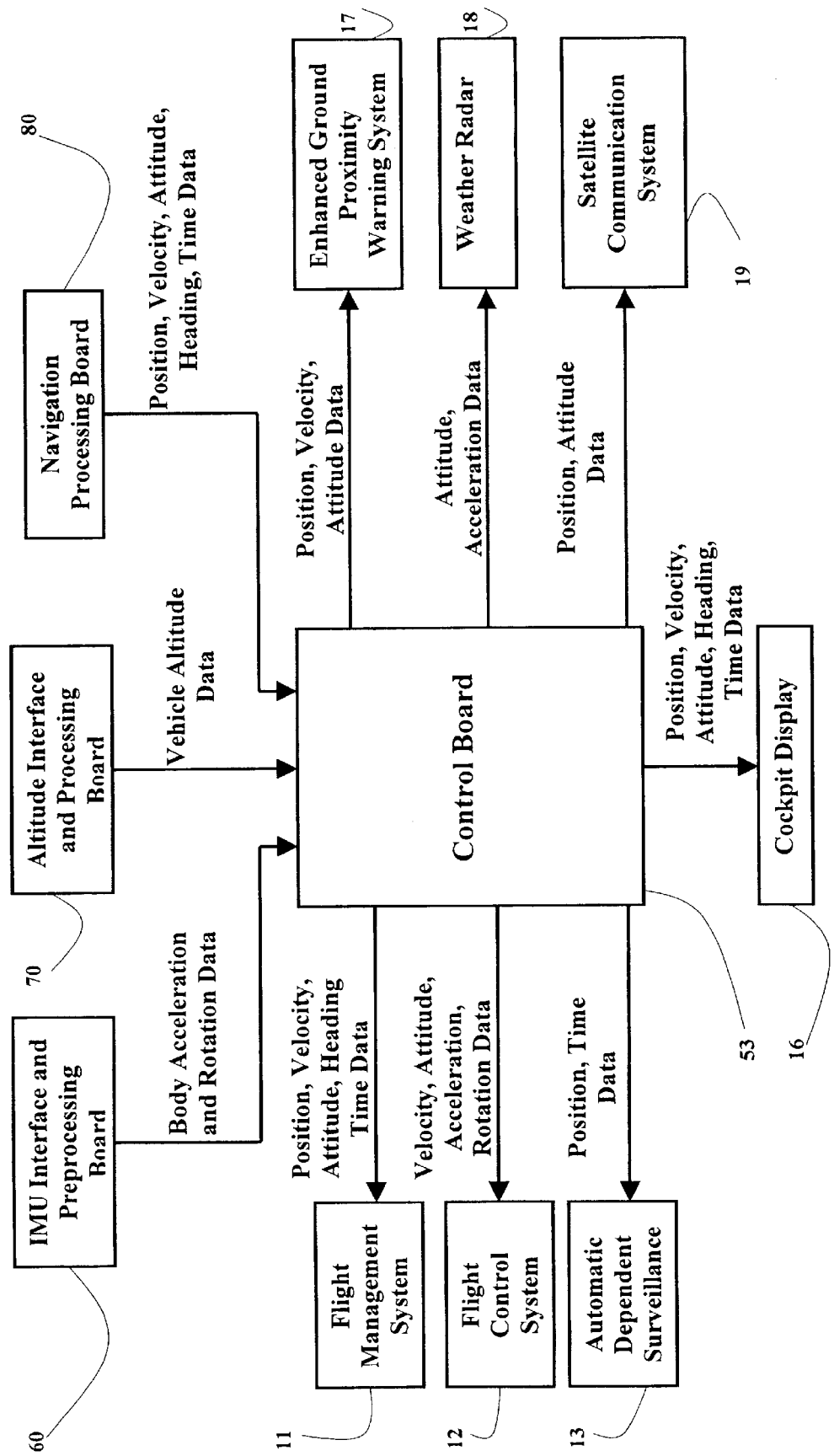
FIG. 4 is a block diagram illustrating the navigation and sensor data flow inside the universal navigation and control box, as well as the data flow between the control board and other avionics systems according to the present invention.

Referring to FIG. 4, in step (2), the IMU measurements coming from the IMU interface and preprocessing board 60, which are body rates and accelerations, are sent to the control board 53 through the common bus 55.

Referring to FIG. 13, in step (3), the altitude measurement coming from the altitude interface and processing board 70 is collected by a Kalman filter 83 to perform integrated filtering processing.

Referring to FIG. 4, in step (3), the altitude measurement coming from the altitude interface and processing board 70 is sent to the control board 53 through the common bus 55.

Referring to FIG. 13, in step (5), the microprocessor 454 of the global positioning system processor 40 outputs the pseudorange, Doppler shifts, global positioning system satellite ephemeris, as well as atmosphere parameters to the Kalman filter 83 in which the data from the INS processor 81, the altitude interface and processing board 70, the carrier phase integer ambiguity resolution module 42, and the microprocessor 454 of the global positioning system processor 40 are integrated to derive the position error, velocity error, and attitude error. In step (4), the INS processor 81 processes the inertial measurements, which are body angular rates and accelerations, and the position error, velocity error, and attitude error coming from the Kalman filter 83 to derive the corrected navigation solution. The navigation solution includes 3-dimensional position, 3-dimensional velocity, and 3-dimensional attitude. These data are output into the Kalman filter 83. On the other hand, in step (10), these data are also passed to the control board 53 via the common bus 55.

Figure 16:
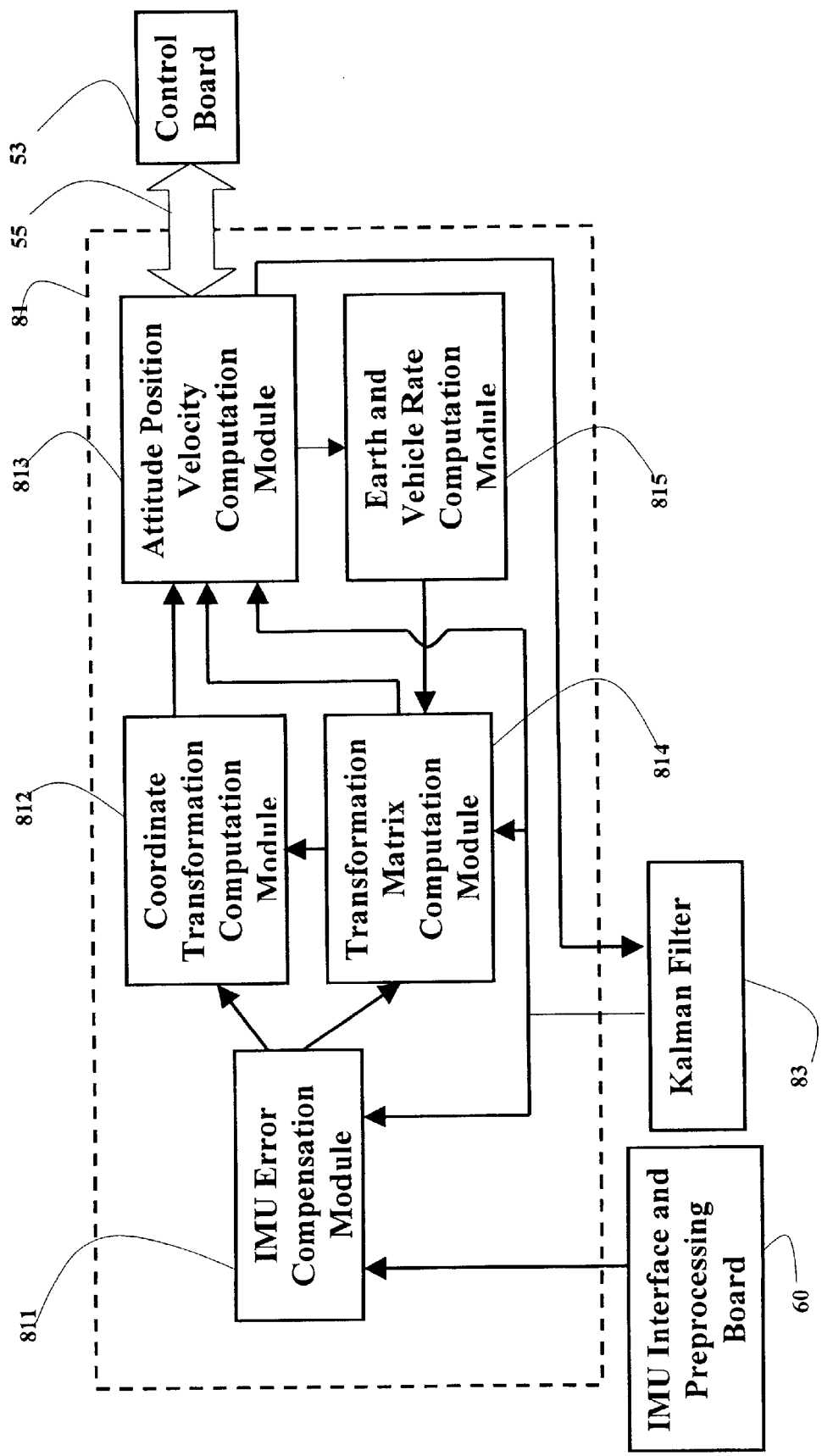
FIG. 16 is a block diagram of the inertial navigation system processing of the navigation processing board according to the above both preferred embodiment of the present invention.

As shown in FIG. 16, the INS processor 81 comprises an IMU error compensation module 811, a coordinate transformation computation module 812, an attitude position velocity computation module 813, a transformation matrix computation module 814, and an earth and vehicle rate computation module 815.

Referring to FIG. 16, in step (4), the IMU error compensation module 811 collects the body angular rates and accelerations data from the IMU interface and preprocessing board 60. These data are corrupted by the inertial sensor measurement errors. The IMU error compensation module 811 receives the sensor error estimates derived from the Kalman filter 83 to perform IMU error mitigation on the digitized IMU data. The corrected inertial data are sent to coordinate transformation computation module 812 and transformation matrix computation module 814, where the body angular rates are sent to the transformation matrix computation module 814 and the accelerations are sent the coordinate transformation computation module 812.

Referring to FIG. 16, in step (4), the transformation matrix computation module 814 receives the body angular rates from the IMU error computation module 811 and the earth and vehicle rate from the earth and vehicle rate computation module 815 to perform transformation matrix computation. The transformation matrix computation module 814 sends the calculated transformation matrix to the coordinate transformation computation module 812 and attitude position velocity computation module 813. The attitude update algorithm in the transformation matrix computation module 814 uses the quaternion method because of its advantageous numerical and stability characteristics. The differential equation of the relative quaternion between the body frame and the local navigation frame is:

$$\dot{q} = \tfrac{1}{2}[\Omega_b]q - \tfrac{1}{2}[\Omega_n]q$$

where, $q^T = [q_0\ q_1\ q_2\ q_3]$ is a four-component vector of quaternion parameters, $\Omega_b$ is the skew-symmetric matrix of the vector. $\omega_{ib}^{b}$, which is sensed by the gyro and is the rotation rate vector of the body frame (b) relative to the inertial frame (i) in the body frame.

$$[\Omega_b] = \begin{bmatrix} 0 & -\omega_{bx} & -\omega_{by} & -\omega_{bz} \\ \omega_{bx} & 0 & \omega_{bz} & -\omega_{by} \\ \omega_{by} & -\omega_{bz} & 0 & \omega_{bx} \\ \omega_{bz} & \omega_{by} & -\omega_{bx} & 0 \end{bmatrix},\ \omega_{ib}^b = [\omega_{bx},\omega_{by},\omega_{bz}]^T$$

$\Omega_n$ is the skew-symmetric matrix of the vector, $\omega_{in}^{n}$, which is the rotation rate vector of the local navigation frame (n) relative to the inertial frame in the navigation frame.

$$[\Omega_n] = \begin{bmatrix} 0 & -\omega_{nx} & -\omega_{ny} & -\omega_{nz} \\ \omega_{nx} & 0 & \omega_{nz} & -\omega_{ny} \\ \omega_{ny} & -\omega_{nz} & 0 & \omega_{nx} \\ \omega_{nz} & \omega_{ny} & -\omega_{nx} & 0 \end{bmatrix},\ \omega_{in}^b = [\omega_{nx},\omega_{ny},\omega_{nz}]^T$$

If the navigation frame is the local, level North, East, and Down (NED) navigation frame, then:

$$\omega_{in}^n = \begin{bmatrix} (\omega_c + \dot{\lambda})\cos L \\ -\dot{L} \\ -(\omega_c + \dot{\lambda})\sin L \end{bmatrix}$$

where, $\omega_c$ is the Earth's rotation rate, $L$ is the geodetic latitude, and $\lambda$ is the longitude.

Referring to FIG. 16, in step (4), the coordinate transformation module 812 collect s the specific forces from the IMU error computation module 811 and the transformation matrix from the transformation matrix computation module 814 to perform the coordinate transformation. The coordinate transformation computation sends the acceleration transferred into the coordinate system presented by the transformation matrix to the attitude position velocity computation module 813.

Referring to FIG. 16, in step (4), the attitude position velocity computation module 813 receives the transformed accelerations from the coordinate transformation computation module 812 and the transformation matrix from the transformation matrix computation module 814 to perform the attitude, position, velocity update. A general navigation equation that describes the motion of a point mass over the surface of the Earth or near the Earth has the following form:

$$\dot{V}(t) = a - (2\omega_{ic} + \omega_{cn}) \times V - \omega_{ic} \times \omega_{ic} \times r$$

where, a and V are the acceleration and velocity of the vehicle relative to the Earth in the navigation frame, $\omega_{ic}$ is the Earth rotation vector, $\omega_{cn}$ is the angular rate of the navigation frame relative to the earth, r is the position vector of the vehicle with respect to the Earth's center.

Because the accelerometers do not distinguish between vehicle acceleration and the mass attraction gravity, the specific vector, f, sensed by the accelerometers is:

$$f = a - g(r)$$

where, g(r) is a combination of the earth's gravity and the centrifugal force at the vehicle location. Thus, $$\dot{V}(t) = f - (2\omega_{ic} + \omega_{cn}) \times V + g(r)$$

where, $$\omega_{ic}^n = \begin{bmatrix} \omega_e \cos L \\ 0 \\ -\omega_e \sin L \end{bmatrix}, \omega_{cn}^n = \begin{bmatrix} \dot{\lambda} \cos L \\ -\dot{L} \\ -\dot{\lambda} \sin L \end{bmatrix}.$$

The vehicle velocity is updated by the following:

$$\dot{V}^n = C_b^n f^b + M V^n + g^n$$

where, $C_b^n$ is the direction cosine matrix from the body frame to the navigation frame, and $$V^n = \begin{bmatrix} v_n \\ v_e \\ v_d \end{bmatrix}, f^b = \begin{bmatrix} f_{bx} \\ f_{by} \\ f_{bz} \end{bmatrix}, g^n = \begin{bmatrix} 0 \\ 0 \\ g_d \end{bmatrix},$$

$$M = \begin{bmatrix} 0 & -(2\omega_e + \dot{\lambda}) \sin L & \dot{L} \\ (2\omega_e + \dot{\lambda}) \sin L & 0 & (2\omega_e + \dot{\lambda}) \cos L \\ -\dot{L} & -(2\omega_e + \dot{\lambda}) \cos L & 0 \end{bmatrix}.$$

Using the normal gravity formula for the WGS-84 ellipsoid results in the following expressions:

$$g_d = g_0 \left[ 1 - 2(1 + f + m) \frac{h}{a} + \left( \frac{5}{2} m - f \right) \sin^2 L \right]$$

$$(m = \omega_{ic}^2 a^2 b / GM)$$

where, $g_0$ is the gravity at the equator, f is the elliptical flattening, h is the altitude, a is the semi-major axis value, b is the semi-minor axis value, GM is the earth's gravitational constant.

The differential equations for the position update of the geodetic latitude, L, longitude, $\lambda$, and height, h, are given by:

$$\dot{L} = \frac{V_n}{R_M + h}, \dot{\lambda} = \frac{V_e}{(R_N + h)\cos L}, \dot{h} = -v_d$$

where, $R_M$ is the radius of the curvature in the Meridian, $R_N$ is the radius of the prime vertical.

Referring to FIG. 16, in step (4), after the computation of the position and velocity, the position and velocity errors calculated by the Kalman filter 83 are used in the attitude position velocity computation module 813 to correct the inertial solution. For the attitude correction, two methods can be applied. First approach is to send the attitude errors computed by the Kalman filter 83 to the attitude position velocity computation module 813 to perform attitude correction in the attitude position velocity computation module 813. The second approach is to send the attitude errors computed by the Kalman filter 83 to the transformation matrix computation module 814 to perform the attitude correction before the attitude position velocity computation module 813.

Referring to FIG. 16, in step (5), the corrected inertial solution obtained from the attitude position velocity computation module 813 is passed to the Kalman filter 83 to construct the measurements of the Kalman filter 83. Referring to FIG. 13, in step (8), the corrected inertial navigation solution is also sent to the carrier phase integer ambiguity resolution module 82 to aid the global positioning system satellite carrier phase integer ambiguity fixing. Referring to FIG. 13, in step (7), the corrected velocity and accelerate is passed to microprocessor 454 of the global positioning system processor 40 to aid the global positioning system satellite signal carrier phase and code tracking. Referring to FIG. 16, in step (10), the attitude, position, and velocity information are sent to the control board 53 via the common bus 55.

Referring to FIG. 16, in step (4), the attitude, position, and velocity computed by the attitude position velocity computation module 813 are sent to the earth and vehicle rate computation module 815 to calculate the Earth rotation and the vehicle rotation rate. The calculated Earth and vehicle rates are sent to the transformation matrix computation module 814.

It is well known that a Kalman filter 83 produces optimal estimates with well defined statistical properties. The estimates are unbiased and they have minimum variance within the class of linear unbiased estimates. The quality of the estimates is however only guaranteed as long as the assumptions underlying the mathematical model hold. Any misspecification in the model may invalidate the results of filtering and thus also any conclusion based on them.

In the universal vehicle navigation and control board, an alternative mode of a Kalman filter for position and attitude derivation is a robust Kalman filter. This robust Kalman filter is stable enough to operate in more than one dynamical environment. If the dynamics change drastically, or if a sensor failure occurs, for example, a GPS satellite signal failure or an inertial sensor signal failure, the filter must detect, rectify and isolate the failure situation.

The robust Kalman filter has the characteristic that it provides near-optimum performance over a large class of process and measurement models. The pure Kalman filter is not robust since it is optimal for only one particular process and measurement model. If the filter is not correct the filter covariance may report accuracy which is different from what can actually be achieved. The purpose of filter integrity is to ensure that the predicted performance from the error covariance is close to the actual estimation error statistics. In addition, filter divergence is usually caused by a changing process or measurement model or a sensor failure.

Figure 17:
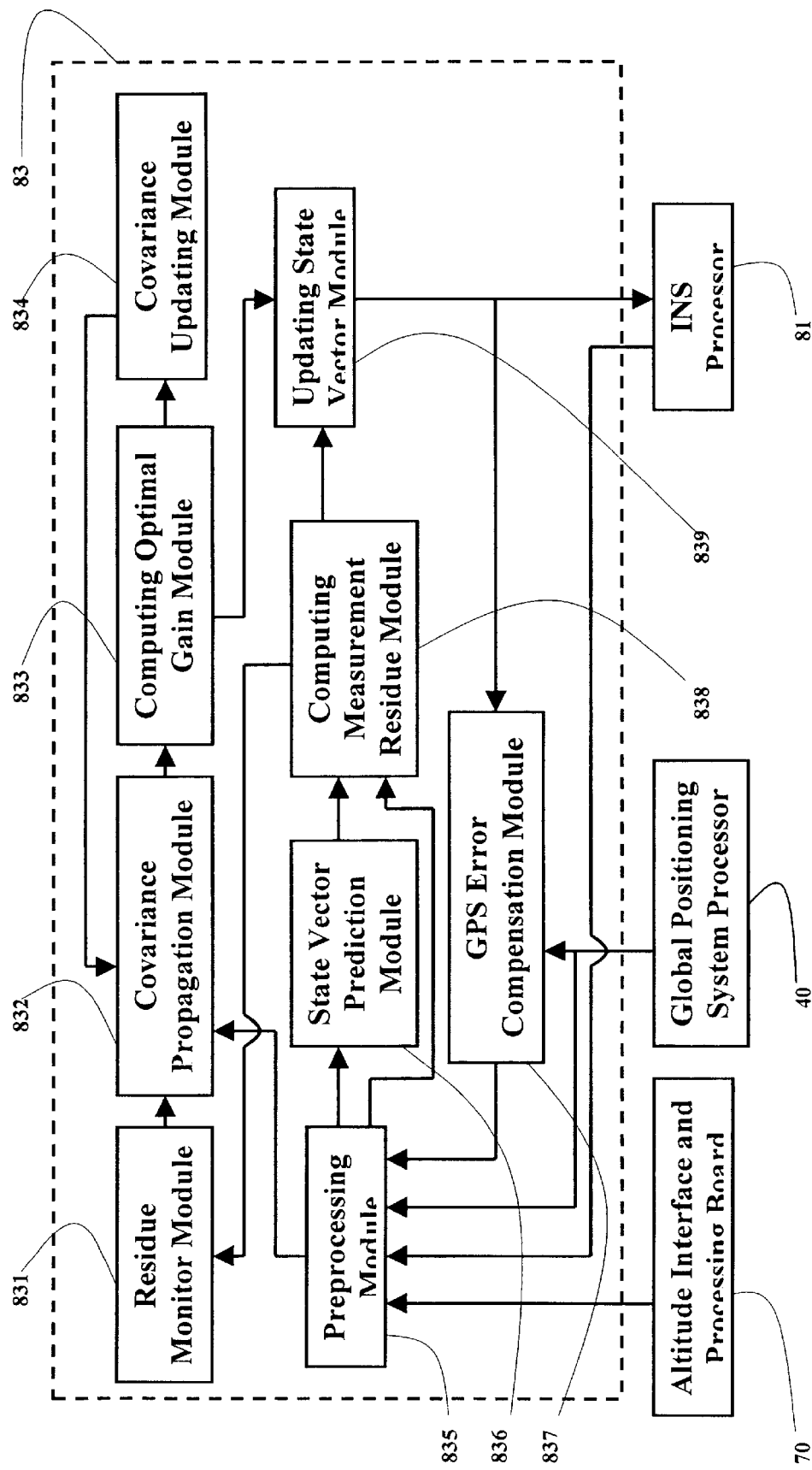
FIG. 17 is a block diagram of the robust Kalman filter implementation of the navigation processing board according to the above both preferred embodiment of the present invention.

The present invention utilizes a residual monitoring method to obtain a robust Kalman filter which is used to blend the global positioning system data, inertial sensor measurements, and the altitude measurement from an altitude measurement device. When the proper redundancy is available, residual monitoring schemes can efficiently detect hard and soft failures and filter divergence. One benefit of the residual monitoring approach is that when the filter model is correct, the statistical distribution of the residual sequence is known. Thus, it is easy to generate a measurement editing and divergence detection scheme using a test-of-distribution on the measurement residuals. The same statistics can be used to assess the filter tuning and adjust the size of the covariance when divergence is detected. FIG. 17 illustrates the implementation of the robust Kalman filter including a residues monitor function.

Referring to FIG. 17, in step (5), a GPS error compensation module 837 gathers the GPS raw measurements including pseudorange, carrier phase, and Doppler frequency from the global positioning system processor 40, and the position and velocity corrections from a updating state vector module 839 to perform GPS error compensation. The corrected GPS raw data are sent to the preprocessing module 835.

Referring to FIG. 17, in step (5), a preprocessing module 835 receives the altitude measurement from the altitude interface and processing board 30, the GPS satellite ephemeris from the global positioning system processor 40, the corrected GPS raw data including pseudorange, carrier phase, and Doppler frequency from a GPS error compensation module 837, and INS navigation solutions from the INS processor 81. The preprocessing module 835 performs the calculation of the state transit matrix and sends it as well as the previous state vector to a state vector prediction module 836. The calculated state transit matrix is also sent to a covariance propagation module 832. The preprocessing module 835 calculates the measurement matrix and the current measurement vector according to the computed measurement matrix and the measurement model. The measurement matrix and the computed current measurement vector are passed to a computing measurement residue module 838.

Referring to FIG. 17, in step (5), the state vector prediction module 836 receives the state transit matrix and the previous state vector from the preprocessing module 835 to perform state prediction of current epoch. The predicted current state vector is passed to the computing measurement residue module 838.

Referring to FIG. 17, in step (5), the computing measurement residue module 838 receives the predicted current state vector from the state vector prediction module 836 and the measurement matrix and the current measurement vector from the preprocessing module 835. The computing measurement residue module 838 calculates the measurement residues by subtracting the multiplication of the measurement matrix and the predicted current state vector from the current measurement vector. The measurement residues are sent to a residue monitor module 831 as well as the updating state vector module 839.

Referring to FIG. 17, in step (5), the residue monitor module 831 performs a discrimination on the measurement residues received from the computing measurement residue module 838. The discrimination law is whether the square of the measurement residues divided by the residual variance is larger than a given threshold. If the square of the measurement residues divided by the residual variance is larger than this given threshold, the current measurement may leads to the divergence of the Kalman filter. When it occurs, the residue monitor module 831 calculates a new covariance of system process or rejects the current measurement. If the square of the measurement residues divided by the residual variance is less than this given threshold, the current measurement can be used by the Kalman filter without changing current covariance of system process to obtain the current navigation solution. The covariance of system process is sent to the covariance propagation module 832.

Referring to FIG. 17, in step (5), the covariance propagation module 832 gathers the covariance of system process from the residue monitor module 831, the state transit matrix from the preprocessing module 835, and the previous covariance of estimated error to calculate the current covariance of the estimated error. The computed current covariance of the estimated error is sent to a computing optimal gain module 833.

Referring to FIG. 17, in step (5), the computing optimal gain module 833 receives the current covariance of the estimated error from the covariance computing module 832 to compute the optimal gain. This optimal gain is passed to a covariance updating module 834 as well as the updating state vector module 839. The covariance updating module 834 updates the covariance of the estimated error and sends it to the covariance propagation module 832.

Referring to FIG. 17, in step (5), the updating state vector receives the optimal gain from the computing optimal gain module 833 and the measurement residues from the computing measurement residue module 838. The updating state vector calculates the current estimate of state vector including position, velocity and attitude errors and sends them to the GPS error compensation module 837 and the INS processor 81.

As well known. more accurate positioning with GPS is obtained by using of carrier phase measurement than by using of pseudorange measurements only. This is because at the global positioning system satellite L1 broadcasting frequency, 1575.42 MHz, one cycle of carrier is only 19 centimeters as compared to that of one cycle of the C/A code which is around 300 meters. The high accuracy of positioning with GPS carrier phase measurement is based on the prior condition that the phase ambiguities have been solved. The ambiguity inherent with phase measurements depends upon both the global positioning system receiver and the satellite. Under the ideal assumptions of no carrier phase tracking error and the known true locations of the receiver and satellite, the ambiguity can be resolved instantaneously through a simple math computation. However, there is the presence of satellite ephemeris error, satellite clock bias, atmospheric propagation delay, multipath effect, receiver clock error and receiver noise in range measurements from GPS code tracking loop, we can only get a non-precise geometric distance from the receiver to the satellite which is called a code pseudorange.

The advantage of the IMU aiding phase ambiguity resolution and cycle slip detection is that the precision vehicle coordinates and velocity from the corrected INS solution are available to aid in determining the original ambiguities and the search volume. Additionally, the INS aiding signal tracking enhances the receiver's capability to hold the global positioning system satellite signal, thus the probability of signal loss or cycle slip are reduced.

Referring to FIG. 13, in step (8), the carrier phase integer ambiguity resolution module 82 collects the position and velocity data from the INS processor 81, the carrier phase and Doppler shift measurement from the microprocessor 454 of the global positioning system processor 40, and the covariance matrix from the Kalman filter 83 to fix the global positioning system satellite signal integer ambiguity number. After fixing of carrier phase ambiguities, in step (9), the carrier phase ambiguity number is passed to the Kalman filter 83 to further improve the measurement accuracy of the global positioning system raw data.

Figure 18:
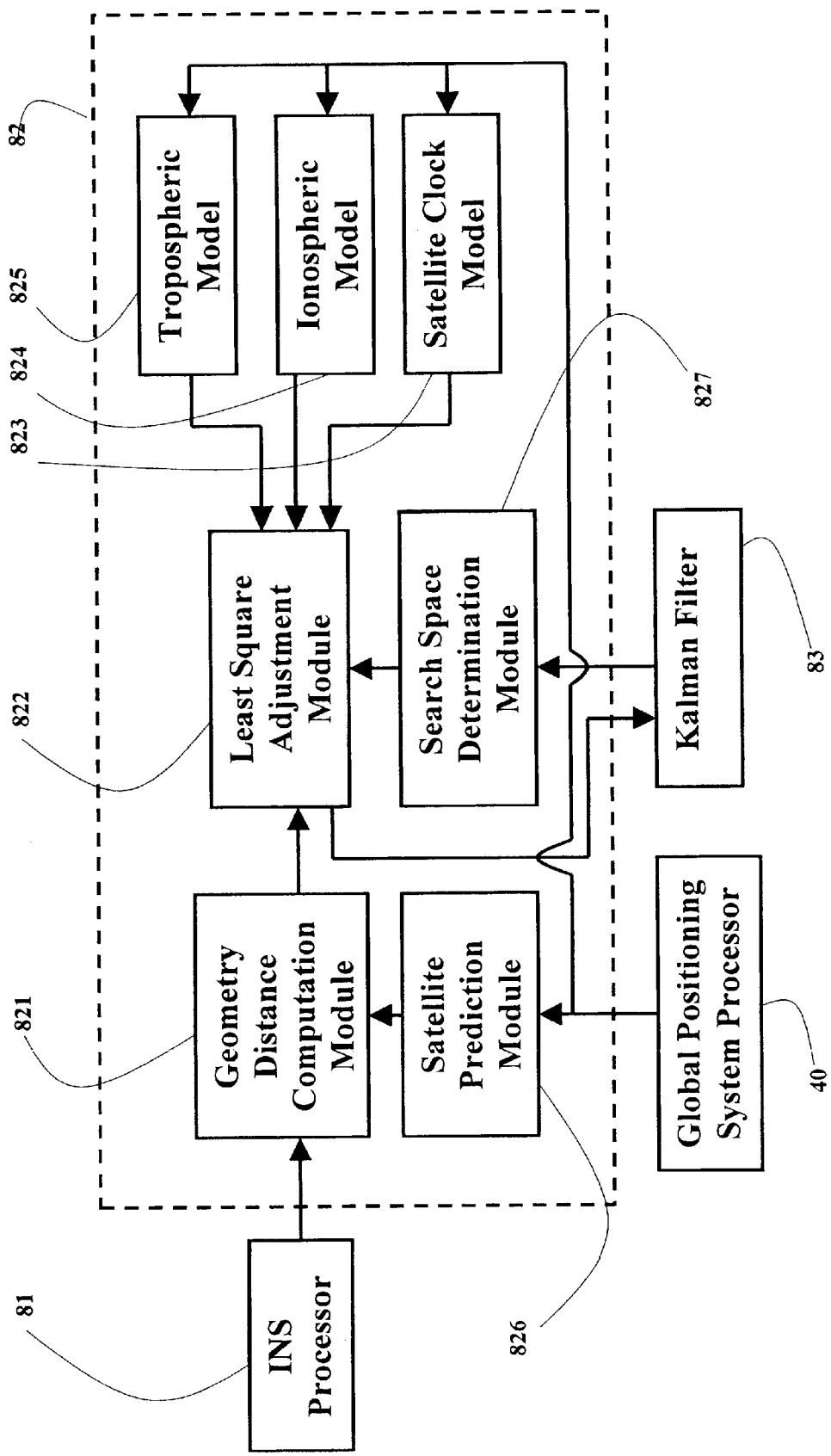
FIG. 18 is a block diagram of the global positioning system satellite signal carrier phase ambiguity resolution of the navigation processing board with aiding of inertial navigation system according to the above first preferred embodiment of the present invention.

Referring to FIG. 18, the IMU aiding global positioning system satellite signal carrier phase integer ambiguity resolution 82 comprises a geometry distance computation module 821, a least square adjustment module 822, a satellite clock model 823, an ionospheric model 824, a tropospheric model 825, a satellite prediction module 826, and a search space determination module 827.

A basic feature of global positioning system satellite signal carrier phase ambiguity is that there is no time dependency as long as tracking is maintained without interruption. The carrier phase measurement can be represented as:

$$\Phi = \frac{1}{\lambda}\rho + f\Delta\delta + N + \frac{d_{eph}}{\lambda} - \frac{d_{iono}}{\lambda} + \frac{d_{trop}}{\lambda} + \varepsilon$$

where, $\Phi$ is the measured carrier phase, $\lambda$ is the signal wavelength; $\rho$ is the true geometric distance between the receiver and satellite; f is the signal frequency; $\Delta\delta = \delta^S - \delta_R$ is the clock error, $\delta^S$ is the satellite clock bias, $\delta_R$ is the receiver error; N is the carrier phase integer ambiguity; $d_{eph}$ is the range error induced by ephemeris error; $d_{iono}$ is the propagation error induced by ionosphere; $d_{trop}$ is the propagation error induced by troposphere; $\varepsilon$ is the phase noise.

When dual frequency is available (using an L1 and L2 dual frequency global positioning system receiver), the dual frequency carrier phase measurements can be used to cancel almost all of the ionospheric error which is the main error source for range measurement. Furthermore, the IMU aiding carrier phase ambiguity resolution is also applied to the wide-lane signal formed between the dual frequency carrier phase measurements. The wide-lane signal can be expressed as $$\Phi_w = \Phi_{L1} - \Phi_{L2}$$

where, $\Phi_{L1}$ is the L1 channel carrier phase measurement; $\Phi_{L2}$ is the L2 channel carrier phase measurement. The corresponding wide-lane frequency and phase ambiguity are $f_w = f_{L1} - f_{L2}$, $N_w = N_{L1} - N_{L2}$.

The problem of fixing carrier phase ambiguity is further complicated by the need to re-determine the ambiguities every time when lock to satellite is lost (this phenomenon is called a cycle slip). The cycle slip must be detected and repaired to maintain high precision navigation solutions. Three sources for cycle slips can be distinguished. First, cycle slips are caused by obstructions of the satellite signal due to trees, buildings, bridges, mountains, etc. This source is the most frequent one. The second source for cycle slips is a low signal-to-noise ratio (SNR) due to bad ionospheric conditions, multipath, high receiver dynamics, or low satellite elevation. A third source is the receiver oscillator. In this present invention, the IMU aiding is also used for the cycle slip detection and repairing.

Referring to FIG. 18, in step (8), the satellite prediction module 826 collects the ephemeris of visible global positioning system satellites from the global positioning system processor 40 to perform satellite position calculation. The predicted satellite position is passed to the geometry distance computation module 821. The geometry distance computation module 821 receives the vehicle's precision position information from the INS processor 81. Based on the position information of the satellite and the vehicle, the geometrical distance between the satellite and the vehicle is computed by the geometry distance computation module 821 which is different from the pseudorange derived from the code tracking loop of the global positioning system processor 40. The resolved geometrical distance is sent to the least square adjustment module 822.

Referring to FIG. 18, in step (8), the tropospheric model 825 collects the time tag from the global positioning system processor 826 and calculates the tropospheric delay of the global positioning system satellite signal using the embedded tropospheric delay model. The calculated troposheric delay is sent to the least square adjustment module 822.

Referring to FIG. 18, in step (8), the ionospheric model 824 collects the time tag and the ionospheric parameters broadcast by the global positioning system satellite from the global positioning system processor 40. Using these ionospheric data and the embedded ionospheric delay model, the ionospheric model 824 calculates the minus time delay introduced by the ionosphere. The calculated ionospheric delay is sent to the least square adjustment module 822.

Referring to FIG. 18, in step (8), the satellite clock model 823 collects the global positioning system satellite clock parameters to perform the satellite clock correction calculation. The satellite clock correction is also sent to the least square adjustment module 822.

Referring to FIG. 18, in step (8), the search space determination module 827 receives the covariance matrix of the measurement vector from the Kalman filter 83. Based on the covariance matrix, the search space determination module 827 derives the measurement error and determine the global positioning system satellite carrier phase integer ambiguity search space. The carrier phase ambiguity search space is sent to the least square adjustment module 822.

Referring to FIG. 18, in step (8), the least square adjustment module 822 gathers the geometrical distance from the vehicle to the global positioning system satellite from the geometry distance computation module 821, the tropospheric delay from the tropospheric model 825, the ionospheric delay from the ionospheric model 824, and the satellite clock correction from the satellite clock model 823 to calculate the initial search origin. The least square adjustment module 822 also receives the search space from the search space determination module 827. A standard least square adjustment algorithm applied to the initial search origin and the search space to fix the carrier phase ambiguity.

Referring to FIG. 3, the bus interface 55 provides an interface between the universal navigation and control box and the data bus 15. Referring to FIGS. 1, 3, and 4, in step (11), the control board 53 sends the platform position, velocity, attitude, heading, and time data to the flight management system 11 through the bus interface 54 and data bus 15.

Referring to FIGS. 1, 3, and 4, in step (12), the control board 53 sends the platform velocity, attitude, body acceleration and rotation data to the flight control system 12 through the bus interface 54 and the data bus 15.

Referring to FIGS. 1, 3, and 4, in step (13), the control board 53 sends the platform position and time data to the automatic dependent surveillance 13 through the bus interface 54 and the data bus 15.

Referring to FIGS. 1, 3, and 4, in step (14), the control board 53 sends the platform position, velocity, and attitude data to the enhanced ground proximity warning system 17 through the bus interface 54 and the data bus 15.

Referring to FIGS. 1, 3, and 4, in step (15), the control board 53 sends the platform attitude and body acceleration data to the weather radar 18 through the bus interface 54 and the data bus 15.

Referring to FIGS. 1, 3, and 4, in step (16), the control board 53 sends Send the platform position and attitude data to the satellite communication system 19 through the bus interface 54 and the data bus 15.

The first preferred embodiment of the present invention as described above is referred as the universal navigation and control box using enhanced fully-coupled global positioning system/inertial measurement unit positioning with altitude measurement, where the global positioning system measurements of pseudorange, carrier phase, and Doppler shift with the inertial measurements as well as the altitude measurement are blended in a Kalman filter.

The universal navigation and control box can also be implemented by using the tightly-coupled global positioning system/inertial measurement unit integrated with altitude measurement. This is the second preferred embodiment of the present invention where a Kalman filter is used to blend the global positioning system measurements of pseudorange and Doppler shift, the inertial measurements, and the altitude measurement from an altitude measurement device. Different from the first preferred embodiment of the present invention, in this method, the global positioning system satellite signal carrier phase is not employed in integration mechanism.

Referring to FIGS. 1, 2, 3, 4, 5*b*, 6*b*, 7, 8, 9, 10, 11, 12, 14, 16, and 17, the second preferred embodiment of the present invention is illustrated, which comprises the steps as follows:

1) Perform GPS processing and receive GPS measurements, including pseudorange, Doppler shift, and time from a global positioning system processor 40, and pass them to the navigation processing board 80.

2) Receive inertial measurements which are body angular rates and specific forces from the inertial measurement unit 20, convert them into digital data of body acceleration and rotation by the IMU interface and preprocessing board 60, and send them to the navigation processing board 80 and the control board 53 through the common bus 55.

3) Receive an altitude measurement from the altitude measurement device 30, convert it to mean sea level (MSL) height in digital data type by the altitude interface and processing board 70, and pass it to the central navigation and control board 80 and the control board 53 through the common bus 55.

4) Perform INS processing using a INS processor 81.

5) Blend the output of the INS processor 81, the altitude measurement, and the GPS measurements in a Kalman filter 83.

6) Feed back the output of the Kalman filter 83 to the INS processor 81 to correct the INS navigation solution.

7) Output the navigation data which are platform velocity, position, altitude, heading and time from the INS processor 81 to the control board 53 via the common bus 55.

8) Send the platform position, velocity, attitude, heading, and time data to the flight management system 11.

9) Send the platform velocity, attitude, body acceleration and rotation data to the flight control system 12.

10) Send the platform position and time data to the automatic dependent surveillance 13.

11) Send the platform position, velocity, and attitude data to the enhanced ground proximity warning system 17.

12) Send the platform attitude and body acceleration data to the weather radar 18.

13) Send the platform position and attitude data to the satellite communication system 19.

Figure 6B:
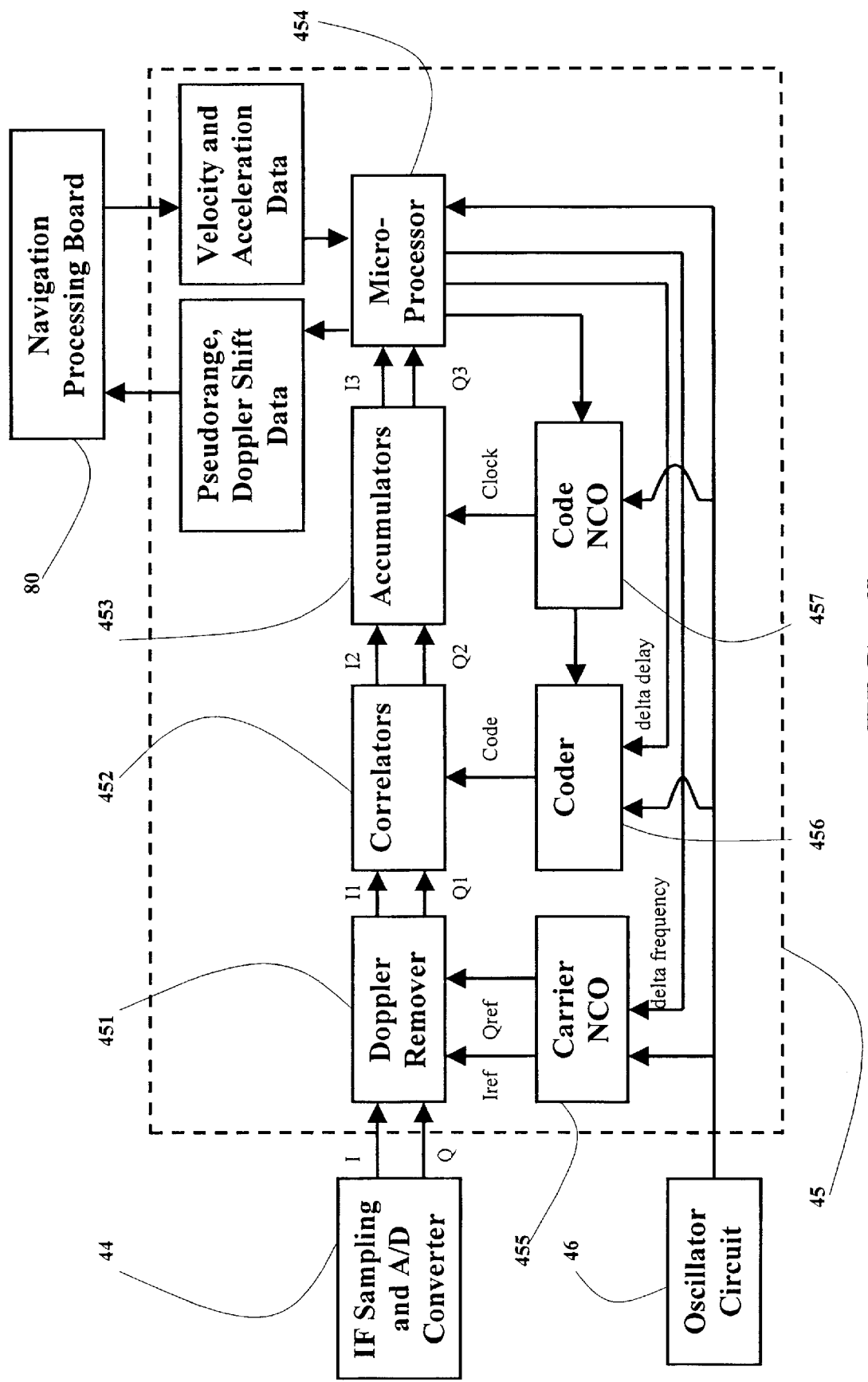
FIG. 6b is a block diagram of the signal processor of the global positioning system processor with external aiding from the navigation processing board according to the second preferred embodiment of the present invention.

After step (6), an additional step can be added:

(6a) Inject velocity and acceleration data from the INS processor 81 into a micro-processor 454 of the global positioning system processor 40 to aid the code tracking of the global positioning system satellite signals, as shown in FIG. 6*b*.

Figure 5B:
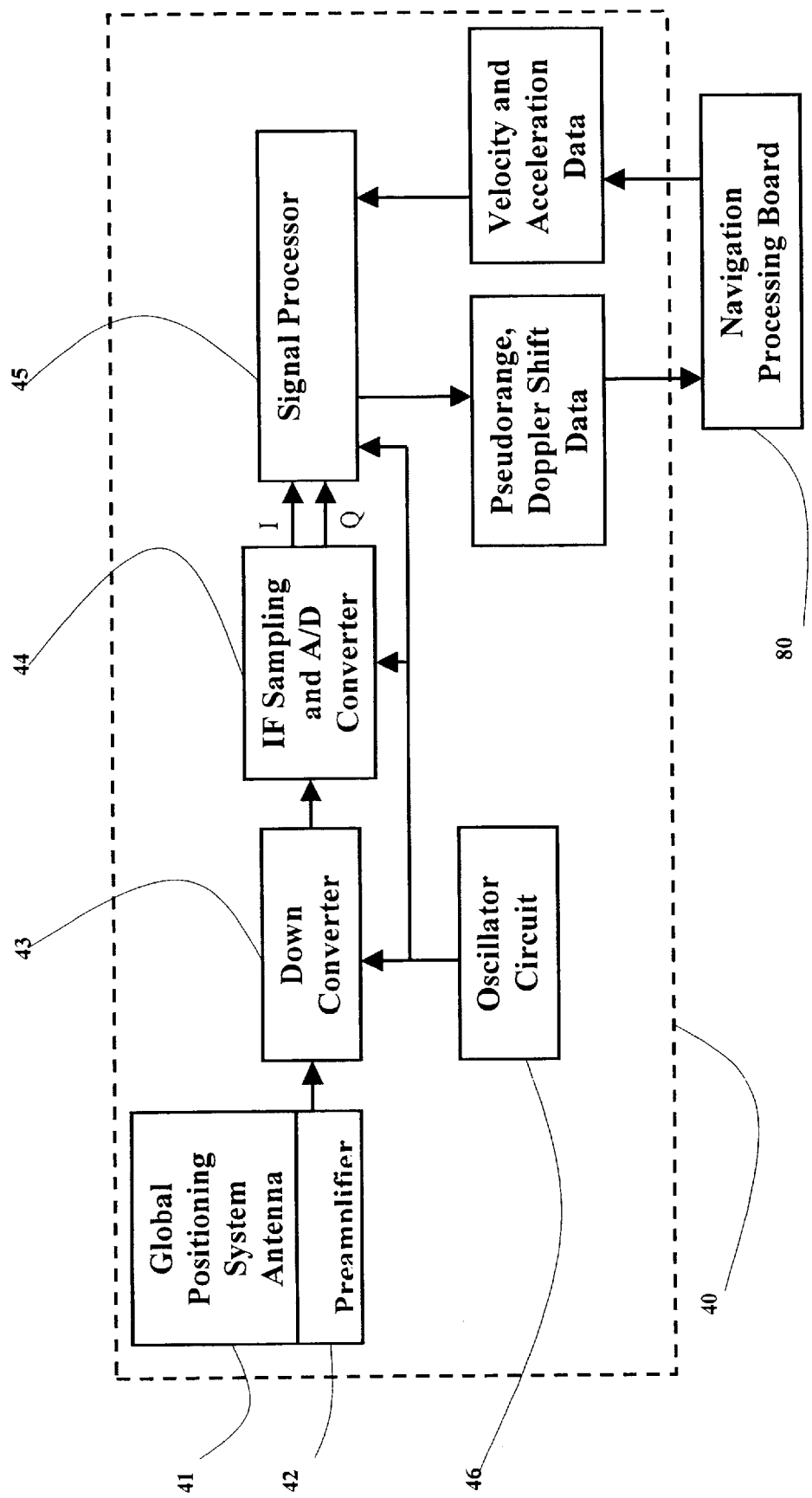
FIG. 5b is a block diagram of the global positioning system processor with external aiding from the navigation processing board according to a second preferred embodiment of the present invention.
Figure 14:
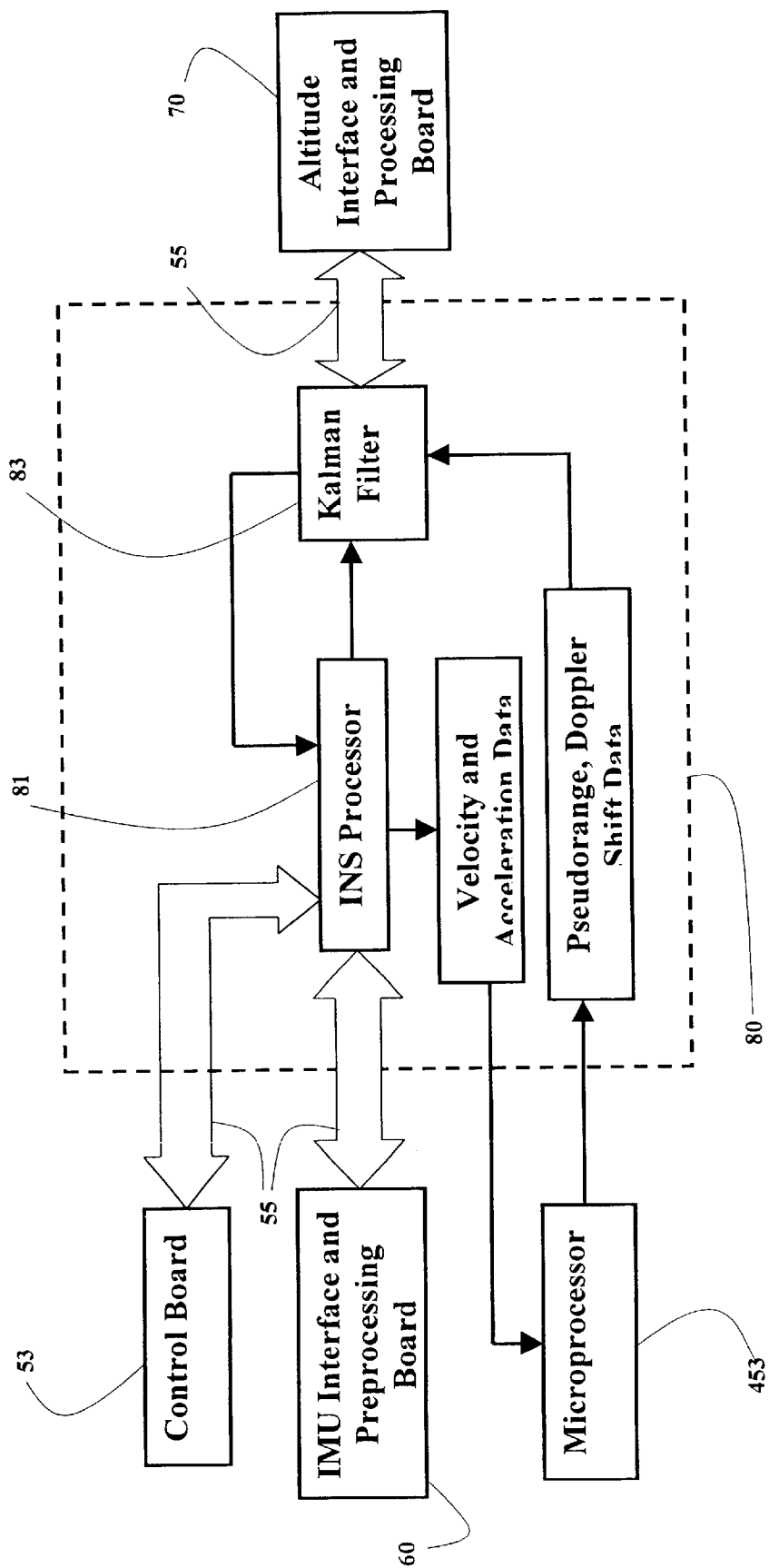
FIG. 14 is a block diagram of the integrated navigation processing of the navigation processing board, including the global positioning system, the inertial sensor, and radar altimeter, according to the above second preferred embodiment of the present invention, illustrating a data fusion module.

Referring to FIGS. 5*b*, 6*b*, and 14, in step (1), the second preferred embodiment of the present invention does the same thing as the first preferred embodiment of the present invention except carrier phase tracking and the velocity-acceleration aiding carrier phase tracking. The navigation processing board 80 receives only pseudorange and Doppler shift from the global positioning system processor 40, excluding the measurement of carrier phase.

Referring to FIG. 5*b*, in step (1), the global positioning system antenna 41, the preamplifier 42, the down converter 43, the IF sampling and A/D converter 44, and the oscillator 46 do the same things as in the first preferred embodiment of the present invention, except the signal processor 45. The signal processor 45 receives the digitized data from the IF sampling and A/D converter 44 to extract the navigation data modulated on the GPS signal, such as the GPS satellite ephemeris, atmosphere parameters, satellite clock parameter, and time information. The signal processor 45 also processes the digital data from the IF sampling and A/D converter 44 to derive the pseudorange and Doppler shift. The extracted pseudorange and Doppler shift are sent to the navigation processing board 80. In step (6a), the signal processor 45 receives the velocity and acceleration from the navigation processing board 80 to perform code tracking aiding.

Referring to FIG. 6*b*, in step (1), the pseudorange measurements are derived from the GPS code tracking loop which comprises correlators 452, accumulators 453, a micro-processor 454, a code NCO (numerical controlled oscillator) 457, and a coder 456. The Doppler shift are obtained from the GPS satellite signal frequency tracking loop which is different from the carrier phase tracking loop in the first preferred embodiment of the present invention. The frequency tracking loop comprises a Doppler removal 451, correlators 452, accumulators 453, a microprocessor 454, and a carrier NCO (numerical controlled oscillator) 455, where the microprocessor 454 does not perform carrier phase detection.

Referring to FIG. 6*b*, in step (1), the Doppler remover 451, the correlators 452, the accumulators 453, the carrier NCO 455, the coder 456, and the code NCO 457 function as that in the first preferred embodiment of the present invention. The microprocessor 454 does different work in the second preferred embodiment of the present invention.

Referring to FIG. 6*b*, in step (1), the accumulations (I3 and Q3) coming from the accumulators 453 are stored and collected by the microprocessor 454, and the accumulators 453 are dumped, resulting in an accumulated-an-dump filtering of the signal components. The microprocessor 454 performs code tracking loop filtering, code acquisition processing, code lock detection, data recovery, and pseudorange and Doppler shift processing. In step (6a), The microprocessor 454 receives the velocity and acceleration information from the navigation processing board 80 to performs external aiding code tracking loop filtering, code acquisition processing, code lock detection, data recovery, and pseudorange and Doppler shift processing.

Referring to FIG. 6*b*, in step (1), the microprocessor 454 outputs the pseudorange and Doppler shifts to the navigation processing board 80.

Referring to FIGS. 14, in step (2), the IMU interface and preprocessing board 60 outputs the inertial measurements of body rates and accelerations to the INS processor 81 of the navigation processing board 80. In step (3), the altitude interface and processing board outputs the altitude measurement to the Kalman filter 83 of the navigation processing board 80.

Referring to FIG. 14, in step (5), the microprocessor 454 of the global positioning system processor 40 outputs the pseudorange, Doppler shifts, global positioning system satellite ephemeris, as well as atmosphere parameters to the Kalman filter 83 in which the data from the INS processor 81, the altitude interface and processing board 70, and the microprocessor 454 of the global positioning system processor 40 are integrated to derive the position error, velocity error, and attitude error. In step (4), the INS processor 81 processes the inertial measurements, which are body angular rates and accelerations, and the position error, velocity error, and attitude error coming from the Kalman filter 83 to derive the corrected navigation solution. The navigation solution includes 3-dimensional position, 3-dimensional velocity, and 3-dimensional attitude. These data are output into the Kalman filter 83. On the other hand, in step (7), these data are also passed to the control board 53 via the common bus 55.

Referring to FIG. 16, in step (4), the INS processor 81 in the second preferred embodiment of the present invention functions as that in the first preferred embodiment of the present invention.

Referring to FIG. 17, in step (5), the robust Kalman filter in the second preferred embodiment of the present invention works as that in the first preferred embodiment of the present invention except the GPS error compensation module 837 of the Kalman filter 83. The GPS error compensation module 837 gathers the GPS raw measurements of pseudorange and Doppler shift, excluding carrier phase, from the global positioning processor 40, and the position and velocity corrections from the updating state vector module 839 to perform GPS error compensation. The corrected GPS raw data of pseudorange and Doppler shift are sent to the preprocessing module 835.

Referring to FIG. 3, the bus interface 55 provides an interface between the universal navigation and control box and the data bus 15. Referring to FIGS. 1, 3, and 4, in step (8), the control board 53 sends the platform position, velocity, attitude, heading, and time data to the flight management system 11 through the bus interface 54 and data bus 15.

Referring to FIGS. 1, 3, and 4, in step (9), the control board 53 sends the platform velocity, attitude, body acceleration and rotation data to the flight control system 12 through the bus interface 54 and the data bus 15.

Referring to FIGS. 1, 3, and 4, in step (10), the control board 53 sends the platform position and time data to the automatic dependent surveillance 13 through the bus interface 54 and the data bus 15.

Referring to FIGS. 1, 3, and 4, in step (11), the control board 53 sends the platform position, velocity, and attitude data to the enhanced ground proximity warning system 17 through the bus interface 54 and the data bus 15.

Referring to FIGS. 1, 3, and 4, in step (12), the control board 53 sends the platform attitude and body acceleration data to the weather radar 18 through the bus interface 54 and the data bus 15.

Referring to FIGS. 1, 3, and 4, in step (13), the control board 53 sends the platform position and attitude data to the satellite communication system 19 through the bus interface 54 and the data bus 15.

The loosely-coupled integration of global positioning system and inertial navigation system is the simplest integration mode which uses the global positioning system-derived position and velocity as the measurements in a Kalman filter. This integration mode does not require a high speed integration processor and a sophisticated global positioning system processor. This leads to its advantage of cost-effectiveness.

The universal navigation and control box can also be implemented by using the loosely-coupled global positioning system/inertial measurement unit integrated with altitude measurement which leads to the third preferred embodiment of the present invention. The third preferred embodiment of the present invention uses a Kalman filter to blend the global positioning system-derive position and velocity, the inertial measurements, and the altitude measurement from an altitude measurement device. Different from the first and second preferred embodiments of the present invention, in this method, the global positioning system satellite signal code tracking and/or carrier phase tracking are not aided by external INS solution. Again, different from the first and second preferred embodiments of the present invention, this method uses the global positioning system-derived position and velocity in the Kalman filter, not the pseudorange, Doppler shift, and/or carrier phase.

Referring to FIGS. 1, 2, 3, 4, 5c, 6c, 7, 8, 9, 10, 11, 12, 15, 16, and 17, the third preferred embodiment of the present invention is illustrated, which comprises the steps as follows:

1) Perform GPS processing and receive GPS navigation solution, including position and velocity, and time from a global positioning system processor 80 and pass them to the navigation processing board 80.

2) Receive inertial measurements, including body angular rates and specific forces from an inertial measurement unit 20, convert them into digital data of body acceleration and rotation by the IMU interface and preprocessing board 60, and send them to the navigation processing board 80 and the control board 53 through the common bus 55.

3) Receive an altitude measurement from the altitude measurement device 30, convert it to mean sea level (MSL) height in digital data type by the altitude interface and processing board 70, and pass it to the central navigation and control board 80 and the control board 53 through the common bus 55.

4) Perform INS processing using a INS processor 81.

5) Blend the output of the INS processor 81, the altitude measurement, and the GPS measurements in a Kalman filter 83.

6) Feed back the output of the Kalman filter 83 to the INS processor 81 to correct the INS navigation solution.

7) Output the navigation data which are platform velocity, position, altitude, heading and time from the INS processor 81 to the control board 53 through the common bus 55.

8) Send the platform position, velocity, attitude, heading, and time data to the flight management system 11.

9) Send the platform velocity, attitude, body acceleration and rotation data to the flight control system 12.

10) Send the platform position and time data to the automatic dependent surveillance 13.

11) Send the platform position, velocity, and attitude data to the enhanced ground proximity warning system 17.

12) Send the platform attitude and body acceleration data to the weather radar 18.

13) Send the platform position and attitude data to the satellite communication system 19.

Figure 5C:
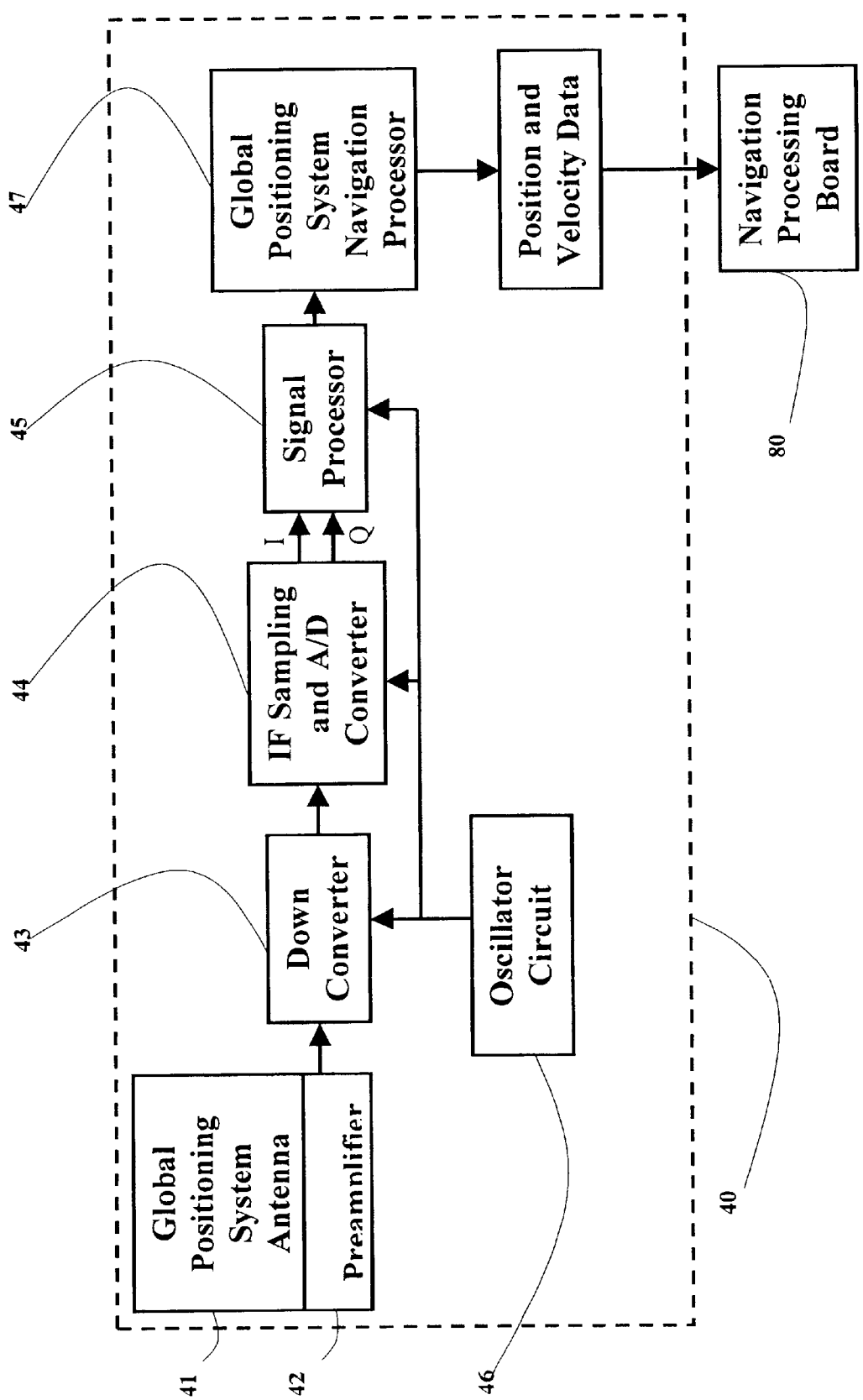
FIG. 5c is a block diagram of the global positioning system processor without external aiding according to a third preferred embodiment of the present invention.

Referring to FIG. 5c, in step (1), the global positioning system antenna 41, the preamplifier 42, the down converter 43, the IF sampling and A/D converter 44, the oscillator circuit 46 do the same things as that in the first and second preferred embodiment of the present invention, except the signal processor 45. The signal processor 45 receives the digitized data from the IF sampling and A/D converter 44 to extract the navigation data modulated on the GPS signal, such as the GPS satellite ephemeris, atmosphere parameters, satellite clock parameter, and time information. The signal processor 45 also processes the digital data from the IF sampling and A/D converter 44 to derive the pseudorange and Doppler shift. The signal processor 45 does not do the velocity and acceleration aiding of code and/or carrier phase tracking.

Referring to FIG. 5c, in step (1), a global positioning system navigation processor 47 is used to calculate the position and velocity of the platform. The global positioning system navigation processor 47 receives the pseudorange and Doppler shift from the signal processor 45 and performs Kalman filtering or least square algorithm to derive the position and velocity. The position and velocity are sent to the navigation processing board 80.

Figure 6C:
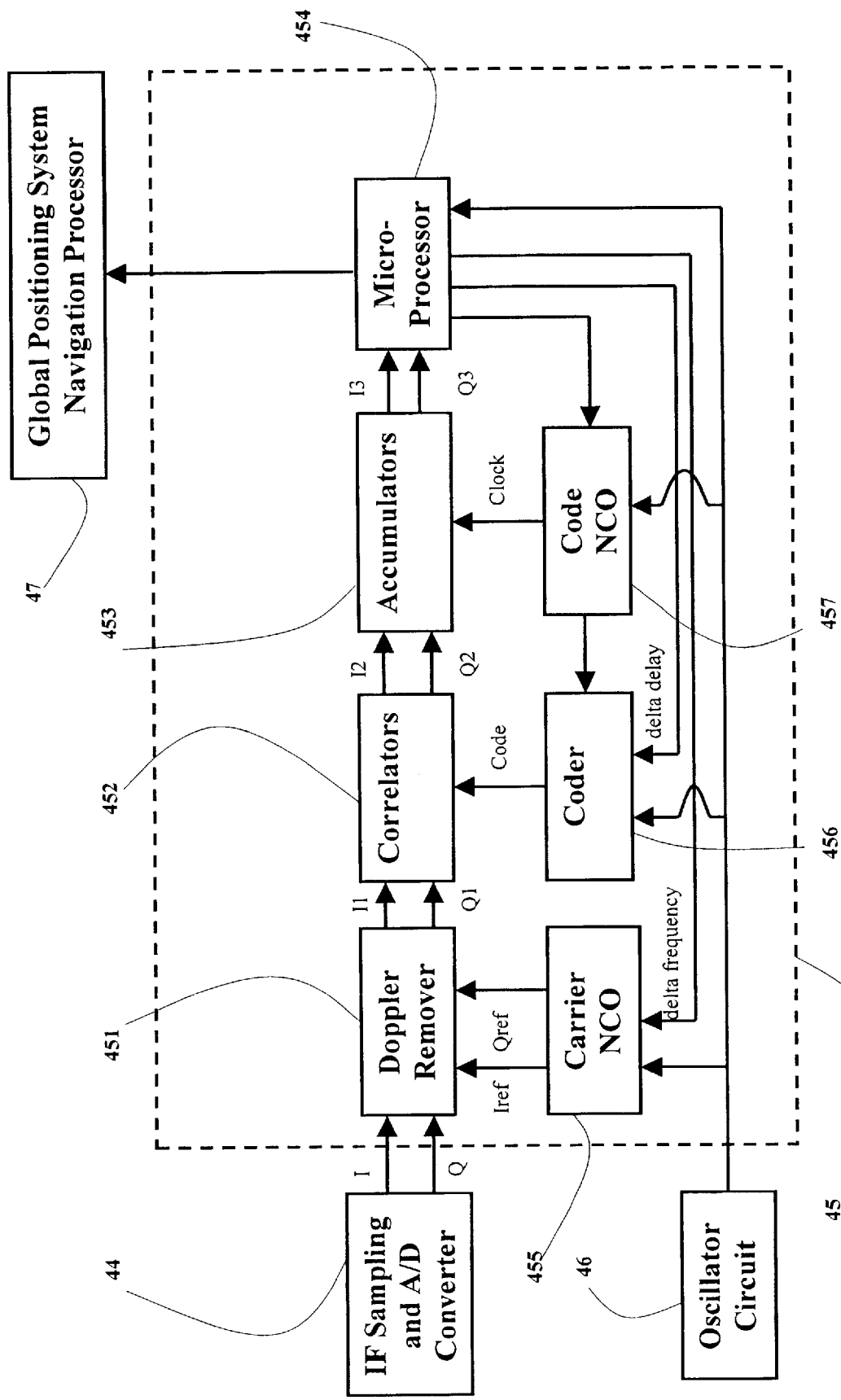
FIG. 6c is a block diagram of the signal processor of the global positioning system processor with external aiding from the navigation processing board according to the third preferred embodiment of the present invention.

Referring to FIG. 6c, in step (1), the pseudorange measurements are derived from the GPS code tracking loop which comprises correlators 452, accumulators 453, a micro-processor 454, a code NCO (numerical controlled oscillator) 457, and a coder 456. The Doppler shift are obtained from the GPS satellite signal frequency tracking loop which is different from the carrier phase tracking loop in the first preferred embodiment of the present invention. The frequency tracking loop comprises a Doppler removal 451, correlators 452, accumulators 453, a microprocessor 454, and a carrier NCO (numerical controlled oscillator) 455, where the microprocessor 454 does not perform carrier phase detection.

Referring to FIG. 6c, in step (1), the Doppler remover 451, the correlators 452, the accumulators 453, the carrier NCO 455, the coder 456, and the code NCO 457 do the same things as that in the first and second preferred embodiment of the present invention. The microprocessor 454 does different work in the third preferred embodiment of the present invention.

Referring to FIG. 6c, in step (1), the accumulations (I3 and Q3) coming from the accumulators 453 are stored and collected by the microprocessor 454, and the accumulators 453 are dumped, resulting in an accumulated-an-dump filtering of the signal components. The microprocessor 454 performs code tracking loop filtering, code acquisition processing, code lock detection, data recovery, and pseudorange and Doppler shift processing. The microprocessor 454 does not receive external velocity and acceleration information to performs external aiding code tracking loop filtering and/or carrier phase tracking loop filtering. The pseudorange and Doppler shift derived from the microprocessor 454 are sent to the global positioning system navigation processor 47.

Referring to FIG. 6c, in step (1), the microprocessor 454 outputs the position and velocity to the navigation processing board 80.

Figure 15:
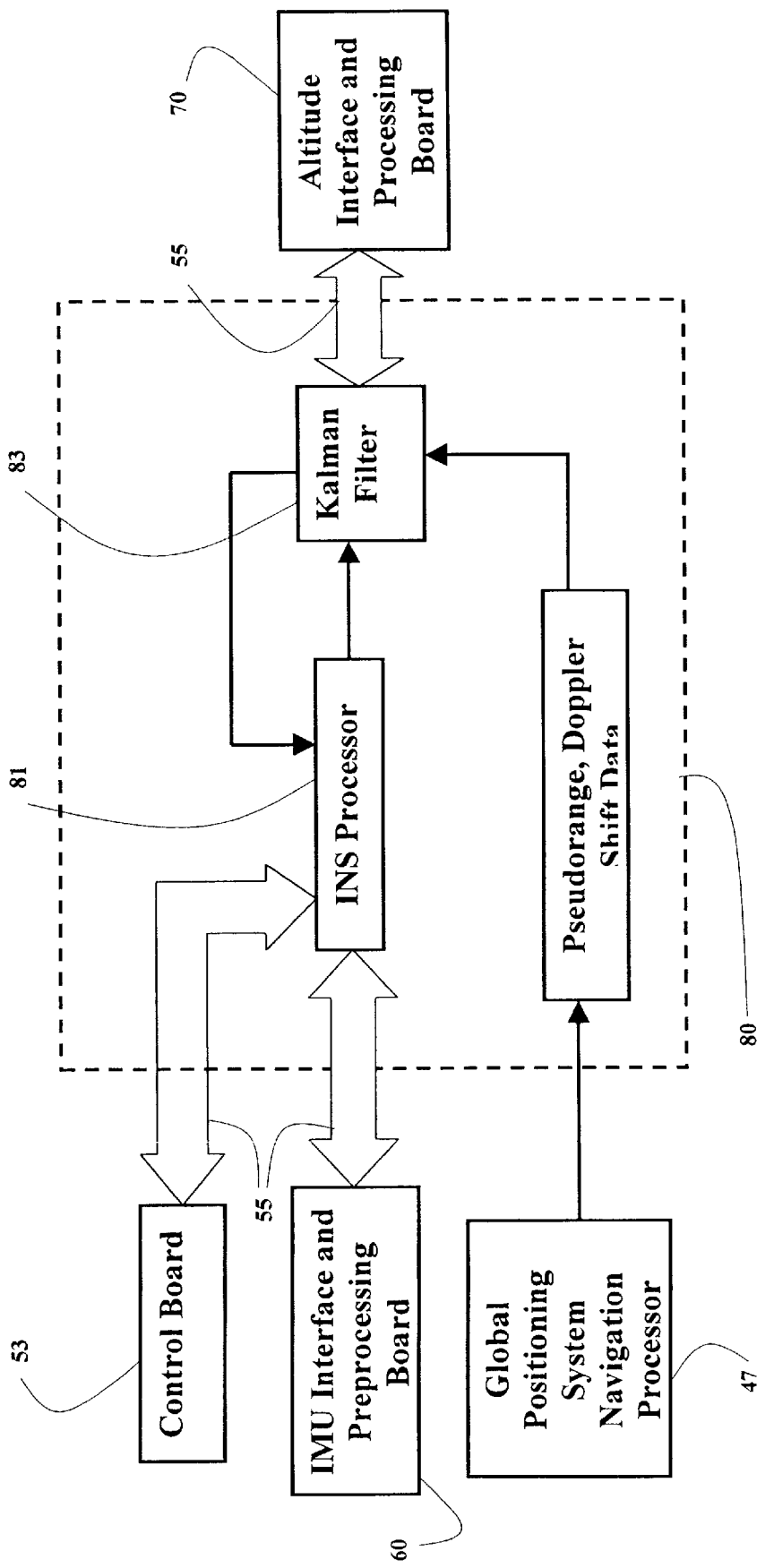
FIG. 15 is a block diagram of the integrated navigation processing of the navigation processing board, including the global positioning system, the inertial sensor, and radar altimeter, according to the above third preferred embodiment of the present invention, illustrating a data fusion module.

Referring to FIG. 15, in step (2), the IMU interface and preprocessing board 60 outputs the inertial measurements of body rates and accelerations to the INS processor 81 of the navigation processing board 80. In step (3), the altitude interface and processing board outputs the altitude measurement to the Kalman filter 83 of the navigation processing board 80.

Referring to FIG. 15, in step (5), the global positioning system navigation processor 47 of the global positioning system processor 40 outputs the position and velocity to the Kalman filter 83 in which the data from the INS processor 81, the altitude interface and processing board 70, and the microprocessor 454 of the global positioning system processor 40 are integrated to derive the position error, velocity error, and attitude error. In step (4), the INS processor 81 processes the inertial measurements, which are body angular rates and accelerations, and the position error, velocity error, and attitude error coming from the Kalman filter 83 to derive the corrected navigation solution. The navigation solution includes 3-dimensional position, 3-dimensional velocity, and 3-dimensional attitude. These data are output into the Kalman filter 83. On the other hand, in step (7), these data are also passed to the control board 53 via the common bus 55.

Referring to FIG. 16, in step (4), the INS processor 81 in the third preferred embodiment of the present invention functions as that in the first and second preferred embodiments of the present invention.

Referring to FIG. 17, in step (5), the robust Kalman filter in the third preferred embodiment of the present invention functions as that in the first and second preferred embodiments of the present invention except the GPS error compensation module 837 of the Kalman filter 83. The GPS error compensation module 837 gathers the GPS-derive position and velocity from the global positioning system navigation processor 47, and the position and velocity corrections from the updating state vector module 839 to perform GPS error compensation. The corrected GPS position and velocity are sent to the preprocessing module 835.

Referring to FIGS. 1, 3, and 4, the bus interface 55 provides an interface between the universal navigation and control box and the data bus 15. In step (8), the control board 53 sends the platform position, velocity, attitude, heading, and time data to the flight management system 11 through the bus interface 54 and data bus 15.

Referring to FIGS. 1, 3, and 4, in step (9), the control board 53 sends the platform velocity, attitude, body acceleration and rotation data to the flight control system 12 through the bus interface 54 and the data bus 15.

Referring to FIGS. 1, 3, and 4, in step (10), the control board 53 sends the platform position and time data to the automatic dependent surveillance 13 through the bus interface 54 and the data bus 15.

Referring to FIGS. 1, 3, and 4, in step (11), the control board 53 sends the platform position, velocity, and attitude data to the enhanced ground proximity warning system 17 through the bus interface 54 and the data bus 15.

Referring to FIGS. 1, 3, and 4, in step (12), the control board 53 sends the platform attitude and body acceleration data to the weather radar 18 through the bus interface 54 and the data bus 15.

Referring to FIGS. 1, 3, and 4, in step (13), the control board 53 sends the platform position and attitude data to the satellite communication system 19 through the bus interface 54 and the data bus 15.

Figure 19:
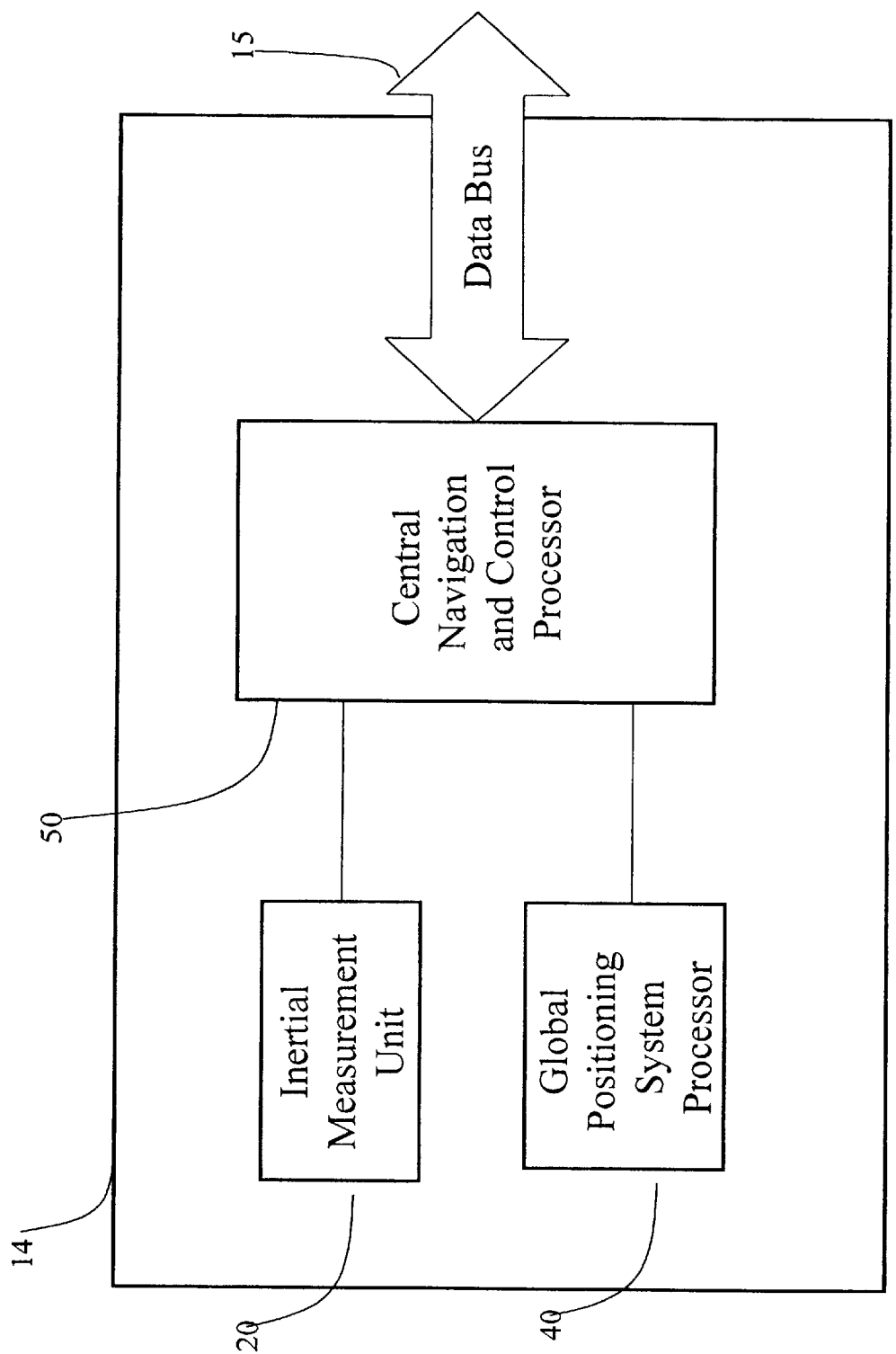
FIG. 19 is a block diagram of a universal navigation and control box without optional other devices according to the present invention.
Figure 20:
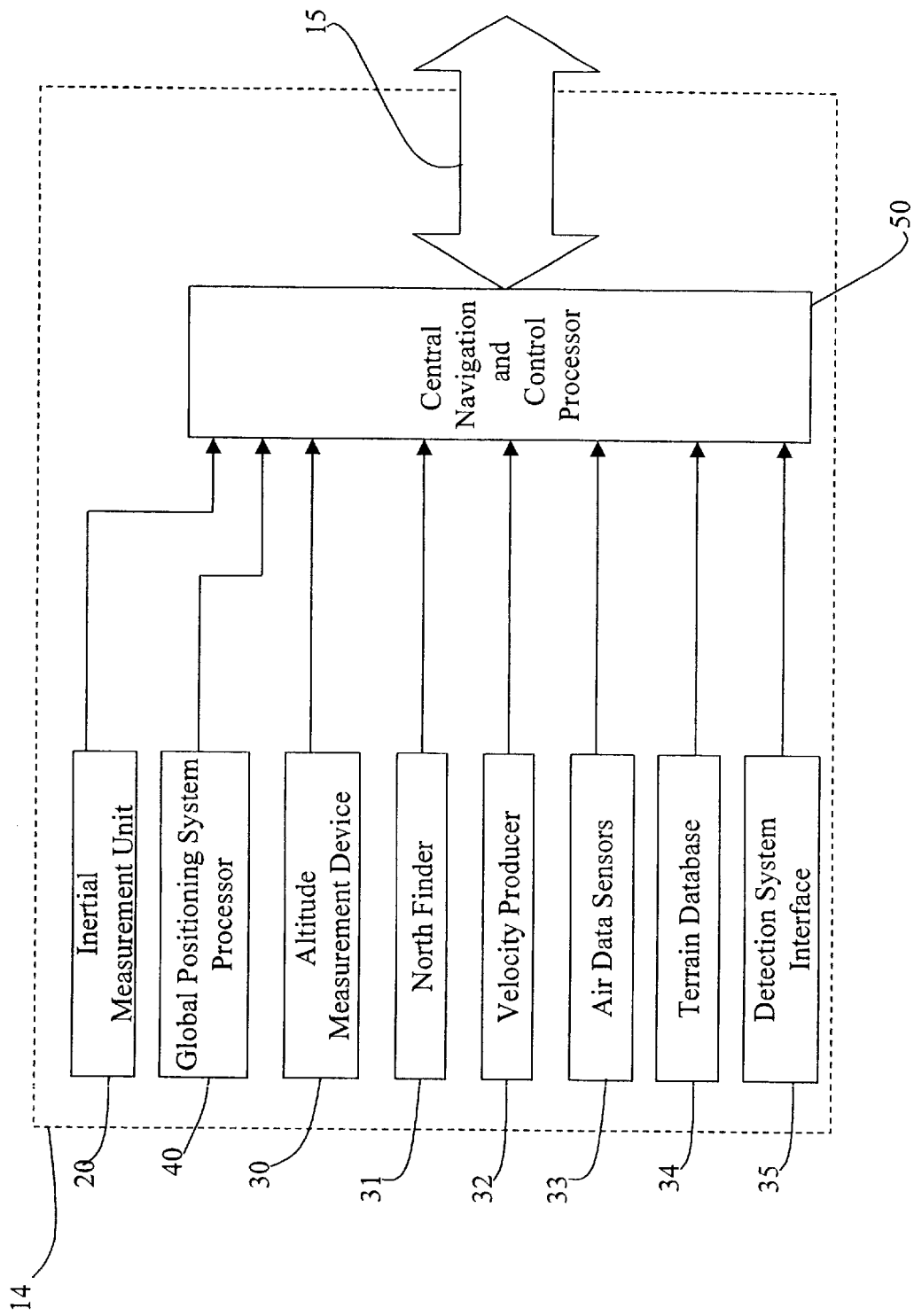
FIG. 20 is a block diagram of a universal navigation and control box with optional other devices according to the present invention.
Figure 21:
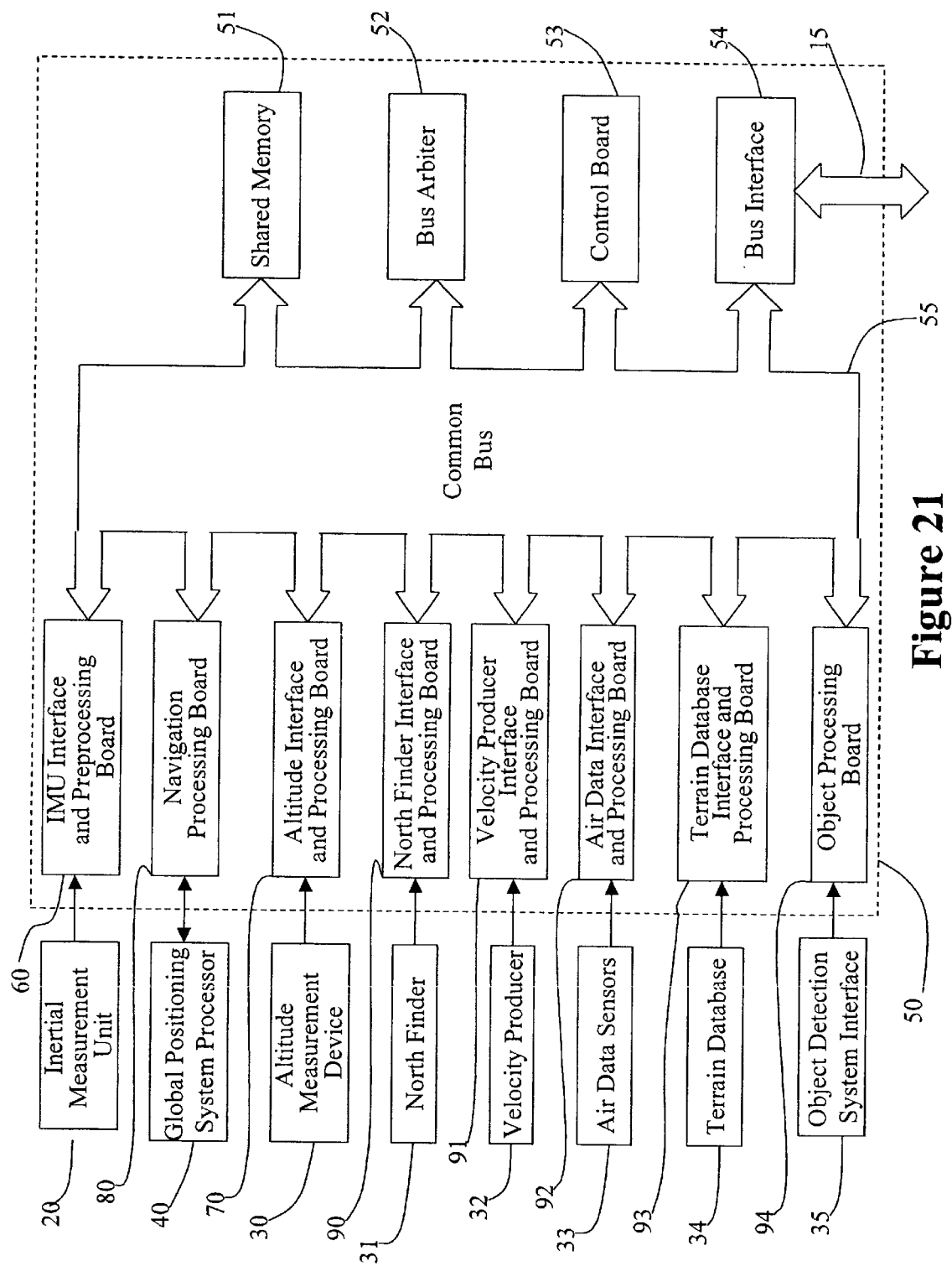
FIG. 21 is a block diagram illustrating the configuration of a universal navigation and control box with optional other devices according to the present invention.

In some applications, including land and water vehicles, it is not important to provide precise altitude measurement. Therefore, referring FIG. 19, the universal navigation and control box 14 can eliminate the altitude measurement device 30 and associated altitude interface and processing board 70. The Kalman filter 83 only blends the output of the INS processor 80 and GPS measurements.

Therefore, a first alternative embodiment of the first preferred embodiment of the present invention comprises the following steps:

(1) Perform GPS processing and receive GPS measurements, including pseudorange, carrier phase, Doppler shift, and time from the global positioning system processor 40, and pass them to the navigation processing board 80 of the central navigation processor 50.

(2) Receive inertial measurements including body angular rates and specific forces, from the inertial measurement unit 20, convert them into digital data of body acceleration 20 and rotation by the IMU interface and preprocessing board 60, and send them to the navigation processing board 80 and the control board 53 via the common bus 55.

(3) Perform inertial navigation system (INS) processing using an INS processor 81.

(4) Blend the output of the INS processor 81, the GPS measurements in a Kalman filter 83.

(5) Feed back the output of the Kalman filter 83 to the INS processor 81 to correct the INS navigation solution.

(6) Inject velocity and acceleration data from the INS processor 81 into a signal processor 45 of the global positioning system processor 40 to aid the code and carrier phase tracking of the global positioning system satellite signals.

(7) Inject the output of the signal processor 45 of the global positioning system processor 40, the output of the INS processor 81, the output of the Kalman filter 83 into a carrier phase integer ambiguity resolution module 82 to fix the global positioning system satellite signal carrier phase integer ambiguity number.

(8) Output the carrier phase integer number from the carrier phase integer ambiguity resolution module 82 into the Kalman filter 83 to further improve the positioning accuracy.

(9) Output the navigation data which are platform velocity, position, heading and time data from the INS processor 81 to the control board 53 through the common bus 55.

A first alternative embodiment of the second preferred embodiment of the present invention comprises the following steps:

(1) Perform GPS processing and receive GPS measurements, including pseudorange, Doppler shift, and time from a global positioning system processor 40, and pass them to the navigation processing board 80.

(2) Receive inertial measurements which are body angular rates and specific forces from the inertial measurement unit 20, convert them into digital data of body acceleration and rotation by the IMU interface and preprocessing board 60, and send them to the navigation processing board 80 and the control board 53 through the common bus 55.

(3) Perform INS processing using a INS processor 81.

(4) Blend the output of the INS processor 81 and the GPS measurements in a Kalman filter 83.

(5) Feed back the output of the Kalman filter 83 to the INS processor 81 to correct the INS navigation solution.

(6) Output the navigation data which are platform velocity, position, heading and time from the INS processor 81 to the control board 53 via the common bus 55.

(7) Inject velocity and acceleration data from the INS processor 81 into a micro-processor 454 of the global positioning system processor 40 to aid the code tracking of the global positioning system satellite signals.

A first alternative of the third preferred embodiment of the present invention comprises the following steps:

(1) Perform GPS processing and receive GPS navigation solution, including position and velocity, and time from a global positioning system processor 80 and pass them to the navigation processing board 80.

(2) Receive inertial measurements, including body angular rates and specific forces from an inertial measurement unit 20, convert them into digital data of body acceleration and rotation by the IMU interface and preprocessing board 60, and send them to the navigation processing board 80 and the control board 53 through the common bus 55.

(3) Perform INS processing using an INS processor 81.

(4) Blend the output of the INS processor 81 and the GPS measurements in a Kalman filter 83.

(5) Feed back the output of the Kalman filter 83 to the INS processor 81 to correct the INS navigation solution.

(6) Output the navigation data which are platform velocity, position, heading and time from the INS processor 81 to the control board 53 through the common bus 55.

In order to further improve the heading measurement accuracy of the universal navigation and control box 14, referring to FIGS. 20, 23, 24, and 25, the universal navigation and control box 14 further comprises a north finder 31 to provide heading measurement of the carrier of the universal navigation and control box 14 for the Kalman filter 83 of the navigation processing board 80 over the north finder interface and processing board 90 and the common bus 55.

The preferred north finder 31 is a magnetic sensor, such as a magnetometer and flux valve, sensing the earth's magnetic field to measure the heading angle of the user.

The magnetometer 31 is a sensor that measures the surrounding magnetic field with respect to the body frame of the universal navigation and control box 14. To provide a heading computation from this magnetic data, the pitch and roll of the universal navigation and control box 14 have to be known. These angles are obtained from the INS processor 81 of the navigation processing board 80. The measured magnetic field components are then transformed into the level frame from the body frame. By computing the inverse tangent of the ratio of the level frame components, the magnetic heading angle can be obtained.

In order to achieve a highly accurate heading measurement, the magnetic field measurement errors have to be modeled and the errors have to be calibrated to a high degree of precision before the universal navigation and control box 14 is put into normal operation. The local magnetic field is a sum of the earth's magnetic field and the magnetic disturbances in the near proximity of the magnetometer 31. The magnetic disturbances near the magnetometer 31 that result from the installation can be modeled as a misalignment/scale factor disturbance, and a fixed or bias disturbance.

These two errors can be calibrated by solving a set of linear equations generated by performing a least square curve fit for the matrix of elements. The needed input data can be generated by rotating the entire vehicle in which the magnetometer is installed into several different positions with known pitch, roll, and heading. The resulting data can be processed to obtain a 3×3 matrix of scale factor and misalignments and a 3×1 vector of magnetic bias. As long as this compensation is applied to every magnetic measurement obtained, the resulting heading measurement can be highly accurate and free of effects within the installation.

Therefore, a second alternative embodiment of the first preferred embodiment of the present invention comprises the following steps:

(1) Perform GPS processing and receive GPS measurements, including pseudorange, carrier phase, Doppler shift, and time from the global positioning system processor 40, and pass them to the navigation processing board 80 of the central navigation processor 50.

(2) Receive inertial measurements including body angular rates and specific forces, from the inertial measurement unit 20, convert them into digital data of body acceleration and rotation by the IMU interface and preprocessing board 60, and send them to the navigation processing board 80 and the control board 53 via the common bus 55.

(3) Receive the earth's magnetic vector measurement from the magnetometer 31 and pitch and roll angle from the navigation board 80 through the common bus 55, compute the magnetic heading angle using the earth's magnetic vector measurement and pitch and roll angle by the north finder interface and processing board 90, and send the magnetic heading angle to the navigation processing board 80 through the common bus 55.

(4) Perform inertial navigation system (INS) processing using an INS processor 81.

(5) Blend the output of the INS processor 81, the GPS measurements, and the magnetic heading angle in a Kalman filter 83.

(6) Feed back the output of the Kalman filter 83 to the INS processor 81 to correct the INS navigation solution.

(7) Inject velocity and acceleration data from the INS processor 81 into a signal processor 45 of the global positioning system processor 40 to aid the code and carrier phase tracking of the global positioning system satellite signals.

(8) Inject the output of the signal processor 45 of the global positioning system processor 40, the output of the INS processor 81, the output of the Kalman filter 83 into a carrier phase integer ambiguity resolution module 82 to fix the global positioning system satellite signal carrier phase integer ambiguity number.

(9) Output the carrier phase integer number from the carrier phase integer ambiguity resolution module 82 into the Kalman filter 83 to further improve the positioning accuracy.

(10) Output the navigation data which are platform velocity, position, heading and time from the INS processor 81 to the control board 53 through the common bus 55.

A second alternative embodiment of the second preferred embodiment of the present invention comprises the following steps:

(1) Perform GPS processing and receive GPS measurements, including pseudorange, Doppler shift, and time from a global positioning system processor 40, and pass them to the navigation processing board 80.

(2) Receive inertial measurements which are body angular rates and specific forces from the inertial measurement unit 20, convert them into digital data of body acceleration and rotation by the IMU interface and preprocessing board 60, and send them to the navigation processing board 80 and the control board 53 through the common bus 55.

(3) Receive the earth's magnetic vector measurement from the magnetometer 31 and pitch and roll angle from the navigation board 80 through the common bus 55, compute the magnetic heading angle using the earth's magnetic vector measurement and pitch and roll angle by the north finder interface and processing board 90, and send the magnetic heading angle to the navigation processing board 80 through the common bus 55.

(4) Perform INS processing using an INS processor 81.

(5) Blend the output of the INS processor 81, the GPS measurements, and magnetic heading angle in a Kalman filter 83.

(6) Feed back the output of the Kalman filter 83 to the INS processor 81 to correct the INS navigation solution.

(7) Output the navigation data which are platform velocity, position, heading and time from the INS processor 81 to the control board 53 via the common bus 55.

(8) Inject velocity and acceleration data from the INS processor 81 into a micro-processor 454 of the global positioning system processor 40 to aid the code tracking of the global positioning system satellite signals.

A second alternative of the third preferred embodiment of the present invention comprises the following steps:

(1) Perform GPS processing and receive GPS navigation solution, including position and velocity, and time from a global positioning system processor 80 and pass them to the navigation processing board 80.

(2) Receive inertial measurements, including body angular rates and specific forces from an inertial measurement unit 20, convert them into digital data of body acceleration and rotation by the IMU interface and preprocessing board 60, and send them to the navigation processing board 80 and the control board 53 through the common bus 55.

(3) Receive the earth's magnetic vector measurement from the magnetometer 31 and pitch and roll angle from the navigation board 80 through the common bus 55, compute the magnetic heading angle using the earth's magnetic vector measurement and pitch and roll angle by the north finder interface and processing board 90, and send the magnetic heading angle to the navigation processing board 80 through the common bus 55.

(4) Perform INS processing using an INS processor 81.

(5) Blend the output of the INS processor 81, the GPS measurements, and the magnetic heading angle in a Kalman filter 83.

(6) Feed back the output of the Kalman filter 83 to the INS processor 81 to correct the INS navigation solution.

(7) Output the navigation data which are platform velocity, position, heading and time from the INS processor 81 to the control board 53 through the common bus 55.

In order to compensate the drift of INS positioning data error when the GPS signals are not available, referring to FIGS. 20, 23, 24, and 25, the universal navigation and control box 14 further comprises a velocity producer 32 to provide velocity measurement of the carrier of the universal navigation and control box 14 with respect to the ground or water for the Kalman filter 83 of the navigation processing board 80 over the velocity producer interface and processing board 91 and the common bus 55.

Figure 22:
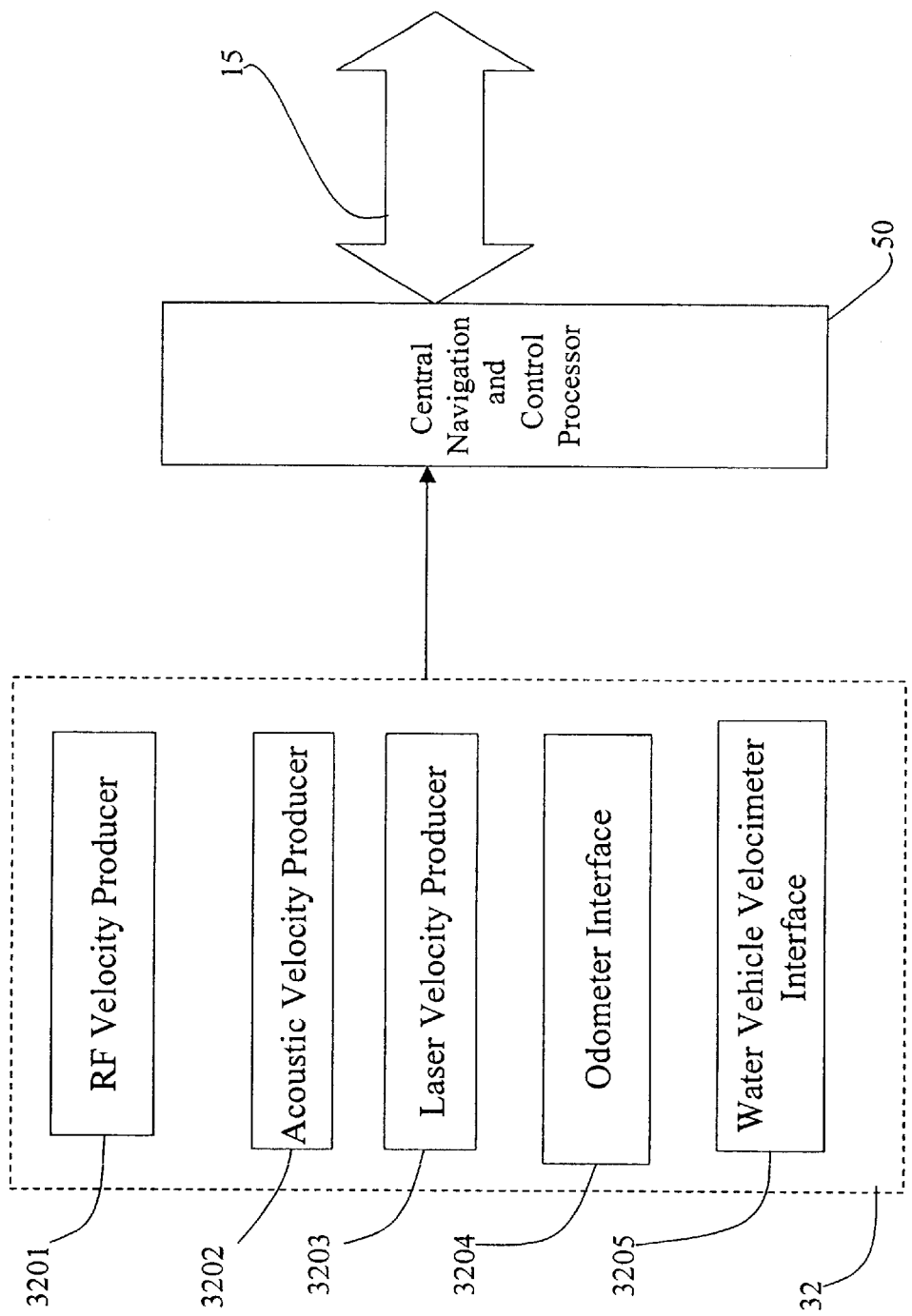
FIG. 22 is a block diagram illustrating the alternatives of the velocity producer.
Figure 23:
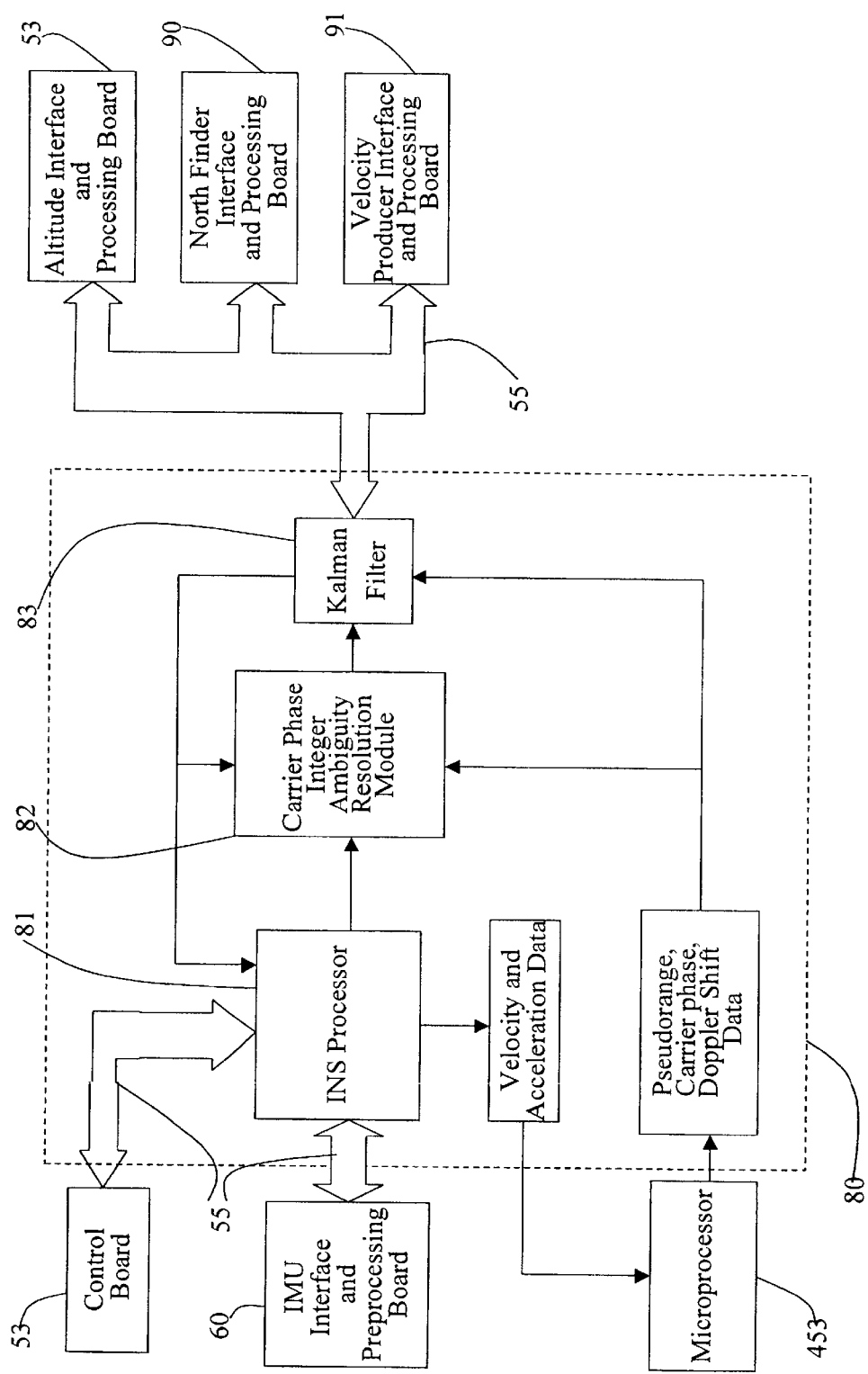
FIG. 23 is a block diagram of the integrated navigation processing of the navigation processing board, including the global positioning system, the inertial sensor, and other optional devices, according to the above first preferred embodiment of the present invention.
Figure 24:
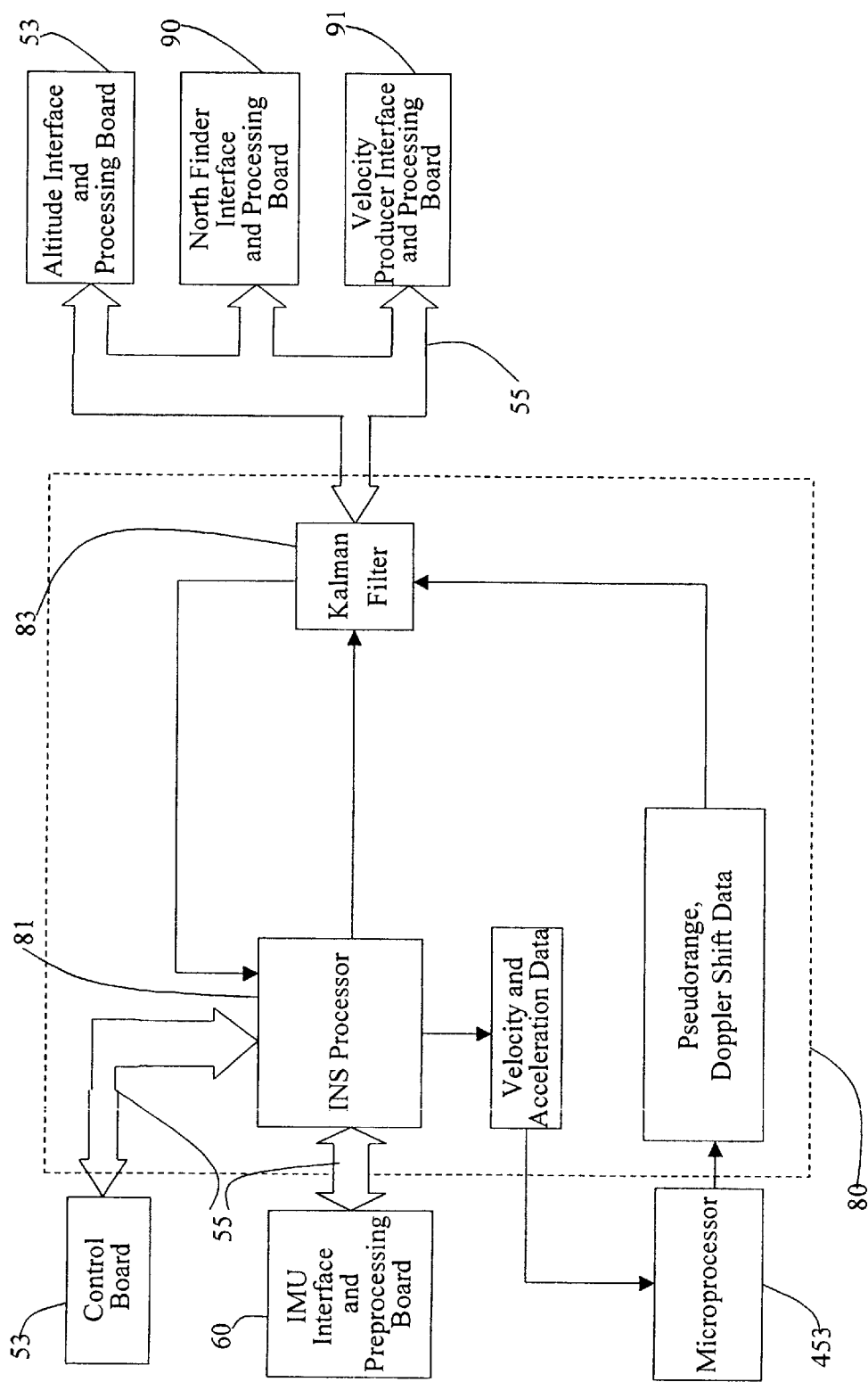
FIG. 24 is a block diagram of the integrated navigation processing of the navigation processing board, including the global positioning system, the inertial sensor, and other optional devices, according to the above second preferred embodiment of the present invention, illustrating a data fusion module.
Figure 25:
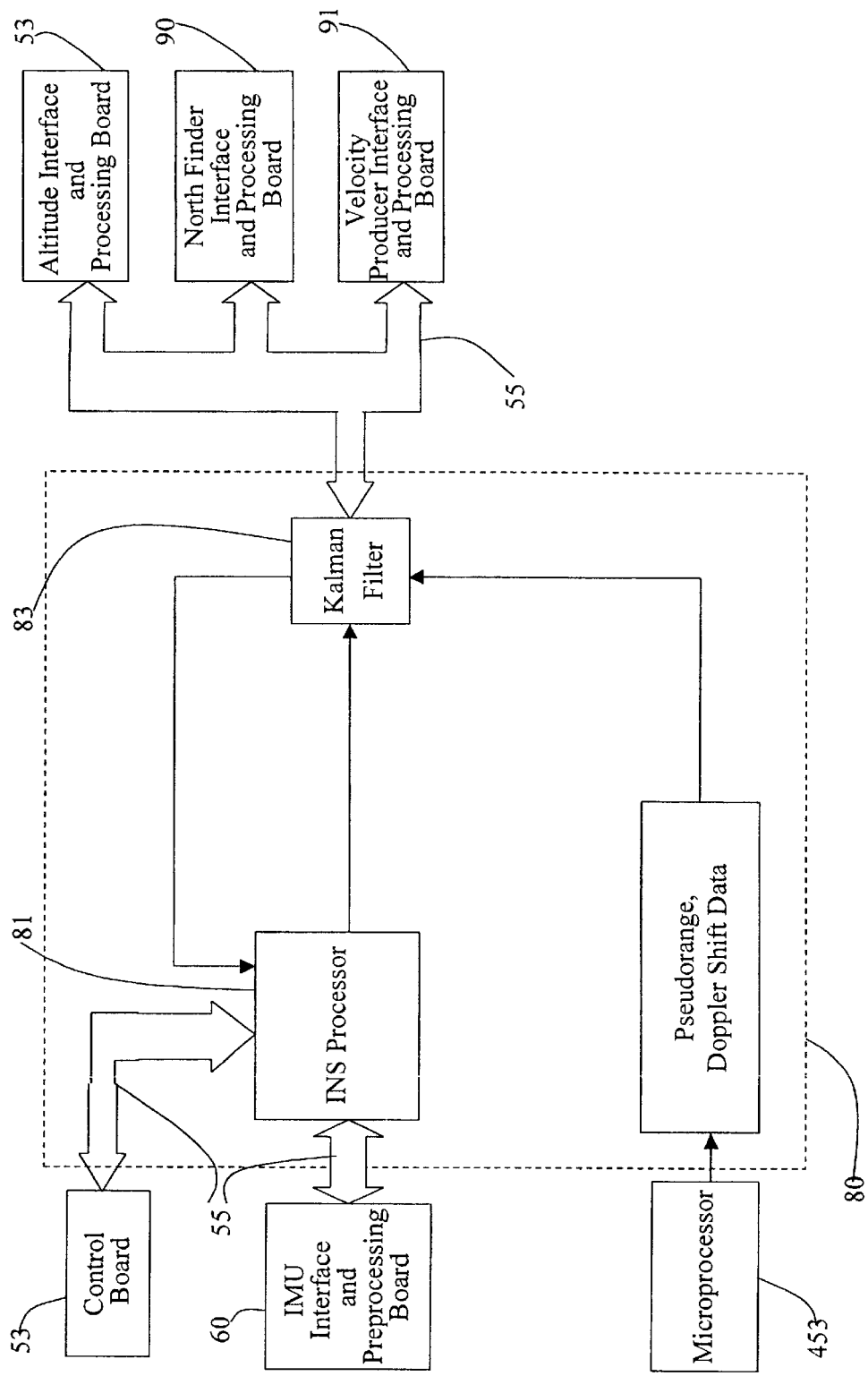
FIG. 25 is a block diagram of the integrated navigation processing of the navigation processing board, including the global positioning system, the inertial sensor, and other optional devices, according to the above third preferred embodiment of the present invention, illustrating a data fusion module.
Figure 26:
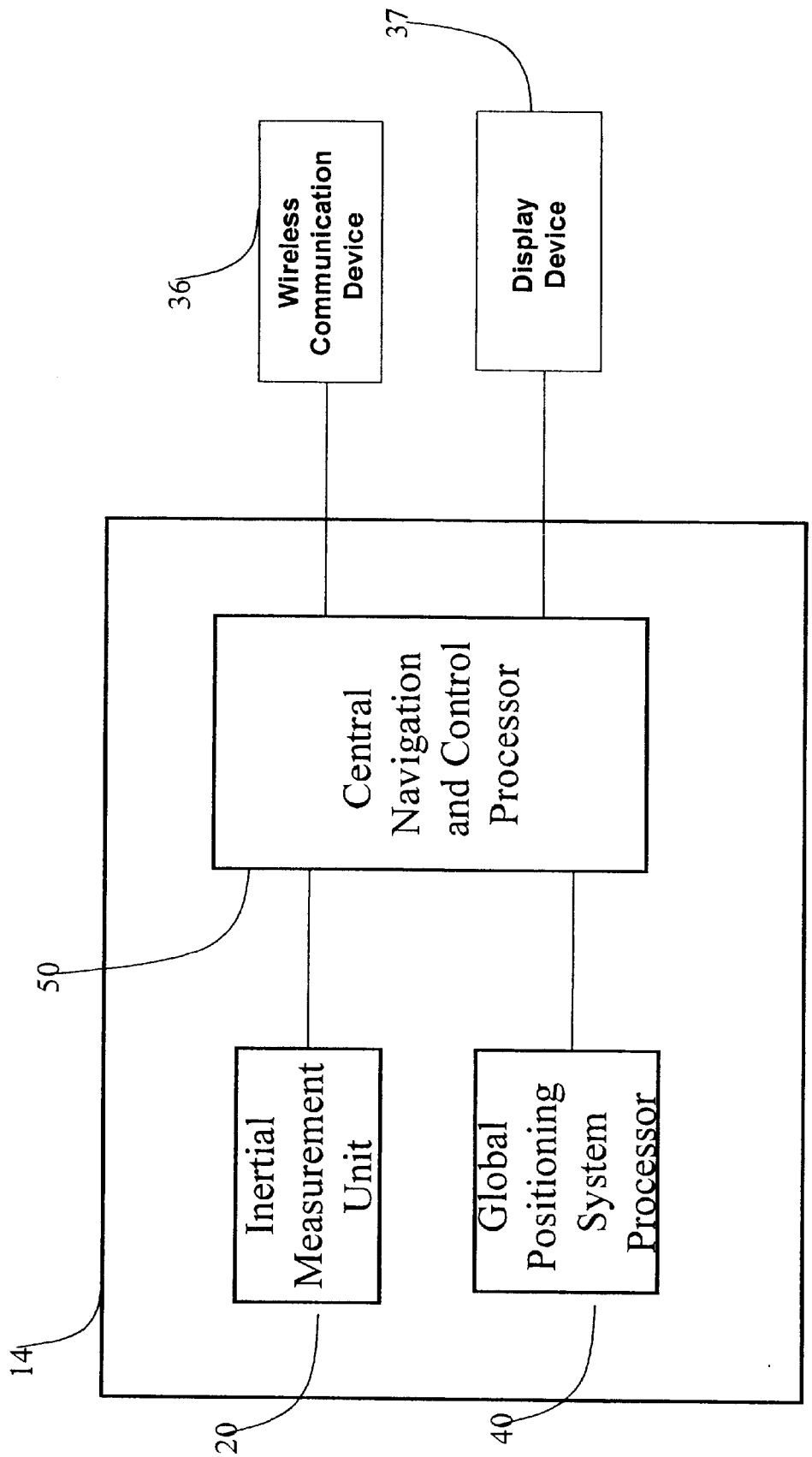
FIG. 26 is a block diagram of a universal navigation and control box for hand-held applications according to the present invention.
Figure 27:
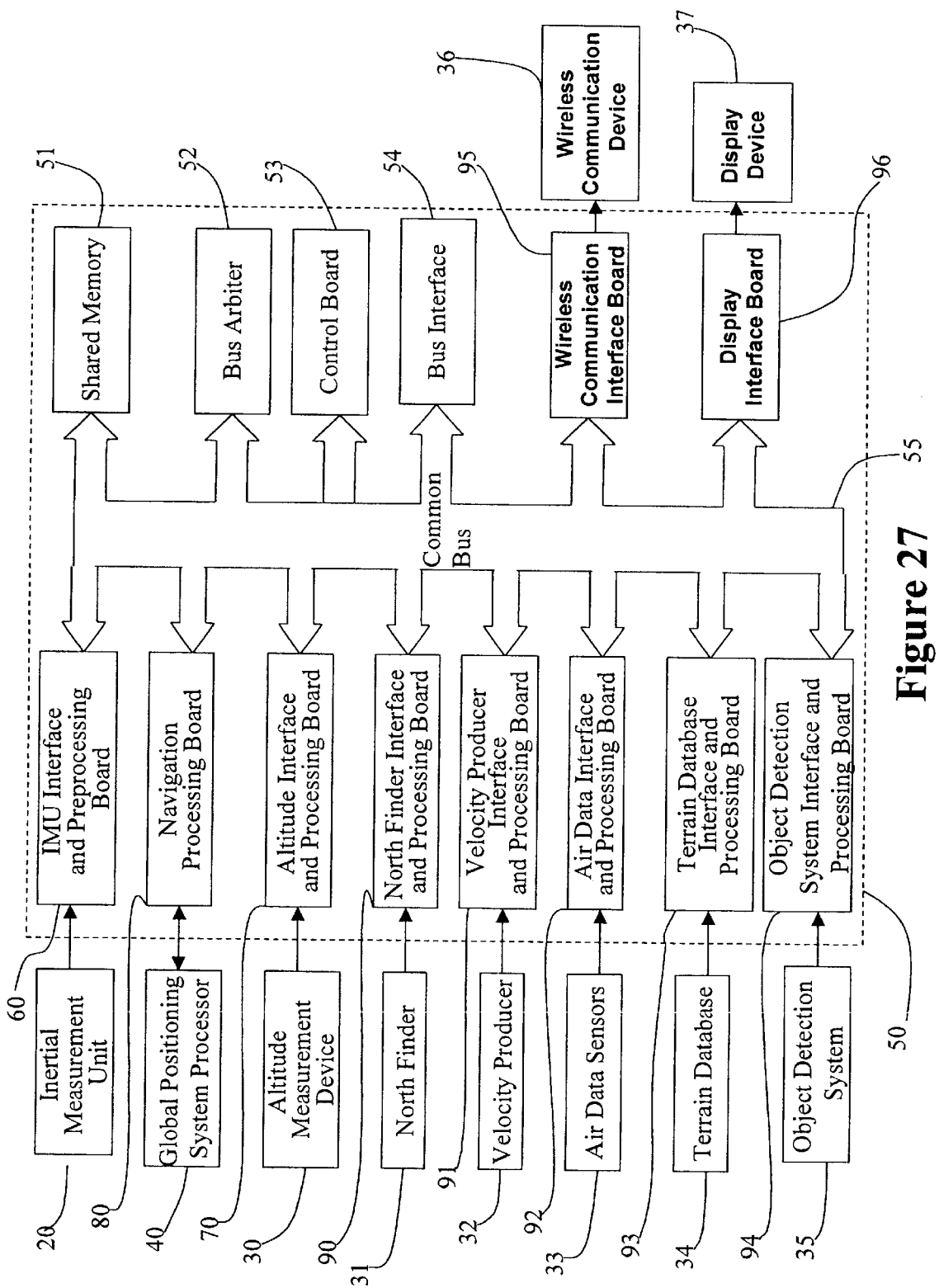
FIG. 27 is a block diagram of a universal navigation and control box with optional other devices for hand-held applications according to the present invention.

The velocity producer 32 is used to produce velocity measurement of the user with respect to ground or water. Referring to FIG. 22, the preferred velocity producer 32 is based on the Doppler effect principle, including:

an RF (radio frequency) velocity producer 3201, including a radar;

an acoustic velocity producer 3202, including a sonar, and a laser velocity producer 3203, including a laser radar.

Based on the Doppler effect, the velocity producer 32 can provide relative velocity measurements of the user to ground by sensing Doppler frequencies. The Doppler effect is a shift in the frequency of a wave radiated from the velocity producer 32 when reflected by an object in motion. In the case of the present invention, Doppler shifts are produced by the relative motion of the user and the ground from which the radio or laser or acoustic waves are reflected.

If the distance between the user and the ground is decreasing, the waves are compressed. Their wavelength is shortened and their frequency is increased. If the distance is increasing, the effect is just the opposite. The wave's Doppler frequency of the returned wave from the ground can be computed as $$f_d = 2\frac{V_R \cos L}{\lambda}$$

where $f_d$=Doppler frequency of the ground returned wave, hertz $V_R$=velocity of the user, feet (meters) per second L=angle between $V_R$ and line of sight to the patch $\lambda$=transmitted wavelength, same units as in $V_R$.

Referring to FIG. 22, the velocity producer 32 further comprises odometer interface 3204, so that the velocity producer 32 can input odometer measurement from an odometer installed in the vehicle when the system of the present invention is used for a land vehicle. The odometer measurement can be transformed to the relative velocity measurement of the user with respect to ground.

Referring to FIG. 22, the velocity producer 32 further comprises water vehicle velocimeter interface 3205, so that the velocity producer 32 can input velocity measurement with respect to water from a velocimeter installed in the water vehicle when the system of the present invention is used for a water vehicle.

Therefore, a third alternative embodiment of the first preferred embodiment of the present invention comprises the following steps:

(1) Perform GPS processing and receive GPS measurements, including pseudorange, carrier phase, Doppler shift, and time from the global positioning system processor 40, and pass them to the navigation processing board 80 of the central navigation processor 50.

(2) Receive inertial measurements including body angular rates and specific forces, from the inertial measurement unit 20, convert them into digital data of body acceleration and rotation by the IMU interface and preprocessing board 60, and send them to the navigation processing board 80 and the control board 53 via the common bus 55.

(3) Receive raw signal measurements proportional to velocity in the body frame with respect to ground or water from velocity producer 31, convert raw signal measurements into velocity data in the body frame with respect to ground or water by the velocity producer interface and processing board 91, and send the velocity data in the body frame with respect to ground or water to the navigation processing board 80 through the common bus 55.

(4) Perform inertial navigation system (INS) processing using an INS processor 81.

(5) Blend the output of the INS processor 81, the GPS measurements, and the velocity data in the body frame with respect to ground or water in a Kalman filter 83.

(6) Feed back the output of the Kalman filter 83 to the INS processor 81 to correct the INS navigation solution.

(7) Inject velocity and acceleration data from the INS processor 81 into a signal processor 45 of the global positioning system processor 40 to aid the code and carrier phase tracking of the global positioning system satellite signals.

(8) Inject the output of the signal processor 45 of the global positioning system processor 40, the output of the INS processor 81, the output of the Kalman filter 83 into a carrier phase integer ambiguity resolution module 82 to fix the global positioning system satellite signal carrier phase integer ambiguity number.

(9) Output the carrier phase integer number from the carrier phase integer ambiguity resolution module 82 into the Kalman filter 83 to further improve the positioning accuracy.

(10) Output the navigation data which are platform velocity, position, heading and time from the INS processor 81 to the control board 53 through the common bus 55.

A third alternative embodiment of the second preferred embodiment of the present invention comprises the following steps:

(1) Perform GPS processing and receive GPS measurements, including pseudorange, Doppler shift, and time from a global positioning system processor 40, and pass them to the navigation processing board 80.

(2) Receive inertial measurements which are body angular rates and specific forces from the inertial measurement unit 20, convert them into digital data of body acceleration and rotation by the IMU interface and preprocessing board 60, and send them to the navigation processing board 80 and the control board 53 through the common bus 55.

(3) Receive raw signal measurements proportional to velocity in the body frame with respect to ground or water from velocity producer 31, convert raw signal measurements into velocity data in the body frame with respect to ground or water by the velocity producer interface and processing board 91, and send the velocity data in the body frame with respect to ground or water to the navigation processing board 80 through the common bus 55.

(8) Perform INS processing using an INS processor 81.

(9) Blend the output of the INS processor 81, the GPS measurements, and the velocity data in the body frame with respect to ground or water in a Kalman filter 83.

(10) Feed back the output of the Kalman filter 83 to the INS processor 81 to correct the INS navigation solution.

(11) Output the navigation data which are platform velocity, position, heading and time from the INS processor 81 to the control board 53 via the common bus 55.

(9) Inject velocity and acceleration data from the INS processor 81 into a micro-processor 454 of the global positioning system processor 40 to aid the code tracking of the global positioning system satellite signals.

A third alternative of the third preferred embodiment of the present invention comprises the following steps:

(1) Perform GPS processing and receive GPS navigation solution, including position and velocity, and time from a global positioning system processor 80 and pass them to the navigation processing board 80.

(2) Receive inertial measurements, including body angular rates and specific forces from an inertial measurement unit 20, convert them into digital data of body acceleration and rotation by the IMU interface and preprocessing board 60, and send them to the navigation processing board 80 and the control board 53 through the common bus 55.

(3) Receive raw signal measurements proportional to velocity in the body frame with respect to ground or water from velocity producer 31, convert raw signal measurements into velocity data in the body frame with respect to ground or water by the velocity producer interface and processing board 91, and send the velocity data in the body frame with respect to ground or water to the navigation processing board 80 through the common bus 55.

(4) Perform INS processing using an INS processor 81.

(5) Blend the output of the INS processor 81, the GPS measurements, and send the velocity data in the body frame with respect to ground or water in a Kalman filter 83.

(6) Feed back the output of the Kalman filter 83 to the INS processor 81 to correct the INS navigation solution.

(7) Output the navigation data which are platform velocity, position, heading and time from the INS processor 81 to the control board 53 through the common bus 55.

In some applications, the north finder 31, and velocity producer 32 can be incorporated together with the global positioning system processor 40 and inertial measurement unit 20.

Therefore, a fourth alternative embodiment of the first preferred embodiment of the present invention comprises the following steps:

(1) Perform GPS processing and receive GPS measurements, including pseudorange, carrier phase, Doppler shift, and time from the global positioning system processor 40, and pass them to the navigation processing board 80 of the central navigation processor 50.

(2) Receive inertial measurements including body angular rates and specific forces, from the inertial. measurement unit 20, convert them into digital data of body acceleration and rotation by the IMU interface and preprocessing board 60, and send them to the navigation processing board 80 and the control board 53 via the common bus 55.

(3) Receive the earth's magnetic vector measurement from the magnetometer 31 and pitch and roll angle from the navigation board 80 through the common bus 55, compute the magnetic heading angle using the earth's magnetic vector measurement and pitch and roll angle by the north finder interface and processing board 90, and send the magnetic heading angle to the navigation processing board 80 through the common bus 55.

(4) Receive raw signal measurements proportional to velocity in the body frame with respect to ground or water from velocity producer 31, convert raw signal measurements into velocity data in the body frame with respect to ground or water by the velocity producer interface and processing board 91, and send the velocity data in the body frame with respect to ground or water to the navigation processing board 80 through the common bus 55.

(5) Perform inertial navigation system (INS) processing using an INS processor 81.

(6) Blend the output of the INS processor 81, the GPS measurements, the magnetic heading angle, and the velocity data in the body frame with respect to ground or water in a Kalman filter 83.

(7) Feed back the output of the Kalman filter 83 to the INS processor 81 to correct the INS navigation solution.

(8) Inject velocity and acceleration data from the INS processor 81 into a signal processor 45 of the global positioning system processor 40 to aid the code and carrier phase tracking of the global positioning system satellite signals.

(9) Inject the output of the signal processor 45 of the global positioning system processor 40, the output of the INS processor 81, the output of the Kalman filter 83 into a carrier phase integer ambiguity resolution module 82 to fix the global positioning system satellite signal carrier phase integer ambiguity number.

(10) Output the carrier phase integer number from the carrier phase integer ambiguity resolution module 82 into the Kalman filter 83 to further improve the positioning accuracy.

(11) Output the navigation data which are platform velocity, position, heading and time from the INS processor 81 to the control board 53 through the common bus 55.

A fourth alternative embodiment of the second preferred embodiment of the present invention comprises the following steps:

(1) Perform GPS processing and receive GPS measurements, including pseudorange, Doppler shift, and time from a global positioning system processor 40, and pass them to the navigation processing board 80.

(2) Receive inertial measurements which are body angular rates and specific forces from the inertial measurement unit 20, convert them into digital data of body acceleration and rotation by the IMU interface and preprocessing board 60, and send them to the navigation processing board 80 and the control board 53 through the common bus 55.

(3) Receive the earth's magnetic vector measurement from the magnetometer 31 and pitch and roll angle from the navigation board 80 through the common bus 55, compute the magnetic heading angle using the earth's magnetic vector measurement and pitch and roll angle by the north finder interface and processing board 90, and send the magnetic heading angle to the navigation processing board 80 through the common bus 55.

(4) Receive raw signal measurements proportional to velocity in the body frame with respect to ground or water from velocity producer 31, convert raw signal measurements into velocity data in the body frame with respect to ground or water by the velocity producer interface and processing board 91, and send the velocity data in the body frame with respect to ground or water to the navigation processing board 80 through the common bus 55.

(5) Perform INS processing using an INS processor 81.

(6) Blend the output of the INS processor 81, the GPS measurements, the magnetic heading angle, and the velocity data in the body frame with respect to ground or water in a Kalman filter 83.

(7) Feed back the output of the Kalman filter 83 to the INS processor 81 to correct the INS navigation solution.

(8) Output the navigation data which are platform velocity, position, heading and time from the INS processor 81 to the control board 53 via the common bus 55.

(9) Inject velocity and acceleration data from the INS processor 81 into a micro-processor 454 of the global positioning system processor 40 to aid the code tracking of the global positioning system satellite signals.

A fourth alternative of the third preferred embodiment of the present invention comprises the following steps:

(1) Perform GPS processing and receive GPS navigation solution, including position and velocity, and time from a global positioning system processor 80 and pass them to the navigation processing board 80.

(2) Receive inertial measurements, including body angular rates and specific forces from an inertial measurement unit 20, convert them into digital data of body acceleration and rotation by the IMU interface and preprocessing board 60, and send them to the navigation processing board 80 and the control board 53 through the common bus 55.

(3) Receive the earth's magnetic vector measurement from the magnetometer 31 and pitch and roll angle from the navigation board 80 through the common bus 55, compute the magnetic heading angle using the earth's magnetic vector measurement and pitch and roll angle by the north finder interface and processing board 90, and send the magnetic heading angle to the navigation processing board 80 through the common bus 55.

(4) Receive raw signal measurements proportional to velocity in the body frame with respect to ground or water from velocity producer 31, convert raw signal measurements into velocity data in the body frame with respect to ground or water by the velocity producer interface and processing board 91, and send the velocity data in the body frame with respect to ground or water to the navigation processing board 80 through the common bus 55.

(5) Perform INS processing using an INS processor 81.

(6) Blend the output of the INS processor 81, the GPS measurements, the magnetic heading angle, and send the velocity data in the body frame with respect to ground or water in a Kalman filter 83.

(7) Feed back the output of the Kalman filter 83 to the INS processor 81 to correct the INS navigation solution.

(8) Output the navigation data which are platform velocity, position, heading and time from the INS processor 81 to the control board 53 through the common bus 55.

Therefore, a fifth alternative embodiment of the first preferred embodiment of the present invention comprises the following steps:

(1) Perform GPS processing and receive GPS measurements, including pseudorange, carrier phase, Doppler shift, and time from the global positioning system processor 40, and pass them to the navigation processing board 80 of the central navigation processor 50.

(2) Receive inertial measurements including body angular rates and specific forces, from the inertial measurement unit 20, convert them into digital data of body acceleration and rotation by the IMU interface and preprocessing board 60, and send them to the navigation processing board 80 and the control board 53 via the common bus 55.

(3) Receive an altitude measurement from the altitude measurement device 30, convert it to mean sea level (MSL) height in digital data type by the altitude interface and processing board 70, and pass it to the navigation processing board 80 and the control board 53 through the common bus 55.

(4) Receive the earth's magnetic vector measurement from the magnetometer 31 and pitch and roll angle from the navigation board 80 through the common bus 55, compute the magnetic heading angle using the earth's magnetic vector measurement and pitch and roll angle by the north finder interface and processing board 90, and send the magnetic heading angle to the navigation processing board 80 through the common bus 55.

(5) Receive raw signal measurements proportional to velocity in the body frame with respect to ground or water from velocity producer 31, convert raw signal measurements into velocity data in the body frame with respect to ground or water by the velocity producer interface and processing board 91, and send the velocity data in the body frame with respect to ground or water to the navigation processing board 80 through the common bus 55.

(6) Perform inertial navigation system (INS) processing using an INS processor 81.

(7) Blend the output of the INS processor 81, the GPS measurements, the altitude measurement, the magnetic heading angle, and the velocity data in the body frame with respect to ground or water in a Kalman filter 83.

(8) Feed back the output of the Kalman filter 83 to the INS processor 81 to correct the INS navigation solution.

(9) Inject velocity and acceleration data from the INS processor 81 into a signal processor 45 of the global positioning system processor 40 to aid the code and carrier phase tracking of the global positioning system satellite signals.

(10) Inject the output of the signal processor 45 of the global positioning system processor 40, the output of the INS processor 81, the output of the Kalman filter 83 into a carrier phase integer ambiguity resolution module 82 to fix the global positioning system satellite signal carrier phase integer ambiguity number.

(11) Output the carrier phase integer number from the carrier phase integer ambiguity resolution module 82 into the Kalman filter 83 to further improve the positioning accuracy.

(12) Output the navigation data which are platform velocity, position, altitude, heading and time from the INS processor 81 to the control board 53 through the common bus 55.

A fifth alternative embodiment of the second preferred embodiment of the present invention comprises the following steps:

(1) Perform GPS processing and receive GPS measurements, including pseudorange, Doppler shift, and time from a global positioning system processor 40, and pass them to the navigation processing board 80.

(2) Receive inertial measurements which are body angular rates and specific forces from the inertial measurement unit 20, convert them into digital data of body acceleration and rotation by the IMU interface and preprocessing board 60, and send them to the navigation processing board 80 and the control board 53 through the common bus 55.

(3) Receive an altitude measurement from the altitude measurement device 30, convert it to mean sea level (MSL) height in digital data type by the altitude interface and processing board 70, and pass it to the navigation processing board 80 and the control board 53 through the common bus 55.

(4) Receive the earth's magnetic vector measurement from the magnetometer 31 and pitch and roll angle from the navigation board 80 through the common bus 55, compute the magnetic heading angle using the earth's magnetic vector measurement and pitch and roll angle by the north finder interface and processing board 90, and send the magnetic heading angle to the navigation processing board 80 through the common bus 55.

(5) Receive raw signal measurements proportional to velocity in the body frame with respect to ground or water from velocity producer 31, convert raw signal measurements into velocity data in the body frame with respect to ground or water by the velocity producer interface and processing board 91, and send the velocity data in the body frame with respect to ground or water to the navigation processing board 80 through the common bus 55.

(6) Perform INS processing using an INS processor 81.

(7) Blend the output of the INS processor 81, the GPS measurements, the altitude measurement, the magnetic heading angle, and the velocity data in the body frame with respect to ground or water in a Kalman filter 83.

(8) Feed back the output of the Kalman filter 83 to the INS processor 81 to correct the INS navigation solution.

(9) Output the navigation data which are platform velocity, position, altitude, heading and time from the INS processor 81 to the control board 53 via the common bus 55.

(10) Inject velocity and acceleration data from the INS processor 81 into a micro-processor 454 of the global positioning system processor 40 to aid the code tracking of the global positioning system satellite signals.

A fifth alternative of the third preferred embodiment of the present invention comprises the following steps:

(1) Perform GPS processing and receive GPS navigation solution, including position and velocity, and time from a global positioning system processor 80 and pass them to the navigation processing board 80.

(2) Receive inertial measurements, including body angular rates and specific forces from an inertial measurement unit 20, convert them into digital data of body acceleration and rotation by the IMU interface and preprocessing board 60, and send them to the navigation processing board 80 and the control board 53 through the common bus 55.

(3) Receive an altitude measurement from the altitude measurement device 30, convert it to mean sea level (MSL) height in digital data type by the altitude interface and processing board 70, and pass it to the navigation processing board 80 and the control board 53 through the common bus 55.

(4) Receive the earth's magnetic vector measurement from the magnetometer 31 and pitch and roll angle from the navigation board 80 through the common bus 55, compute the magnetic heading angle using the earth's magnetic vector measurement and pitch and roll angle by the north finder interface and processing board 90, and send the magnetic heading angle to the navigation processing board 80 through the common bus 55.

(5) Receive raw signal measurements proportional to velocity in the body frame with respect to ground or water from velocity producer 31, convert raw signal measurements into velocity data in the body frame with respect to ground or water by the velocity producer interface and processing board 91, and send the velocity data in the body frame with respect to ground or water to the navigation processing board 80 through the common bus 55.

(6) Perform INS processing using an INS processor 81.

(7) Blend the output of the INS processor 81, the GPS measurements, the altitude measurement, the magnetic heading angle, and send the velocity data in the body frame with respect to ground or water in a Kalman filter 83.

(8) Feed back the output of the Kalman filter 83 to the INS processor 81 to correct the INS navigation solution.

(9) Output the navigation data which are platform velocity, position, altitude, heading and time from the INS processor 81 to the control board 53 through the common bus 55.

Figure 28:
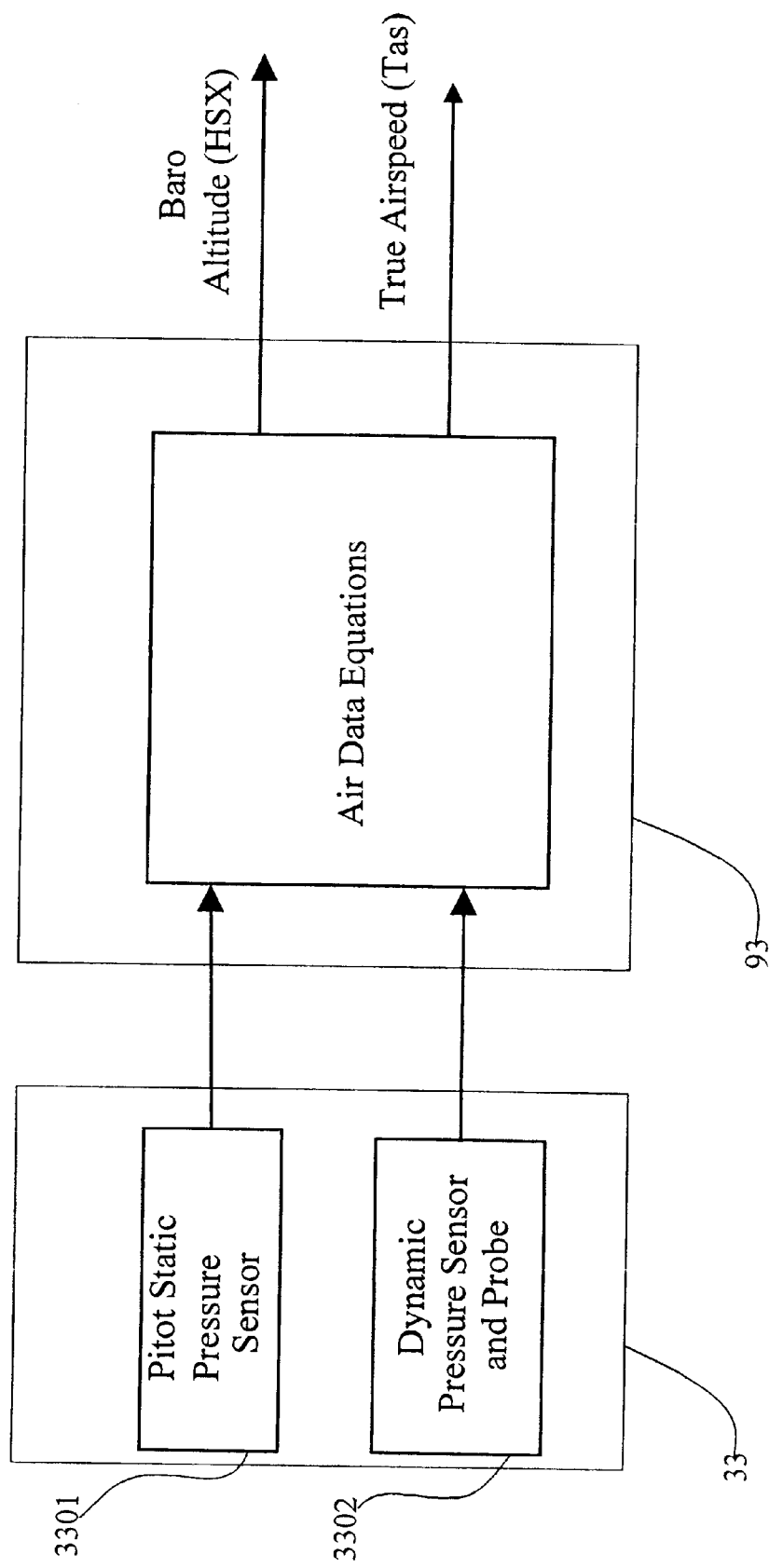
FIG. 28 is a block diagram of the air data sensors and air data interface and processing board.

In order to obtain true airspeed and baro altitude measurements, which is necessary data for a flight control system, the universal navigation and control box 14 further comprises air data sensors 33. Referring to FIG. 28, the air data sensor 33 further comprises a pitot static pressure sensor to provide the static pressure and pitot pressure measurements and a dynamic pressure sensor and probe 3302 to provide dynamic pressure and freestream air temperature measurements. The air data interface and processing board 93 computes the baro altitude and true airspeed measurements to the control board 53 using the air data equations.

In case of aircraft application of the present invention, it is important for the aircraft to be capable of avoiding collision with ground/water. Therefore, the universal navigation and control box 14 further comprises a terrain database 34. The terrain database 34 can provide the altitude of surrounding terrain of the user's current position. The provided altitude of surrounding terrain of the user's current position is further compared with the altitude of the user from the navigation processing board 80 through the common bus 55 by the terrain database interface and processing board 93 to determine if there is potential collision with terrain. If there is potential collision with terrain, the terrain database interface and processing board 93 sends the terrain collision warning message to the control board 53. The control board 53 releases the terrain collision warning message to the cockpit display 16. Referring to FIG. 12, the terrain database 722 can be replaced by means of receiving terrain data from the terrain database interface and processing board 93.

In case of vehicle application of the present invention, it is important for the aircraft to have capability of avoiding collision with moving near objects. Therefore, the universal navigation and control box 14 further comprises an object detection system 35.

The object detection system 35 is used to obtain the position data of near objects. The object detection system provides notice that an object has been found in the neighborhood. The object detection system 35 does not necessarily identify the detailed character of the object although it could do so on occasion. It simply alerts that there is an object in the neighborhood that merits further attention.

Object detection is effected by exploiting object features that are sufficient to discriminate it from its background or the surrounding environment it is embedded in. For example, the object detection system 35 can alert as to the presence of an airplane but possibly with no regard as to whether it is a Boeing 747 or an Airbus 320.

The object detection system interface and processing board 94 follows the motion of the object and its distance. With these two parameters known, appropriate logic is then formulated to accommodate collision avoidance considerations.

Referring to FIG. 29, the object detection system 35 can be an imager 3501 or sensors 3502. The sensors 3502 include radar, laser, ladar, sonar, infrared and video, which can execute full/partial coverage of the surrounding views.

The imager 3501 can be a passive and/or active imager, including an LDRI (laser dynamic range sensor) imager.

Referring to FIG. 29, the objective detection system 35 can further be a data link 3503 to receive the position data from friendly vehicles to avoid potential collision with the friendly vehicles.

The object detection system interface and processing board 94 of the present invention substantially achieves the following features:

(1) The object detection system interface and processing board 94 determines the object proximity status with the potential approaching object in a certain time epoch.

(2) The object detection system interface and processing board 94 receives approaching object positioning information from the object detection system 35. The positioning information includes the current time epoch and the position, velocity vector at the epoch.

(3) The object detection system interface and processing board 94 calculates and determines the Approaching Object Zone (AOZ). The AAZ is defined as the reachable airspace of the approaching object.

(4) The object detection system interface and processing board 94 receives the host positioning information from the navigation processing board 80. The positioning information includes the epoch, and the position, and the velocity vector at the epoch.

(5) The object detection system interface and processing board 94 calculates and determines the region that the host might reach at the next calculation epoch under the current positioning information.

Certain logic is applied to calculate the intersection of the two regions and a certain criteria is applied to determine the warning status of the host vehicle.

The warning status is output to the cockpit display 16 through the control board 53.

The data link 3503 is designed based on the following basic requirements:

Group Registration: Any vehicle approaching the airspace must register into the collision avoidance communication system to obtain communication resources.

Group Un-registration: Any vehicle leaving the airspace must be unregistered from the communication system in order to release the communication resources.

Routine Data Exchange: With this data exchange logic, each vehicle in the airspace equally shares the other vehicle's information. The information includes: vehicle's realtime dynamic state and its maneuver parameters.

According to the definition of the International Standard Organization (ISO), any communication network can be divided into 7 layers. The ISO developed Open System Interconnection (OSI) protocols for data networking facilitates multi-vendor equipment interoperability.

The foregoing data link as one embodiment of the object detection system interface 35 is designed as a three layer system. The lowest layer is the physical network structure. The middle layer offers the basic management facilities to access the resources in the lowest layer and the highest layer. The application logic is applied at the highest communication layer.

The lower two layers relate to the specific network system. The application layer design includes 5 submodules: Incoming Package Management, Outgoing Package Management, Package Process Logic, Package Assemble Logic, and Online Vehicle Register Table.

Incoming Package Management

This module is used to receive the data package from the lower layer. It buffers, analyzes and classifies the incoming data packages.

Package Process Logic

This module interprets the packaged data and makes them available for use in the upper layer of the application.

Online Vehicle Register Table

This module manages the register table for group members. Every vehicle in the communication community in the airspace keeps items in the register table. This table is used to keep track of the communication status of all the members in the group. This table is critical for the communication system management.

Outgoing Package Management

This module takes charge of the transmission buffering, priority management of the outgoing data package. Typically this module prepares the data package for the lower layer.

Package Assemble Logic

This module translates the instruction from the upper layer into a data package for broadcasting in the communication system.

In some applications, for example, a hand-held navigator, a user needs to exchange the user position information with other users. Therefore, the universal navigation and control box 14 further comprises a wireless communication device 36.

In some applications, for example, a hand-held navigator, a user needs to display location and surrounding information by accessing a terrain database with the user position information. Therefore, the universal navigation and control box 14 further comprises a display device 37.

What is claimed is:

1. A positioning and data integrating method, comprising the steps of:

(a) performing GPS processing and receive GPS measurements, including pseudorange, carrier phase, Doppler shift, and time from a global positioning system processor, and passing said GPS measurements to a navigation processing board of a central navigation processor;

(b) receiving inertial measurements, including body angular rates and specific forces, from an inertial measurement unit, converting said inertial measurements into digital data of body acceleration and rotation by an IMU interface and preprocessing board, and sending said digital data of body acceleration and rotation to said navigation processing board and a control board via a common bus;

(c) receiving an earth's magnetic vector measurement from a magnetometer and a pitch and roll angle from a navigation board through said common bus, computing a magnetic heading angle using said earth's magnetic vector measurement and said pitch and roll angle by a north finder interface and processing board, and sending said magnetic heading angle to said navigation processing board through said common bus;

(d) performing an inertial navigation system (INS) processing using an INS processor;

(e) blending an output of said INS processor and said GPS measurements in a Kalman filter;

(f) feeding back an output of said Kalman filter to said INS processor to correct an INS navigation solution:

(g) injecting said velocity and acceleration data from said INS processor into a signal processor of said global positioning system processor to aid said code and carrier phase tracking of said global positioning system satellite signals;

(h) injecting said output of said signal processor of said global positioning system processor, said output of said INS processor, said output of said Kalman filter into a carrier phase integer ambiguity resolution module to fix a global positioning system satellite signal carrier phase integer ambiguity number (i) outputting said carrier phase integer number from said carrier phase integer ambiguity resolution module into said Kalman filter to further improve said positioning accuracy; and (j) outputting said navigation data which are platform velocity, position, heading, and time data from said INS processor to said control board through said common bus.

2. The positioning and data integrating method, as recited in claim 1, wherein, the step (e) further comprises a step of blending said magnetic heading angle in said Kalman filter.

3. The positioning and data integrating method, as recited in claim 2, after the step (b), further comprising the steps of:
receiving an altitude measurement from an altitude measurement device,
converting said altitude measurement to a mean sea level (MSL) height in digital data type by an altitude interface and processing board, and
passing said MSL height to said navigation processing board and said control board through said common bus.

4. The positioning and data integrating method, as recited in claim 3, wherein the step (e) further comprises a step of blending said altitude measurement in said body frame with respect to ground or water in said Kalman filter.

5. The positioning and data integrating method, as recited in claim 4, after the step (b), further comprising the steps of:
receiving an altitude measurement from an altitude measurement device,
converting said altitude measurement to a mean sea level (MSL) height in digital data type by an altitude interface and processing board, and
passing said MSL height to said navigation processing board and said control board through said common bus.

6. The positioning and data integrating method, as recited in claim 5, wherein the step (e) further comprises a step of blending said altitude measurement in said body frame with respect to ground or water in said Kalman filter.

7. The positioning and data integrating method, as recited in claim 6, wherein in the step (j), said navigation data also includes an altitude which is also outputted from said INS processor to said control board through said common bus.

8. The positioning and data integrating method, as recited in claim 2, after the step (b), further comprising the steps of:
receiving an altitude measurement from an altitude measurement device,
converting said altitude measurement to a mean sea level (MSL) height in digital data type by an altitude interface and processing board, and
passing said MSL height to said navigation processing board and said control board through said common bus.

9. The positioning and data integrating method, as recited in claim 8, wherein the step (e) further comprises a step of blending said altitude measurement in said body frame with respect to ground or water in said Kalman filter.

10. The positioning and data integrating method, as recited in claim 9, wherein in the step (j), said navigation data also includes an altitude which is also outputted from said INS processor to said control board through said common bus.

11. A positioning and data integrating method, comprising the steps of:

(a) performing GPS processing and receive GPS measurements, including pseudorange, carrier phase, Doppler shift, and time from a global positioning system processor, and passing said GPS measurements to a navigation processing board of a central navigation processor;

(b) receiving inertial measurements, including body angular rates and specific forces, from an inertial measurement unit, converting said inertial measurements into digital data of body acceleration and rotation by an IMU interface and preprocessing board, and sending said digital data of body acceleration and rotation to said navigation processing board and a control board via a common bus;

(c) receiving raw signal measurements proportional to velocity in a body frame with respect to ground or water from a velocity producer, converting said raw signal measurements into velocity data in said body frame with respect to ground or water by a velocity producer interface and processing board, and sending said velocity data in said body frame with respect to ground or water to said navigation processing board through said common bus;

(d) performing an inertial navigation system (INS) processing using an INS processor;

(e) blending an output of said INS processor and said GPS measurements in a Kalman filter;

(f) feeding back an output of said Kalman filter to said INS processor to correct an INS navigation solution;

(g) injecting said velocity and acceleration data from said INS processor into a signal processor of said global positioning system processor to aid said code and carrier phase tracking of said global positioning system satellite signals;

(h) injecting said output of said signal processor of said global positioning system processor, said output of said INS processor, said output of said Kalman filter into a carrier phase integer ambiguity resolution module to fix a global positioning system satellite signal carrier phase integer ambiguity number (i) outputting said carrier phase integer number from said carrier phase integer ambiguity resolution module into said Kalman filter to further improve said positioning accuracy; and (j) outputting said navigation data which are platform velocity, position, heading, and time data from said INS processor to said control board through said common bus.

12. The positioning and data integrating method, as recited in claim 11, wherein the step (e) further comprises a step of blending said velocity data in said body frame with respect to ground or water in said Kalman filter.

13. The positioning and data integrating method, as recited in claim 12, after the step (b), further comprising the steps of:

receiving an altitude measurement from an altitude measurement device, converting said altitude measurement to a mean sea level (MSL) height in digital data type by an altitude interface and processing board, and passing said MSL height to said navigation processing board and said control board through said common bus.

14. The positioning and data integrating method, as recited in claim 13, wherein the step (e) further comprises a step of blending said altitude measurement in said body frame with respect to ground or water in said Kalman filter.

15. The positioning and data integrating method, as recited in claim 14, wherein in the step (j), said navigation data also includes an altitude which is also outputted from said INS processor to said control board through said common bus.

16. A positioning and data integrating method, comprising the steps of:

(a) performing GPS processing and receiving GPS measurements, including pseudorange, Doppler shift, and time from a global positioning system processor, and pass said GPS measurements to a navigation processing board;

(b) receiving inertial measurements, including body angular rates and specific forces, from an inertial measurement unit, converting said inertial measurements into digital data of body acceleration and rotation by an IMU interface and preprocessing board, and sending said digital data of body acceleration and rotation to said navigation processing board and a control board through a common bus;

(c) receiving an earth's magnetic vector measurement from a magnetometer and a pitch and roll angle from a navigation board through said common bus, computing a magnetic heading angle using said earth's magnetic vector measurement and said pitch and roll angle by a north finder interface and processing board, and sending said magnetic heading angle to said navigation processing board through said common bus;

(d) performing INS processing in an INS processor;

(e) blending an output of said INS processor and said GPS measurements in a Kalman filter;

(f) feeding back an output of said Kalman filter to said INS processor to correct an INS navigation solution;

(g) outputting said navigation data, including platform velocity, position, heading and time data, from said INS processor to said control board via said common bus; and (h) injecting velocity and acceleration data from said INS processor into a micro-processor of said global positioning system processor to aid a code tracking of global positioning system satellite signals.

17. The positioning and data integrating method, as recited in claim 16, wherein, the step (e) further comprises a step of blending said magnetic heading angle in said Kalman filter.

18. The positioning and data integrating method, as recited in claim 17, after the step (b), further comprising the steps of:

receiving raw signal measurements proportional to velocity in a body frame with respect to ground or water from a velocity producer, converting said raw signal measurements into velocity data in said body frame with respect to ground or water by a velocity producer interface and processing board, and sending said velocity data in said body frame with respect to ground or water to said navigation processing board through said common bus.

19. The positioning and data integrating method, as recited in claim 18, wherein the step (e) further comprises a step of blending said velocity data in said body frame with respect to ground or water in said Kalman filter.

20. The positioning and data integrating method, as recited in claim 19, after the step (b), further comprising the steps of:

receiving an altitude measurement from an altitude measurement device, converting said altitude measurement to a mean sea level (MSL) height in digital data type by an altitude interface and processing board, and passing said MSL height to said navigation processing board and said control board through said common bus.

21. The positioning and data integrating method, as recited in claim 20, wherein the step (d) further comprises a step of blending said altitude measurement in said body frame with respect to ground or water in said Kalman filter.

22. The positioning and data integrating method, as recited in claim 21, wherein in the step (g), said navigation data also includes an altitude which is also outputted from said INS processor to said control board through said common bus.

23. The positioning and data integrating method, as recited in claim 17, after the step (b), further comprising the steps of:

receiving an altitude measurement from an altitude measurement device, converting said altitude measurement to a mean sea level (MSL) height in digital data type by an altitude interface and processing board, and passing said MSL height to said navigation processing board and said control board through said common bus.

24. The positioning and data integrating method, as recited in claim 23, wherein the step (e) further comprises a step of blending said altitude measurement in said body frame with respect to ground or water in said Kalman filter.

25. The positioning and data integrating method, as recited in claim 24, wherein in the step (g), said navigation data also includes an altitude which is also outputted from said INS processor to said control board through said common bus.

26. A positioning and data integrating method, comprising the steps of:

(a) performing GPS processing and receiving GPS measurements, including pseudorange, Doppler shift, and time from a global positioning system processor, and pass said GPS measurements to a navigation processing board;

(b) receiving inertial measurements, including body angular rates and specific forces, from an inertial measurement unit, converting said inertial measurements into digital data of body acceleration and rotation by an IMU interface and preprocessing board, and sending said digital data of body acceleration and rotation to said navigation processing board and a control board through a common bus;

(c) receiving raw signal measurements proportional to velocity in a body frame with respect to ground or water from a velocity producer, converting said raw signal measurements into velocity data in said body frame with respect to ground or water by a velocity producer interface and processing board, and sending said velocity data in said body frame with respect to ground or water to said navigation processing board through said common bus;

(d) performing INS processing in an INS processor;

(e) blending an output of said INS processor and said GPS measurements in a Kalman filter;

(f) feeding back an output of said Kalman filter to said INS processor to correct an INS navigation solution;

(g) outputting said navigation data, including platform velocity, position, heading and time data, from said INS processor to said control board via said common bus; and (h) injecting velocity and acceleration data from said INS processor into a micro-processor of said global positioning system processor to aid a code tracking of global positioning system satellite signals.

27. The positioning and data integrating method, as recited in claim 26, wherein the step (e) further comprises a step of blending said velocity data in said body frame with respect to ground or water in said Kalman filter.

28. The positioning and data integrating method, as recited in claim 27, after the step (b), further comprising the steps of:

receiving an altitude measurement from an altitude measurement device, converting said altitude measurement to a mean sea level (MSL) height in digital data type by an altitude interface and processing board, and passing said MSL height to said navigation processing board and said control board through said common bus.

29. The positioning and data integrating method, as recited in claim 28, wherein the step (e) further comprises a step of blending said altitude measurement in said body frame with respect to ground or water in said Kalman filter.

30. The positioning and data integrating method, as recited in claim 29, wherein in the step (g), said navigation data also includes an altitude which is also outputted from said INS processor to said control board through said common bus.

31. A positioning and data integrating method, comprising the steps of:

(a) performing GPS processing and receiving GPS navigation solution, including position and velocity, and time from a global positioning system processor and passing said navigation solution to a navigation processing board;

(b) receiving inertial measurements, including body angular rates and specific forces, from an inertial measurement unit, converting said inertial measurement into digital data of body acceleration and rotation by an IMU interface and preprocessing board, and sending said digital data of body acceleration and rotation to said navigation processing board and a control board through a common bus;

(c) receiving an earth's magnetic vector measurement from a magnetometer and a pitch and roll angle from a navigation board through said common bus, computing a magnetic heading angle using said earth's magnetic vector measurement and said pitch and roll angle by a north finder interface and processing board, and sending said magnetic heading angle to said navigation processing board through said common bus;

(d) performing INS processing using an INS processor;

(e) blending an output of said INS processor and said GPS measurements in a Kalman filter;

(f) feeding back an output of said Kalman filter to said INS processor to correct an INS navigation solution; and (g) outputting said navigation data, including platform velocity, position, heading and time data, from said INS processor to said control board through said common bus.

32. The positioning and data integrating method, as recited in claim 31, wherein, the step (e) further comprises a step of blending said magnetic heading angle in said Kalman filter.

33. The positioning and data integrating method, as recited in claim 32, after the step (b), further comprising the steps of:

receiving raw signal measurements proportional to velocity in a body frame with respect to ground or water from a velocity producer, converting said raw signal measurements into velocity data in said body frame with respect to ground or water by a velocity producer interface and processing board, and sending said velocity data in said body frame with respect to ground or water to said navigation processing board through said common bus.

34. The positioning and data integrating method, as recited in claim 33, wherein the step (e) further comprises a step of blending said velocity data in said body frame with respect to ground or water in said Kalman filter.

35. The positioning and data integrating method, as recited in claim 34, after the step (b), further comprising the steps of:

receiving an altitude measurement from an altitude measurement device, converting said altitude measurement to a mean sea level (MSL) height in digital data type by an altitude interface and processing board, and passing said MSL height to said navigation processing board and said control board through said common bus.

36. The positioning and data integrating method, as recited in claim 35, wherein the step (e) further comprises a step of blending said altitude measurement in said body frame with respect to ground or water in said Kalman filter.

37. The positioning and data integrating method, as recited in claim 36, wherein in the step (g), said navigation data also includes an altitude which is also outputted from said INS processor to said control board through said common bus.

38. The positioning and data integrating method, as recited in claim 32, after the step (b), further comprising the steps of:

receiving an altitude measurement from an altitude measurement device, converting said altitude measurement to a mean sea level (MSL) height in digital data type by an altitude interface and processing board, and passing said MSL height to said navigation processing board and said control board through said common bus.

39. The positioning and data integrating method, as recited in claim 38, wherein the step (e) further comprises a step of blending said altitude measurement in said body frame with respect to ground or water in said Kalman filter.

40. The positioning and data integrating method, as recited in claim 39, wherein in the step (g), said navigation data also includes an altitude which is also outputted from said INS processor to said control board through said common bus.

41. A positioning and data integrating method, comprising the steps of:

(a) performing GPS processing and receiving GPS navigation solution, including position and velocity, and time from a global positioning system processor and passing said navigation solution to a navigation processing board;

(b) receiving raw signal measurements proportional to velocity in a body frame with respect to ground or water from a velocity producer, converting said raw signal measurements into velocity data in said body frame with respect to ground or water by a velocity producer interface and processing board, and sending said velocity data in said body frame with respect to ground or water to said navigation processing board through said common bus;

(c) receiving an earth's magnetic vector measurement from a magnetometer and a pitch and roll angle from a navigation board through said common bus, computing a magnetic heading angle using said earth's magnetic vector measurement and said pitch and roll angle by a north finder interface and processing board, and sending said magnetic heading angle to said navigation processing board through said common bus;

(d) performing INS processing using an INS processor;

(e) blending an output of said INS processor and said GPS measurements in a Kalman filter;

(f) feeding back an output of said Kalman filter to said INS processor to correct an INS navigation solution; and (g) outputting said navigation data, including platform velocity, position, heading and time data, from said INS processor to said control board through said common bus.

42. The positioning and data integrating method, as recited in claim 41, wherein the step (e) further comprises a step of blending said velocity data in said body frame with respect to ground or water in said Kalman filter.

43. The positioning and data integrating method, as recited in claim 42, after the step (b), further comprising the steps of:

receiving an altitude measurement from an altitude measurement device, converting said altitude measurement to a mean sea level (MSL) height in digital data type by an altitude interface and processing board, and passing said MSL height to said navigation processing board and said control board through said common bus.

44. The positioning and data integrating method, as recited in claim 43, wherein the step (e) further comprises a step of blending said altitude measurement in said body frame with respect to ground or water in said Kalman filter.

45. The positioning and data integrating method, as recited in claim 44, wherein in the step (g), said navigation data also includes an altitude which is also outputted from said INS processor to said control board through said common bus.

46. A universal navigation and control box, comprising:

an inertial measurement unit (IMU) for providing inertial measurements including body angular rates and specific forces;

a global positioning system (GPS) processor for providing GPS measurements including pseudorange, carrier phase, and Doppler shift;

a central navigation and control processor for processing said GPS measurements and said inertial measurements to derive a navigation solution, which are connected with said GPS processor, said IMU and a data bus, comprising an IMU interface and preprocessing board, a navigation processing board, a shared memory card for storing data, a bus arbiter for monitoring and managing a common bus and a data bus, and a control board for controlling the data stream mutually connected together via said common bus, wherein said navigation processing board is connected with said GPS processor and a data bus for receiving said GPS measurements, said IMU interface and preprocessing board is connected with said IMU for converting said inertial measurements received from said IMU into digital data of body acceleration and rotation which are sent to said navigation processing board and said control board via said common bus, and said bus interface is connected between said control board and said data bus; and a north finder to provide heading measurement of a carrier of said universal navigation and control box for said navigation processing board over a north finder interface and processing board and said common bus.

47. The universal navigation and control box, as recited in claim 46, wherein said north finder is a magnetic sensor for sensing an earth's magnetic field to measure a heading angle of said carrier, wherein an earth's magnetic vector measurement is received from said magnetic sensor and pitch and roll angle from said navigation board through said common bus, so as to compute said magnetic heading angle using said earth's magnetic vector measurement and pitch and roll angle by said north finder interface and processing board, and send said magnetic heading angle to said navigation processing board through said common bus.

48. The universal navigation and control box, as recited in claim 47, further comprising a velocity producer for providing velocity measurement of said carrier of said universal navigation and control box with respect to said ground or water for said navigation processing board over a velocity producer interface and processing board and said common bus.

49. The universal navigation and control box, as recited in claim 48, wherein said velocity producer produces raw signal measurements proportional to velocity in said body frame with respect to ground or water and convert said raw signal measurements into velocity data in a body frame with respect to ground or water by said velocity producer interface and processing board, and send said velocity data in said body frame with respect to ground or water to said navigation processing board through said common bus.

50. The universal navigation and control box, as recited in claim 49, further comprising an altitude measurement device for providing vehicle altitude measurement and an altitude interface and processing board which is connected with said altitude measurement device for converting said altitude measurement received from said altitude measurement device to mean sea level height in digital data type which are passed to said navigation processing board and said control board through said common bus.

51. The universal navigation and control box, as recited in claim 50, further comprising an air data sensors which comprises a pitot static pressure sensor to provide static pressure and pitot pressure measurements and a dynamic pressure sensor and probe to provide dynamic pressure and freestream air temperature measurements, and an air data interface and processing board for computing baro altitude and true airspeed measurements to said control board using an air data equations.

52. The universal navigation and control box, as recited in claim 46, further comprising an altitude measurement device for providing vehicle altitude measurement and an altitude interface and processing board which is connected with said altitude measurement device for converting said altitude measurement received from said altitude measurement device to mean sea level height in digital data type which are passed to said navigation processing board and said control board through said common bus.

53. The universal navigation and control box, as recited in claim 46, further comprising a velocity producer for providing velocity measurement of said carrier of said universal navigation and control box with respect to said ground or water for said navigation processing board over a velocity producer interface and processing board and said common bus.

54. The universal navigation and control box, as recited in claim 53, further comprising an altitude measurement device for providing vehicle altitude measurement and an altitude interface and processing board which is connected with said altitude measurement device for converting said altitude measurement received from said altitude measurement device to mean sea level height in digital data type which are passed to said navigation processing board and said control board through said common bus.

55. The universal navigation and control box, as recited in claim 47, further comprising an altitude measurement device for providing vehicle altitude measurement and an altitude interface and processing board which is connected with said altitude measurement device for converting said altitude measurement received from said altitude measurement device to mean sea level height in digital data type which are passed to said navigation processing board and said control board through said common bus.

56. The universal navigation and control box, as recited in claim 55, further comprising an air data sensors which comprises a pitot static pressure sensor to provide static pressure and pitot pressure measurements and a dynamic pressure sensor and probe to provide dynamic pressure and freestream air temperature measurements, and an air data interface and processing board for computing baro altitude and true airspeed measurements to said control board using an air data equations.

57. The universal navigation and control box, as recited in claim 55, further comprising a terrain database which provides an altitude of surrounding terrain of a current position, wherein said provided altitude of surrounding terrain of said current position is further compared with an altitude of said carrier from said navigation processing board through said common bus by a terrain database interface and processing board to determine whether there is potential collision with terrain.

58. The universal navigation and control box, as recited in claim 50, further comprising a terrain database which provides an altitude of surrounding terrain of a current position, wherein said provided altitude of surrounding terrain of said current position is further compared with an altitude of said carrier from said navigation processing board through said common bus by a terrain database interface and processing board to determine whether there is potential collision with terrain.

59. The universal navigation and control box, as recited in claim 53, further comprising an object detection system for obtaining position data of near objects and providing notice that an object has been found in a neighborhood, and an object detection system interface and processing board for determining an object proximity status with a potential approaching object in each current time epoch and receiving approaching object positioning information, including said current time epoch and a position, velocity vector at said current time epoch, from said object detection system.

60. The universal navigation and control box, as recited in claim 48, further comprising an object detection system for obtaining position data of near objects and providing notice that an object has been found in a neighborhood, and an object detection system interface and processing board for determining an object proximity status with a potential approaching object in each current time epoch and receiving approaching object positioning information, including said current time epoch and a position, velocity vector at said current time epoch, from said object detection system.

61. The universal navigation and control box, as recited in claim 49, further comprising an object detection system for obtaining position data of near objects and providing notice that an object has been found in a neighborhood, and an object detection system interface and processing board for determining an object proximity status with a potential approaching object in each current time epoch and receiving approaching object positioning information, including said current time epoch and a position, velocity vector at said current time epoch, from said object detection system.

62. The universal navigation and control box, as recited in claim 48, further comprising an altitude measurement device for providing vehicle altitude measurement and an altitude interface and processing board which is connected with said altitude measurement device for converting said altitude measurement received from said altitude measurement device to mean sea level height in digital data type which are passed to said navigation processing board and said control board through said common bus.

63. A universal navigation and control box, comprising:

an inertial measurement unit (IMU) for providing inertial measurements including body angular rates and specific forces;

a global positioning system (GPS) processor for providing GPS measurements including pseudorange, carrier phase, and. Doppler shift;

a central navigation and control processor for processing said GPS measurements and said inertial measurements to derive a navigation solution, which are connected with said GPS processor, said IMU and a data bus, comprising an IMU interface and preprocessing board, a navigation processing board, a shared memory card for storing data, a bus arbiter for monitoring and managing a common bus and a data bus, and a control board for controlling the data stream mutually connected together via said common bus, wherein said navigation processing board is connected with said GPS processor and a data bus for receiving said GPS measurements, said IMU interface and preprocessing board is connected with said IMU for converting said inertial measurements received from said IMU into digital data of body acceleration and rotation which are sent to said navigation processing board and said control board via said common bus, and said bus interface is connected between said control board and said data bus; and a velocity producer for providing velocity measurement of a carrier of said universal navigation and control box with respect to said ground or water for said navigation processing board over a velocity producer interface and processing board and said common bus.

64. The universal navigation and control box, as recited in claim 63, wherein said velocity producer produces raw signal measurements proportional to velocity in said body frame with respect to ground or water and convert said raw signal measurements into velocity data in a body frame with respect to ground or water by said velocity producer interface and processing board, and send said velocity data in said body frame with respect to ground or water to said navigation processing board through said common bus.

65. The universal navigation and control box, as recited in claim 63, further comprising an altitude measurement device for providing vehicle altitude measurement and an altitude interface and processing board which is connected with said altitude measurement device for converting said altitude measurement received from said altitude measurement device to mean sea level height in digital data type which are passed to said navigation processing board and said control board through said common bus.

66. The universal navigation and control box, as recited in claim 64, further comprising an altitude measurement device for providing vehicle altitude measurement and an altitude interface and processing board which is connected with said altitude measurement device for converting said altitude measurement received from said altitude measurement device to mean sea level height in digital data type which are passed to said navigation processing board and said control board through said common bus.

67. The universal navigation and control box, as recited in claim 66, further comprising an air data sensors which comprises a pitot static pressure sensor to provide static pressure and pitot pressure measurements and a dynamic pressure sensor and probe to provide dynamic pressure and freestream air temperature measurements, and an air data interface and processing board for computing baro altitude and true airspeed measurements to said control board using an air data equations.

68. The universal navigation and control box, as recited in claim 66, further comprising a terrain database which provides an altitude of surrounding terrain of a current position, wherein said provided altitude of surrounding terrain of said current position is further compared with an altitude of said carrier from said navigation processing board through said common bus by a terrain database interface and processing board to determine whether there is potential collision with terrain.

69. The universal navigation and control box, as recited in claim 47, 49, 50, 55, 64, or 66, wherein said central navigation and control processor is selectively connected via said data bus to a flight management system, a flight control system, an automatic dependent surveillance, a cockpit display, an enhanced ground proximity warning system, a weather radar, and a satellite communication system.

70. The universal navigation and control box, as recited in claim 69, wherein said IMU interface and preprocessing board includes an analog signal interface which is a multi-channel A/D converter circuit board for converting analog IMU signals into digital data, which comprises a multi-channel low pass filter connected to the inertial measurement unit, a multi-channel A/D converter circuit connected between the multi-channel low pass filter and the common bus, and a DMA interface connected to the common bus, wherein said analog interface further comprises a timing circuit connected between the multi-channel A/D converter circuit and the DMA interface;

wherein said analog IMU signals from said IMU are filtered by said multi-channel low pass filter, said filtered analog IMU signals are sent to said multi-channel A/D converter circuit, said timing circuit provides a sampling frequency for said multi-channel A/D converter circuit, said multi-channel A/D converter circuit samples and digitizes said filtered analog IMU signals, said timing circuit also triggers said DMA interface;

wherein after sampling and digitizing operation of said multi-channel A/D converter circuit, said DMA interface informs said navigation processing board and said control board via said common bus to get IMU data on said common bus;

wherein after receiving of the DMA signal by said navigation processing board and said control board, said multi-channel A/D converter circuit outputs said digitized IMU data on said common bus.

71. The universal navigation and control box, as recited in claim 69, wherein said IMU interface and preprocessing board includes a serial signal interface which is a multi-channel RS-485 communication control circuit board for receiving serial IMU data, which comprises an RS-485 interface circuit connected between said IMU and said common bus, and an interrupt circuit connected between said RS-485 interface circuit and said common bus;

wherein said RS-485 interface circuit receives said serial IMU signal from said IMU;

wherein once receiving operation is finished, said RS-485 interface circuit informs said interrupt circuit, said interrupt circuit then tells said navigation processing board and said control board via said common bus that said IMU data is ready;

wherein after receiving interrupt signal from said interrupt interface by said navigation processing board and said control board via said common bus, said RS-485 interface circuit outputs said IMU data on said common bus, wherein said navigation processing board and said control board get said IMU data which are body rates and accelerations from said common bus.

72. The universal navigation and control box, as recited in claim 69, wherein said IMU interface and preprocessing board includes a pulse signal interface which is a multi-channel frequency/digital converter circuit board for receiving pulse IMU signals, comprising an Inc/Dec pulse separation circuit connected to said IMU, a bus interface circuit and a interrupt circuit connected to said common bus respectively; wherein said multi-channel frequency/digital converter circuit board further comprises a multi-channel frequency/digital circuit connected between said Inc/Dec pulse separation circuit and said bus interface circuit;

wherein said pulse IMU signals are passed to said multi-channel frequency/digital circuit via said Inc/Dec pulse separation circuit from said IMU, wherein said Inc/Dec pulse separation circuit regulates said pulse IMU signals, said multi-channel frequency/digital circuit converts said regulated pulse IMU signals into digital data;

wherein once the conversion is finished, said digital IMU data are passed to said bus interface circuit, wherein said bus interface coverts said digital IMU into common bus compatible digital data and outputs them to said common bus;

wherein said bus interface circuit triggers said interrupt circuit to generate interrupt signal, said interrupt signal informs said navigation processing board and said control board that said IMU data is ready via said common bus.

73. The universal navigation and control box, as recited in claim 69, wherein said IMU interface and preprocessing board includes a parallel digital signal interface which comprises a bus interface circuit connected between said IMU and said common bus, and an interrupt circuit connected between said bus interface circuit and said common bus;

wherein said parallel IMU signal are received by said bus interface circuit from said IMU and converted into common bus compatible data;

wherein after receiving said parallel IMU data, said bus interface circuit triggers said interrupt circuit to generate interrupt signal which is used to inform said navigation processing board and said control board via said common bus that said IMU data is ready;

wherein said bus interface circuit outputs said IMU data to said common bus, and said navigation processing board and said control board receive said IMU data from said common bus.

74. The universal navigation and control box, as recited in claim 69, said control board controls and distributes navigation data to other avionics systems;

wherein said control board receives said body acceleration and rotation data from said IMU interface and preprocessing board, receives said vehicle altitude data from said altitude interface and processing board via said common bus, and receives said vehicle position, velocity, attitude, and time data from said navigation board via said common bus;

wherein said control board sends vehicle position, velocity, attitude, and time data to said flight management system via said bus interface and said data bus;

wherein said control board sends said vehicle velocity, attitude, and said digital body acceleration and rotation data to said flight control system via said bus interface and said data bus;

wherein said control board sends said vehicle position and time data to said automatic dependence surveillance via said bus interface and said data bus;

wherein said control board sends said vehicle position, velocity, attitude, and time data to said cockpit display via said bus interface and said data bus;

wherein said control board sends said vehicle position, velocity, and attitude data to said enhanced ground proximity warning system via said bus interface and said data bus;

wherein said control board sends said vehicle attitude and said body acceleration data to said weather radar via said bus interface and said data bus;

wherein said control board sends said vehicle position and attitude data to said satellite communication system via said bus interface and said data bus.

* * * * *